US011616570B2

(12) United States Patent
Tonkin et al.

(10) Patent No.: US 11,616,570 B2
(45) Date of Patent: Mar. 28, 2023

(54) VISUAL IMPAIRMENT DETECTOR FOR FREE-SPACE OPTICAL COMMUNICATION SYSTEMS

(71) Applicant: EOS Defense Systems USA, Inc., Huntsville, AL (US)

(72) Inventors: Rachel Tonkin, Sunnyvale, CA (US); Gnanasekaran Swaminathan, Monroe, LA (US); Norman L. Swenson, Mountain View, CA (US); Bjoern Martin Gottfrid Hall, Huntsville, AL (US); Michael Sprenger, Boulder, CO (US)

(73) Assignee: EOS Defense Systems USA, Inc., Huntsville, AL (US)

( * ) Notice: Subject to any disclaimer, the term of this patent is extended or adjusted under 35 U.S.C. 154(b) by 0 days.

(21) Appl. No.: 17/730,449

(22) Filed: Apr. 27, 2022

(65) Prior Publication Data

US 2022/0263573 A1   Aug. 18, 2022

Related U.S. Application Data

(63) Continuation of application No. 16/725,956, filed on Dec. 23, 2019, now Pat. No. 11,342,992.

(51) Int. Cl.
*H04B 10/11* (2013.01)
*G08B 13/183* (2006.01)
(Continued)

(52) U.S. Cl.
CPC ............... *H04B 10/11* (2013.01); *G06T 7/00* (2013.01); *G06T 7/20* (2013.01); *G08B 13/183* (2013.01)

(58) Field of Classification Search
CPC .. H04B 10/11; G06T 7/00; G06T 7/20; G08B 13/183
See application file for complete search history.

(56) References Cited

U.S. PATENT DOCUMENTS 7,830,253 B2   11/2010  Gerszberg et al.
8,829,417 B2    9/2014  Krill et al.
(Continued)

FOREIGN PATENT DOCUMENTS

KR    2016-0110432 A     9/2016
WO    WO-2019-034838 A1  2/2019
(Continued)

OTHER PUBLICATIONS

International Search Report & Written Opinion, International Application No. PCT/US2020/064625 dated Apr. 14, 2021, 9 pages.
(Continued)

*Primary Examiner* — Casey L Kretzer
(74) *Attorney, Agent, or Firm* — Adsero IP

(57) ABSTRACT

Novel tools and techniques are provided for implementing visual impairment detection for free-space optical communication ("FSOC") systems. In various embodiments, a computing system might receive, either from a camera or from a database, images (and/or videos) of an optical field of view ("FOV") of the camera, the optical FOV comprising an optical beam(s) of a first FSOC system; might autonomously analyze the captured images (and/or videos) to determine whether an object(s) is moving within proximity to an optical beam(s) of the first FSOC system, to perform at least one of reactive learning or proactive learning regarding potential interruption of the optical beam(s) of the first FSOC system, and/or to determine one or more preventative measures to prevent interruption of the optical beam(s) of the first FSOC system; and might autonomously initiate one
(Continued)

or more first tasks and/or the one or more preventative measures, based on the analysis.

20 Claims, 19 Drawing Sheets

(51) Int. Cl.
*G06T 7/00* (2017.01)
*G06T 7/20* (2017.01)

(56) References Cited

U.S. PATENT DOCUMENTS

| | | | |
|---|---|---|---|
| 11,301,984 B1* | 4/2022 | Kumar | G06T 7/0008 |
| 11,342,992 B2 | 5/2022 | Tonkin et al. | |
| 2011/0096320 A1 | 4/2011 | Krupkin et al. | |
| 2014/0161466 A1* | 6/2014 | Riza | H04B 10/1149 398/119 |
| 2015/0293228 A1 | 10/2015 | Retterath et al. | |
| 2018/0343054 A1 | 11/2018 | Barritt | |
| 2020/0134863 A1* | 4/2020 | Jin | G06T 7/73 |
| 2020/0366372 A1* | 11/2020 | Tsonev | H04B 10/1149 |
| 2021/0194578 A1 | 6/2021 | Tonkin et al. | |

FOREIGN PATENT DOCUMENTS

| | | | | |
|---|---|---|---|---|
| WO | WO-2019034838 A1 * | 2/2019 | | H04B 10/1141 |
| WO | WO-2021-133574 A1 | 7/2021 | | |

OTHER PUBLICATIONS

U.S. Appl. No. 16/725,956, Non-Final Office Action, dated Sep. 1, 2021, 64 pages.
U.S. Appl. No. 16/725,956, Notice of Allowance, dated Jan. 27, 2022, 25 pages.
International Preliminary Report on Patentability, International Application No. PCT/US20/64625 dated Jul. 7, 2022, 6 pages.

* cited by examiner

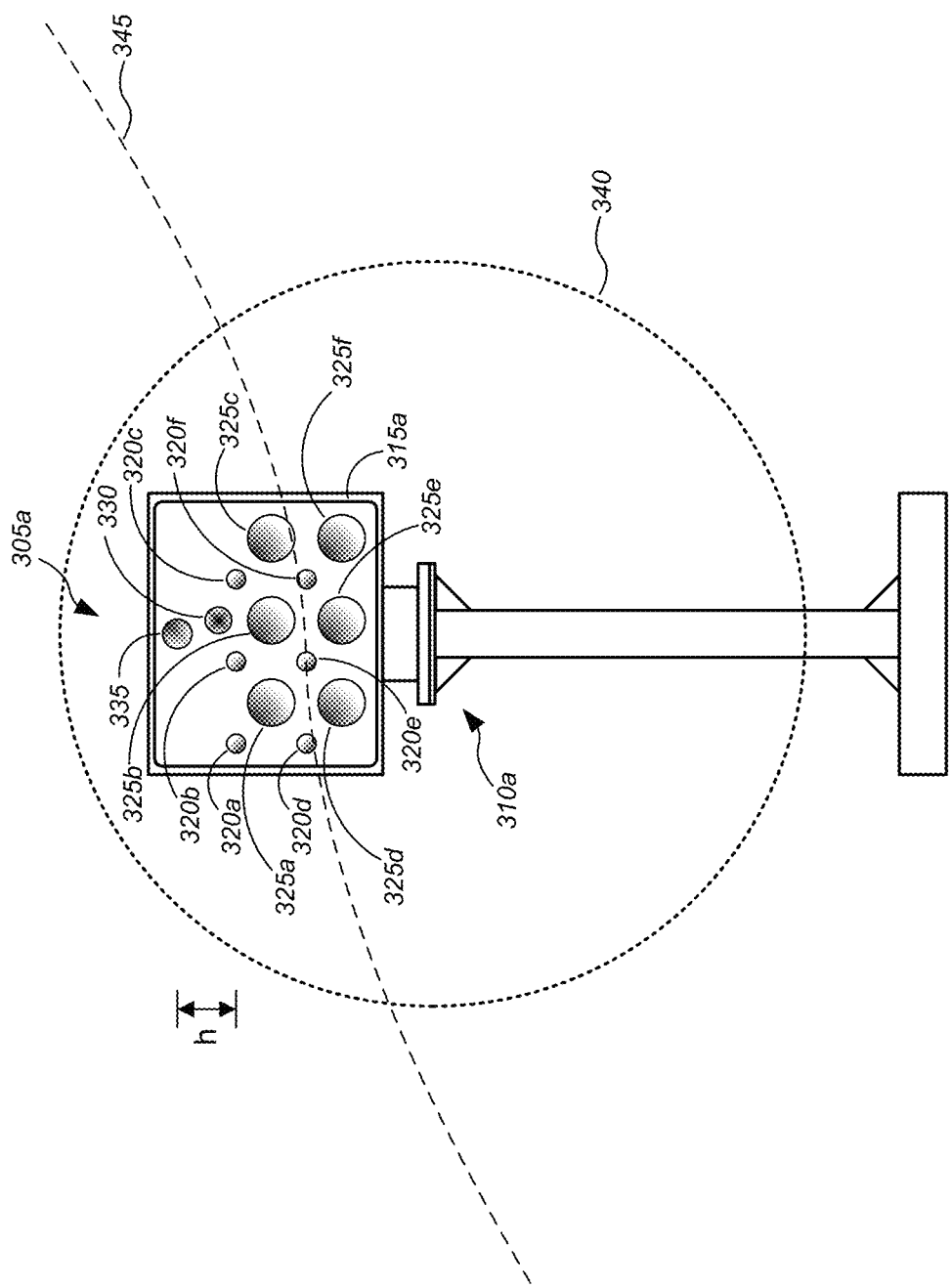

VISUAL IMPAIRMENT DETECTOR FOR FREE-SPACE OPTICAL COMMUNICATION SYSTEMS

CROSS-REFERENCES TO RELATED APPLICATIONS

This application is a continuation application of U.S. patent application Ser. No. 16/725,956 (the "'956 application"), filed Dec. 23, 2019, by Rachel Tonkin et al., entitled, "Visual Impairment Detector for Free-Space Optical Communication Systems," the disclosure of which is incorporated herein by reference in its entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing free-space optical ("FSO") communication systems, and, more particularly, to methods, systems, and apparatuses for implementing visual impairment detection for FSO communication systems.

BACKGROUND

Communication links based on FSO technologies require a clear line of sight for operation. Interference with the optical communication beam may lead to a sudden drop of signal quality, potentially causing transmission errors due to a lower signal to noise ratio. If the beam is entirely interrupted, the result is a complete loss of signal.

Service subscribers and network operators typically negotiate so-called service level agreements ("SLAs") that specify the availability of a communication link. Communication link availability is typically specified as the percentage time that a link is up and running over the course of a year. Higher link availability rates command higher prices for communication services. In addition, service subscribers and network operators typically work out a fee schedule related to service interruptions. Fines associated with service interruptions of expensive high-availability links can potentially be severe.

Errors in the communication signal or a complete loss of signal, even temporarily, are a likely cause for violation of the SLA. Thus, it is of utmost importance for both network providers as well as service subscribers to understand the nature of service interruption events. Insight into specific causes of communication link interference or interruption may enable either or both parties to take evasive action in the future.

Beam interruption events can have natural as well as man-made causes. Some examples in relation to FSO communication systems might include, without limitation, maintenance personnel present on building rooftops who are walking in front of the FSO device; construction equipment such as moving cranes or cranes lifting loads that obstruct the beams of the FSO device; animals (e.g., rodents, small mammals, birds, insects, etc.) that are present on building rooftops and moving in front of the FSO device; birds or insects flying through beam paths; aircraft flying through beam paths; a wide variety of recreational devices (e.g., drones, model aircraft, kites, etc.) that are flying through beam paths; cloud or fog patches (or other weather-related particles, or the like) moving across beams of the FSO device; and/or the like.

In case of a service interruption with associated SLA violation, it may be beneficial to all involved parties to have detailed knowledge about the exact type and cause of the event. Knowing what kind of object has interrupted the beam of an FSO communication system can be of tremendous help in resolving issues related to potential SLA violations in a timely and efficient manner. Conventional FSO systems lack the ability to do so.

Hence, there is a need for more robust and scalable solutions for implementing free-space optical ("FSO") communication systems, and, more particularly, to methods, systems, and apparatuses for implementing visual impairment detection for FSO communication systems.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIGS. 3A-3C are schematic diagrams illustrating non-limiting examples of detection of movement paths of objects as part of implementation of visual impairment detection for FSO communication systems, in accordance with various embodiments.

DETAILED DESCRIPTION OF CERTAIN EMBODIMENTS

Overview

Figure 1:
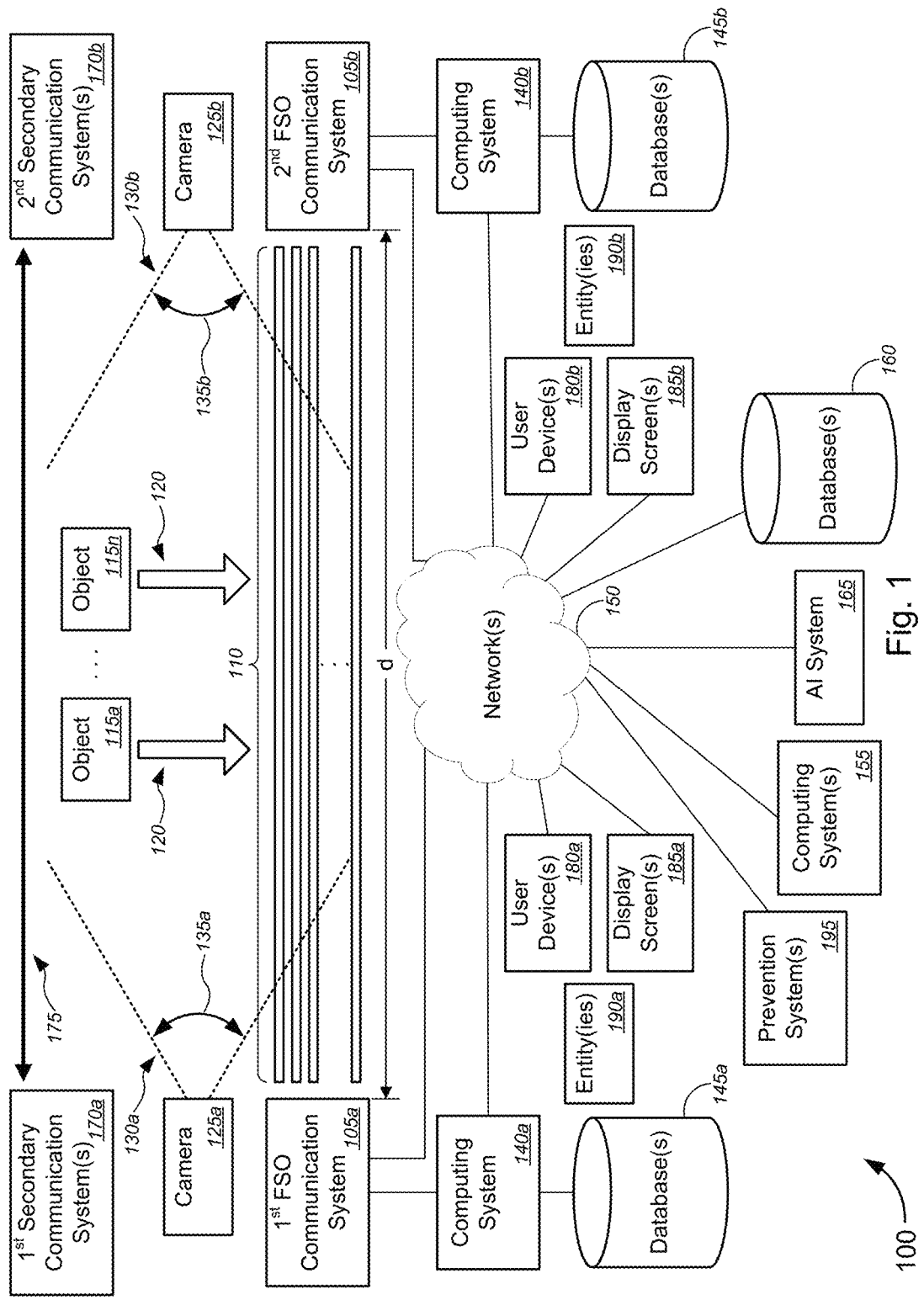
FIG. 1 is a schematic diagram illustrating a system for implementing visual impairment detection for free-space optical ("FSO") communication systems, in accordance with various embodiments.

Various embodiments provide tools and techniques for implementing free-space optical ("FSO") communication systems, and, more particularly, to methods, systems, and apparatuses for implementing visual impairment detection for FSO communication systems.

In various embodiments, an image capture device might capture, monitor, or record one or more first images (which might include, but is not limited to, images, groups of images, or videos, and/or the like) of an optical field of view of the first image capture device, the optical field of view comprising or containing one or more optical beams of a first FSO communication system that are transmitted between the first FSO communication system and a second FSO communication system. The computing system might receive the captured one or more first images from the first image capture device, and might autonomously analyze the captured one or more first images to determine whether one or more first objects are moving within proximity to at least one of the one or more optical beams of the first FSO communication system. Based on a determination that one or more first objects are moving within proximity to at least one of the one or more optical beams of the first FSO communication system (and/or the second FSO communication system), the computing system might autonomously initiate one or more first tasks.

In some embodiments, capturing the one or more first images of the optical field of view of the first image capture device might comprise at least one of capturing a first set of still images of the optical field of view of the first image capture device beginning at a first period (e.g., N/2 seconds in the case of a video sequence having a total length of N seconds, or the like) prior to the one or more first objects moving to a position that is closest to the at least one of the one or more optical beams of the first FSO communication system, capturing a second set of still images of the optical field of view of the first image capture device ending at a second period (e.g., N/2 seconds in the case of a video sequence having a total length of N seconds, or the like) after the one or more first objects have moved to the position that is closest to the at least one of the one or more optical beams of the first FSO communication system, capturing a first video of the optical field of view of the first image capture device a third period (e.g., N/2 seconds in the case of a video sequence having a total length of N seconds, or the like) prior to the one or more first objects moving to the position that is closest to the at least one of the one or more optical beams of the first FSO communication system, capturing a second video of the optical field of view of the first image capture device a fourth period (e.g., N/2 seconds in the case of a video sequence having a total length of N seconds, or the like) after the one or more first objects have moved to the position that is closest to the at least one of the one or more optical beams of the first FSO communication system, or continuously capturing a third video of the optical field of view of the first image capture device, and/or the like. Herein, "a position that is closest to the at least one of the one or more optical beams" might refer to one of a position that overlaps with the at least one of the one or more optical beams in the case that the object intersects, obstructs, or interrupts the at least one of the one or more optical beams or a position along the object's movement path that is the shortest distance from the at least one of the one or more optical beams in the case that the object moves towards, then away from (while missing), the at least one of the one or more optical beams. Herein also, the first through fourth periods may be either predetermined (e.g., preset or preconfigured by the computing system or by a human operator, etc.) or dynamically determined by the computing system (e.g., based on analysis by the computing system regarding the amount of time that the one or more objects remain within the optical field of view, or other factors, etc.).

Alternatively, or additionally, capturing the one or more first images of the optical field of view of the first image capture device might comprise at least one of capturing one or more infrared ("IR") images of the optical field of view of the first image capture device, capturing one or more ultraviolet ("UV") images of the optical field of view of the first image capture device, capturing one or more visible spectrum images of the optical field of view of the first image capture device, or capturing one or more filtered images of the optical field of view of the first image capture device, and/or the like. The one or more filtered images might be filtered to attenuate or filter out light emitted by the one or more optical beams. For example, if the one or more optical beams have a particular wavelength range within the IR spectrum, the first image capture device might utilize a filter that filters out or attenuates that particular wavelength range or a portion of that particular wavelength range.

According to some embodiments, autonomously analyzing the captured one or more first images might comprise autonomously analyzing the captured one or more first images in real-time or near-real-time to determine whether the one or more first objects are moving within proximity to the at least one of the one or more optical beams of the first FSO communication system (and/or the second FSO communication system). Alternatively, or additionally, autonomously analyzing the captured one or more first images might comprise autonomously analyzing, utilizing the AI system, the captured one or more first images to determine whether the one or more first objects are moving within proximity to the at least one of the one or more optical beams of the first FSO communication system (and/or the second FSO communication system).

In some embodiments, autonomously analyzing the captured one or more first images might comprise autonomously analyzing the captured one or more first images to determine, for each object of the one or more first objects, a movement path. The computing system might then determine whether the movement path, for each object of the one or more first objects, has intersected or is likely to intersect with at least one of the one or more optical beams of the first FSO communication system (and/or the second FSO communication system). Based on such a determination, the computing system might autonomously initiate the one or more first tasks.

Merely by way of example, in some cases, initiating the one or more first tasks might include, without limitation, at least one of causing the first FSO communication system to send or resend data that are sent over the at least one of the one or more optical beams over a secondary link (including, but not limited to, a secondary optical link directed in a different direction, a radio link, a millimeter wave link, or a microwave link, or the like), sending a message to one or more individuals regarding the proximity of the one or more first objects to the at least one of the one or more optical beams of the first FSO communication system (and/or the second FSO communication system), sending a message to one or more law enforcement agents regarding the proximity of the one or more first objects to the at least one of the one or more optical beams of the first FSO communication system (and/or the second FSO communication system), or notifying one or more entities associated with the one or more first objects, and/or the like.

According to some embodiments, the computing system might store the captured one or more first images of the optical field of view of the first image capture device in a datastore. In some cases, a video encoder might compress the captured one or more first images of the optical field of view of the first image capture device prior to storing the captured one or more first images in the datastore. With the captured one or more first images (as well as other similar images that are captured over time) being stored in the datastore, rather than directly receiving the captured one or more first images from the image capture device, the computing system might access or retrieve at least one of the captured one or more first images of the optical field of view of the first image capture device or one or more second images of the optical field of view of the first image capture device. The computing system might then perform detailed analysis of the accessed at least one of the captured one or more first images of the optical field of view of the first image capture device or the one or more second images of the optical field of view of the first image capture device to determine at least one of one or more preventative measures, one or more protective measures, or one or more avoidance measures, and/or the like.

Merely by way of example, in some instances, the at least one of the one or more preventative measures, the one or more protective measures, or the one or more avoidance measures, and/or the like, might include, but is not limited to, at least one of broadcasting an audio message indicating to avoid the one or more optical beams in response to detecting people or human-operated machines or devices near the one or more optical beams and within range of the first FSO communication system (and/or the second FSO communication system), sending a digital communication indicating to avoid the one or more optical beams in response to detecting known individuals or entities or human-operated machines or devices controlled by the individuals or entities that are detected near the one or more optical beams, displaying a message on a display screen indicating to nearby people to avoid the one or more optical beams, projecting a message on a nearby surface indicating to nearby people to avoid the one or more optical beams, sending a message to a service provider with access to the first FSO communication system (and/or the second FSO communication system) indicating to install rodent deterrent measures near or along a path of the one or more optical beams in response to detecting presence of one or more rodents near the one or more optical beams or near the first FSO communication system (and/or the second FSO communication system), sending a message to the service provider indicating to install bird deterrent measures near or along a path of the one or more optical beams in response to detecting presence of one or more birds near the one or more optical beams or near the first FSO communication system (and/or the second FSO communication system), sending a message to the service provider indicating to install insect deterrent measures near or along a path of the one or more optical beams in response to detecting presence of one or more insects near the one or more optical beams or near the first FSO communication system (and/or the second FSO communication system), sending a message to the service provider indicating to install animal deterrent measures near or along a path of the one or more optical beams in response to detecting presence of one or more animals near the one or more optical beams or near the first FSO communication system (and/or the second FSO communication system), sending a message to a pilot indicating to avoid flying into the one or more optical beams in response to detecting presence of an aircraft flying near the one or more optical beams, sending a message to an operator at an air traffic control center indicating to contact a pilot who is flying near the one or more optical beams to avoid flying into the one or more optical beams in response to detecting presence of an aircraft flying near the one or more optical beams, or sending a message to a service provider with access to the first FSO communication system indicating to implement weather-related contingency actions in response to detecting weather-related effects that are capable of disrupting the one or more optical beams near the one or more optical beams or near the first FSO communication system, and/or the like.

In some aspects, the computing system might receive, either from the first image capture device or from the database, at least one of one or more first images of the optical field of view of the first image capture device or one or more first videos of the optical field of view of the first image capture device. The computing system might receive the captured one or more first images from the first image capture device, and might autonomously analyze the captured at least one of the one or more first images or the one or more first videos to perform at least one of reactive learning regarding potential interruption of at least one of one or more optical beams of the first FSO communication system (and/or the second FSO communication system) or proactive learning regarding potential interruption of the at least one of the one or more optical beams of the first FSO communication system (and/or the second FSO communication system). Based on the analysis, the computing system might autonomously initiate the one or more second tasks.

According to some embodiments, autonomously analyzing the at least one of the one or more first images of the optical field of view of the first image capture device or the one or more first videos of the optical field of view of the first image capture device might comprise autonomously analyzing the at least one of the one or more first images of the optical field of view of the first image capture device or the one or more first videos of the optical field of view of the first image capture device in real-time or near-real-time to perform at least one of reactive learning regarding potential interruption of at least one of one or more optical beams of the first FSO communication system (and/or the second FSO communication system) or proactive learning regarding potential interruption of the at least one of the one or more optical beams of the first FSO communication system (and/or the second FSO communication system). Alternatively, or additionally, autonomously analyzing the at least one of the one or more first images of the optical field of view of the first image capture device or the one or more first videos of the optical field of view of the first image capture device might comprise autonomously analyzing, utilizing the AI system, the at least one of the one or more first images of the optical field of view of the first image capture device or the one or more first videos of the optical field of view of the first image capture device to perform at least one of reactive learning regarding potential interruption of at least one of one or more optical beams of the first FSO communication system (and/or the second FSO communication system) or proactive learning regarding potential interruption of the at least one of the one or more optical beams of the first FSO communication system (and/or the second FSO communication system).

Merely by way of example, in some cases, the reactive learning regarding potential interruption of the at least one of the one or more optical beams of the first FSO communication system (and/or the second FSO communication system) might include, without limitation, at least one of: identifying one or more first objects that have moved or are moving within proximity to at least one of the one or more optical beams of the first FSO communication system (and/or the second FSO communication system); identifying one or more first objects that have intersected or are intersecting with at least one of the one or more optical beams of the first FSO communication system (and/or the second FSO communication system); determining, for each object of the one or more first objects, a movement path near at least one of the one or more optical beams of the first FSO communication system (and/or the second FSO communication system); determining, for each object of the one or more first objects, a movement path intersecting with at least one of the one or more optical beams of the first FSO communication system (and/or the second FSO communication system); identifying one or more individuals associated with each of at least one of the one or more first objects and determining contact information for each of the one or more individuals; identifying one or more entities associated with each of at least one of the one or more first objects and determining contact information for each of the one or more entities; or determining the one or more second tasks in response to the reactive learning; and/or the like.

In such cases, autonomously initiating the one or more second tasks might include, but are not limited to, at least one of: causing the first FSO communication system (and/or the second FSO communication system) to send or resend data that are sent over the at least one of the one or more optical beams over a secondary link (including, but not limited to, a secondary optical link directed in a different direction, a radio link, a millimeter wave link, or a microwave link, or the like); sending a message to one or more individuals regarding the proximity of the one or more first objects to the at least one of the one or more optical beams of the first FSO communication system (and/or the second FSO communication system); sending a message to one or more law enforcement agents regarding the proximity of the one or more first objects to the at least one of the one or more optical beams of the first FSO communication system (and/or the second FSO communication system); or notifying one or more entities associated with the one or more first objects regarding the proximity of the one or more first objects to the at least one of the one or more optical beams of the first FSO communication system (and/or the second FSO communication system); and/or the like.

In some embodiments, the proactive learning regarding potential interruption of the at least one of the one or more optical beams of the first FSO communication system (and/or the second FSO communication system) might include, without limitation, at least one of: analyzing prior analyses or one or more prior captured images or video to identify one or more first objects that are likely to move within proximity to at least one of the one or more optical beams of the first FSO communication system (and/or the second FSO communication system); analyzing prior analyses or one or more prior captured images or video to identify one or more first objects that are likely to intersect with at least one of the one or more optical beams of the first FSO communication system (and/or the second FSO communication system); analyzing prior analyses or one or more prior captured images or video to determine, for each object of the one or more first objects, a movement path toward at least one of the one or more optical beams of the first FSO communication system (and/or the second FSO communication system); analyzing prior analyses or one or more prior captured images or video to determine, for each object of the one or more first objects, a movement path likely to intersect with at least one of the one or more optical beams of the first FSO communication system (and/or the second FSO communication system); analyzing prior analyses or one or more prior captured images or video to identify one or more individuals associated with each of at least one of the one or more first objects and determining contact information for each of the one or more individuals; analyzing prior analyses or one or more prior captured images or video to identify one or more entities associated with each of at least one of the one or more first objects and determining contact information for each of the one or more entities; analyzing prior analyses or one or more prior captured images or video to identify sources of potential interruption of the at least one of the one or more optical beams of the first FSO communication system (and/or the second FSO communication system) that are due to at least one of location-specific causes, time of day-related causes, seasonal causes, lunar-based causes, time of year-related causes; or analyzing prior analyses or one or more prior captured images or video to determine the one or more second tasks in response to the proactive learning; and/or the like.

In such embodiments, autonomously initiating the one or more second tasks might include, but are not limited to, at least one of: broadcasting an audio message indicating to avoid the one or more optical beams in response to detecting people or human-operated machines or devices near the one or more optical beams and within range of the first FSO communication system (and/or the second FSO communication system); sending a digital communication indicating to avoid the one or more optical beams in response to detecting known individuals or entities or human-operated machines or devices controlled by the individuals or entities that are detected near the one or more optical beams; displaying a message on a display screen indicating to nearby people to avoid the one or more optical beams; projecting a message on a nearby surface indicating to nearby people to avoid the one or more optical beams; sending a message to a service provider with access to the first FSO communication system (and/or the second FSO communication system) indicating to install rodent deterrent measures near or along a path of the one or more optical beams in response to detecting presence of one or more rodents near the one or more optical beams or near the first FSO communication system (and/or the second FSO communication system); sending a message to the service provider indicating to install bird deterrent measures near or along a path of the one or more optical beams in response to detecting presence of one or more birds near the one or more optical beams or near the first FSO communication system (and/or the second FSO communication system); sending a message to the service provider indicating to install insect deterrent measures near or along a path of the one or more optical beams in response to detecting presence of one or more insects near the one or more optical beams or near the first FSO communication system (and/or the second FSO communication system); sending a message to the service provider indicating to install animal deterrent measures near or along a path of the one or more optical beams in response to detecting presence of one or more animals near the one or more optical beams or near the first FSO communication system (and/or the second FSO communication system); sending a message to a pilot indicating to avoid flying into the one or more optical beams in response to detecting presence of an aircraft flying near the one or more optical beams; sending a message to an operator at an air traffic control center indicating to contact a pilot who is flying near the one or more optical beams to avoid flying into the one or more optical beams in response to detecting presence of an aircraft flying near the one or more optical beams; or sending a message to a service provider with access to the first FSO communication system indicating to implement weather-related contingency actions in response to detecting weather-related effects that are capable of disrupting the one or more optical beams near the one or more optical beams or near the first FSO communication system; and/or the like.

In some aspects, the computing system might receive, either from the first image capture device or from the database, at least one of a plurality of images of an optical field of view of a first image capture device or a plurality of videos of the optical field of view of the first image capture device. The computing system might autonomously analyze the at least one of the plurality of images of the optical field of view of the first image capture device or the plurality of videos of the optical field of view of the first image capture device to determine at least one of one or more preventative measures, one or more protective measures, or one or more avoidance measures, and/or the like, to prevent interruption of the one or more optical beams of the first FSO communication system (and/or the second FSO communication system). Based on the analysis, the computing system might autonomously initiate the at least one of the one or more preventative measures, the one or more protective measures, or the one or more avoidance measures, and/or the like (as described in detail above). In some embodiments, autonomously initiating the at least one of the one or more preventative measures, the one or more protective measures, or the one or more avoidance measures might—alternative or additional to the at least one of the one or more preventative measures, the one or more protective measures, or the one or more avoidance measures, and/or the like (as described in detail above)—include causing the first FSO communication system (and/or the second FSO communication system) to preemptively send data that are sent over the at least one of the one or more optical beams over a secondary link (including, but not limited to, a secondary optical link directed in a different direction, a radio link, a millimeter wave link, or a microwave link, or the like).

According to some embodiments, autonomously analyzing the at least one of the plurality of images of the optical field of view of the first image capture device or the plurality of videos of the optical field of view of the first image capture device might comprise autonomously analyzing the at least one of the plurality of images of the optical field of view of the first image capture device or the plurality of videos of the optical field of view of the first image capture device in real-time or near-real-time to determine at least one of one or more preventative measures, one or more protective measures, or one or more avoidance measures, and/or the like. Alternatively, or additionally, autonomously analyzing the at least one of the plurality of images of the optical field of view of the first image capture device or the plurality of videos of the optical field of view of the first image capture device might comprise autonomously analyzing, utilizing the AI system, the at least one of the plurality of images of the optical field of view of the first image capture device or the plurality of videos of the optical field of view of the first image capture device to determine at least one of one or more preventative measures, one or more protective measures, or one or more avoidance measures, and/or the like.

The various embodiments describe a camera system that observes the optical beam path of an FSO communication system. The camera might be installed such that it operates along the line of sight of the FSO system. In some cases, the camera might constantly record video footage, which is encoded using a video encoder and stored in a buffer. Some embodiments of the system may include an automatic image analysis function that analyzes the video imagery for potential causes of beam interference prior to the video encoding process. In the event of an object approaching an FSO beam within a certain distance or angle (as determined by the image analysis function), or in case of a complete FSO link disruption, the controller might transfer the recorded video footage associated with the event to the network operator's management system. In some embodiments, the captured video footage might be further analyzed by software driven by artificial intelligence to identify causes or potential causes of link disruption. This enables the network operator to understand and/or classify the type of link disruption and potentially address similar types of events in the future. Further, the AI learning system optionally learns from the mapping of objects thus classified to corresponding corrective action so that over time the system can prescribe corrective actions for the service subscriber. Further, the AI system might optionally learn from the accepted and executed corrective actions to automatically recommend or perform the corrective actions on its own in the future.

These and other aspects of the visual impairment detection for FSO communication systems are described in greater detail with respect to the figures.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, free-space optical ("FSO") communication technology, and/or the like. In other aspects, certain embodiments, can improve the functioning of user equipment or systems themselves (e.g., FSO communication systems, etc.), for example, by receiving, with a computing system and either from a first image capture device or from a database, one or more first images (and/or one or more first videos) of an optical field of view of the first image capture device, the optical field of view comprising one or more optical beams of a first FSO communication system that are transmitted between the first FSO communication system and a second FSO communication system; autonomously analyzing, with the computing system, the captured one or more first images (and/or one or more first videos) to determine whether one or more first objects are moving within proximity to at least one of the one or more optical beams of the first FSO communication system, to perform at least one of reactive learning regarding potential interruption of at least one of one or more optical beams of the first FSO communication or proactive learning regarding potential interruption of the at least one of the one or more optical beams of the first FSO communication system, and/or to determine at least one of one or more preventative measures, one or more protective measures, or one or more avoidance measures to prevent interruption of the one or more optical beams of the first FSO communication system; and, based on the analysis, autonomously initiating, with the computing system, one or more first tasks and/or the at least one of the one or more preventative measures, the one or more protective measures, or the one or more avoidance measures; and/or the like.

In particular, to the extent any abstract concepts are present in the various embodiments, those concepts can be implemented as described herein by devices, software, systems, and methods that involve specific novel functionality (e.g., steps or operations), such as, the controller transferring recorded video footage associated with the potential or actual obstruction events of FSO communication systems to the network operator's management system, in the event of an object approaching a FSO beam within a certain distance or angle (as determined by the image analysis function), or in case of a complete FSO link disruption; and further analyzing, using software driven by artificial intelligence, the video footage to identify causes or potential causes of link disruption. This enables the network operator to understand and/or classify the type of link disruption and potentially address similar types of events in the future. Further, the AI learning system optionally learns from the mapping of objects thus classified to corresponding corrective action so that over time the system can prescribe corrective actions for the service subscriber. Further, the AI system might optionally learn from the accepted and executed corrective actions to automatically recommend or perform the corrective actions on its own in the future. These are but a few examples that extend beyond mere conventional computer processing operations. These functionalities can produce tangible results outside of the implementing computer system, including, merely by way of example, optimized operation of FSO communication systems that enable quick or immediate corrective action in the case of current or past obstruction of one or more optical beams of the FSO communication systems, that enable analysis and identification of potential future obstruction of one or more optical beams of the FSO communication systems based on past image or video analyses of previous potential or actual obstruction events, that enable identification and implementation of preventive actions to avoid future obstruction of one or more optical beams of the FSO communication systems, and/or the like, at least some of which may be observed or measured by customers and/or service providers.

In an aspect, a method might comprise capturing, with a first image capture device, one or more first images of an optical field of view of the first image capture device, the optical field of view comprising one or more optical beams of a first free-space optical ("FSO") communication system that are transmitted between the first FSO communication system and a second FSO communication system; receiving, with a computing system, the captured one or more first images from the first image capture device; autonomously analyzing, with the computing system, the captured one or more first images to determine whether one or more first objects are moving within proximity to at least one of the one or more optical beams of the first FSO communication system; and based on a determination that one or more first objects are moving within proximity to at least one of the one or more optical beams of the first FSO communication system, autonomously initiating, with the computing system, one or more first tasks.

In some embodiments, the computing system might comprise at least one of a controller disposed within the first FSO communication system, an external controller system, a server computer over a network, a cloud-based computing system over a network, or a distributed computing system, and/or the like.

According to some embodiments, capturing the one or more first images of the optical field of view of the first image capture device might comprise at least one of capturing a first set of still images of the optical field of view of the first image capture device beginning at a first period prior to the one or more first objects moving to a position that is closest to the at least one of the one or more optical beams of the first FSO communication system, capturing a second set of still images of the optical field of view of the first image capture device ending at a second period after the one or more first objects have moved to the position that is closest to the at least one of the one or more optical beams of the first FSO communication system, capturing a first video of the optical field of view of the first image capture device a third period prior to the one or more first objects moving to the position that is closest to the at least one of the one or more optical beams of the first FSO communication system, capturing a second video of the optical field of view of the first image capture device a fourth period after the one or more first objects have moved to the position that is closest to the at least one of the one or more optical beams of the first FSO communication system, or continuously capturing a third video of the optical field of view of the first image capture device, and/or the like.

Alternatively, or additionally, capturing the one or more first images of the optical field of view of the first image capture device might comprise at least one of capturing one or more infrared images of the optical field of view of the first image capture device, capturing one or more ultraviolet images of the optical field of view of the first image capture device, capturing one or more visible spectrum images of the optical field of view of the first image capture device, or capturing one or more filtered images of the optical field of view of the first image capture device, wherein the one or more filtered images are filtered to attenuate or filter out light emitted by the one or more optical beams.

In some embodiments, autonomously analyzing the captured one or more first images might comprise autonomously analyzing, with the computing system, the captured one or more first images in real-time or near-real-time to determine whether the one or more first objects are moving within proximity to the at least one of the one or more optical beams of the first FSO communication system. Alternatively, or additionally, autonomously analyzing the captured one or more first images might comprise autonomously analyzing, with the computing system and utilizing at least one of an artificial intelligence ("AI") system or a machine learning system, the captured one or more first images to determine whether the one or more first objects are moving within proximity to the at least one of the one or more optical beams of the first FSO communication system.

Alternatively, or additionally, autonomously analyzing the captured one or more first images might comprise autonomously analyzing, with the computing system, the captured one or more first images to determine, for each object of the one or more first objects, a movement path. In such cases, the method might further comprise determining, with the computing system, whether the movement path, for each object of the one or more first objects, has intersected or is likely to intersect with at least one of the one or more optical beams of the first FSO communication system; and based on a determination that the movement path, for at least one object among the one or more first objects, has intersected or is likely to intersect with at least one of the one or more optical beams of the first FSO communication system, autonomously initiating, with the computing system, the one or more first tasks.

According to some embodiments, the method might further comprise storing the captured one or more first images of the optical field of view of the first image capture device in a datastore. In some instances, the method might further comprise compressing, with a video encoder, the captured one or more first images of the optical field of view of the first image capture device prior to storing the captured one or more first images in the datastore. Alternatively, or additionally, the method might further comprise accessing, with the computing system and from the datastore, at least one of the captured one or more first images of the optical field of view of the first image capture device or one or more second images of the optical field of view of the first image capture device; and performing, with the computing system, detailed analysis of the accessed at least one of the captured one or more first images of the optical field of view of the first image capture device or the one or more second images of the optical field of view of the first image capture device to determine at least one of one or more preventative measures, one or more protective measures, or one or more avoidance measures, and/or the like.

In some cases, the at least one of the one or more preventative measures, the one or more protective measures, or the one or more avoidance measures might comprise at least one of broadcasting an audio message indicating to avoid the one or more optical beams in response to detecting people or human-operated machines or devices near the one or more optical beams and within range of the first FSO communication system, sending a digital communication indicating to avoid the one or more optical beams in response to detecting known individuals or entities or human-operated machines or devices controlled by the individuals or entities that are detected near the one or more optical beams, displaying a message on a display screen indicating to nearby people to avoid the one or more optical beams, projecting a message on a nearby surface indicating to nearby people to avoid the one or more optical beams, sending a message to a service provider with access to the first FSO communication system indicating to install rodent deterrent measures near or along a path of the one or more optical beams in response to detecting presence of one or more rodents near the one or more optical beams or near the first FSO communication system, sending a message to the service provider indicating to install bird deterrent measures near or along a path of the one or more optical beams in response to detecting presence of one or more birds near the one or more optical beams or near the first FSO communication system, sending a message to the service provider indicating to install insect deterrent measures near or along a path of the one or more optical beams in response to detecting presence of one or more insects near the one or more optical beams or near the first FSO communication system, sending a message to the service provider indicating to install animal deterrent measures near or along a path of the one or more optical beams in response to detecting presence of one or more animals near the one or more optical beams or near the first FSO communication system, sending a message to a pilot indicating to avoid flying into the one or more optical beams in response to detecting presence of an aircraft flying near the one or more optical beams, sending a message to an operator at an air traffic control center indicating to contact a pilot who is flying near the one or more optical beams to avoid flying into the one or more optical beams in response to detecting presence of an aircraft flying near the one or more optical beams, or sending a message to a service provider with access to the first FSO communication system indicating to implement weather-related contingency actions in response to detecting weather-related effects that are capable of disrupting the one or more optical beams near the one or more optical beams or near the first FSO communication system, and/or the like.

In some embodiments, initiating the one or more first tasks might comprise at least one of causing the first FSO communication system to send or resend data that are sent over the at least one of the one or more optical beams over a secondary link, sending a message to one or more individuals regarding the proximity of the one or more first objects to the at least one of the one or more optical beams of the first FSO communication system, sending a message to one or more law enforcement agents regarding the proximity of the one or more first objects to the at least one of the one or more optical beams of the first FSO communication system, or notifying one or more entities associated with the one or more first objects, and/or the like. In some instances, the secondary link might comprise one of a radio link, a millimeter wave link, a microwave link, or a secondary optical link directed in a different direction, and/or the like.

In another aspect, an apparatus might comprise at least one processor and a non-transitory computer readable medium communicatively coupled to the at least one processor. The non-transitory computer readable medium might have stored thereon computer software comprising a set of instructions that, when executed by the at least one processor, causes the apparatus to: cause a first image capture device to capture one or more first images of an optical field of view of the first image capture device, the optical field of view comprising one or more optical beams of a first free-space optical ("FSO") communication system that are transmitted between the first FSO communication system and a second FSO communication system; receive the captured one or more first images from the first image capture device; autonomously analyze the captured one or more first images to determine whether one or more first objects are moving within proximity to at least one of the one or more optical beams of the first FSO communication system; and based on a determination that one or more first objects are moving within proximity to at least one of the one or more optical beams of the first FSO communication system, autonomously initiate one or more first tasks.

In some embodiments, the apparatus might comprise at least one of a controller disposed within the first FSO communication system, an external controller system, a server computer over a network, a cloud-based computing system over a network, or a distributed computing system, and/or the like.

In yet another aspect, a system might comprise a first image capture device and a computing system. The first image capture device might be configured to capture one or more first images of an optical field of view of the first image capture device, the optical field of view comprising one or more optical beams of a first free-space optical ("FSO") communication system that are transmitted between the first FSO communication system and a second FSO communication system. The computing system, which might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the computing system to: receive the captured one or more first images from the first image capture device; autonomously analyze the captured one or more first images to determine whether one or more first objects are moving within proximity to at least one of the one or more optical beams of the first FSO communication system; and based on a determination that one or more first objects are moving within proximity to at least one of the one or more optical beams of the first FSO communication system, autonomously initiate one or more first tasks.

In some embodiments, the computing system might comprise at least one of a controller disposed within the first FSO communication system, an external controller system, a server computer over a network, a cloud-based computing system over a network, or a distributed computing system, and/or the like.

According to some embodiments, initiating the one or more first tasks might comprise at least one of causing the first FSO communication system to send or resend data that are sent over the at least one of the one or more optical beams over a secondary link, sending a message to one or more individuals regarding the proximity of the one or more first objects to the at least one of the one or more optical beams of the first FSO communication system, or notifying one or more entities associated with the one or more first objects, and/or the like. In some instances, the secondary link might comprise one of a radio link, a millimeter wave link, a microwave link, or a secondary optical link directed in a different direction, and/or the like.

In an aspect, a method might comprise receiving, with a computing system, at least one of one or more first images of an optical field of view of a first image capture device or one or more first videos of the optical field of view of the first image capture device, the optical field of view comprising one or more optical beams of a first free-space optical ("FSO") communication system that are transmitted between the first FSO communication system and a second FSO communication system; autonomously analyzing, with the computing system, the at least one of the one or more first images of the optical field of view of the first image capture device or the one or more first videos of the optical field of view of the first image capture device to perform at least one of reactive learning regarding potential interruption of at least one of one or more optical beams of the first FSO communication or proactive learning regarding potential interruption of the at least one of the one or more optical beams of the first FSO communication system; and based on the analysis, autonomously initiating, with the computing system, one or more first tasks.

In some embodiments, the computing system might comprise at least one of a controller disposed within the first FSO communication system, an external controller system, a server computer over a network, a cloud-based computing system over a network, or a distributed computing system, and/or the like.

According to some embodiments, receiving the at least one of the one or more first images of the optical field of view of the first image capture device or the one or more first videos of the optical field of view of the first image capture device might comprise at least one of: receiving, with the computing system and from the first image capture device, the at least one of the one or more first images of the optical field of view of the first image capture device or the one or more first videos of the optical field of view of the first image capture device; or receiving, with the computing system and from a database, the at least one of the one or more first images of the optical field of view of the first image capture device or the one or more first videos of the optical field of view of the first image capture device; and/or the like.

In some embodiments, autonomously analyzing the at least one of the one or more first images of the optical field of view of the first image capture device or the one or more first videos of the optical field of view of the first image capture device comprises autonomously analyzing, with the computing system, the at least one of the one or more first images of the optical field of view of the first image capture device or the one or more first videos of the optical field of view of the first image capture device in real-time or near-real-time to perform at least one of reactive learning regarding potential interruption of at least one of one or more optical beams of the first FSO communication or proactive learning regarding potential interruption of the at least one of the one or more optical beams of the first FSO communication.

Alternatively, or additionally, autonomously analyzing the at least one of the one or more first images of the optical field of view of the first image capture device or the one or more first videos of the optical field of view of the first image capture device might comprise autonomously analyzing, with the computing system and utilizing at least one of an artificial intelligence ("AI") system or a machine learning system, the at least one of the one or more first images of the optical field of view of the first image capture device or the one or more first videos of the optical field of view of the first image capture device to perform at least one of reactive learning regarding potential interruption of at least one of one or more optical beams of the first FSO communication or proactive learning regarding potential interruption of the at least one of the one or more optical beams of the first FSO communication.

In some embodiments, the reactive learning regarding potential interruption of the at least one of the one or more optical beams of the first FSO communication might comprise at least one of: identifying one or more first objects that have moved or are moving within proximity to at least one of the one or more optical beams of the first FSO communication system; identifying one or more first objects that have intersected or are intersecting with at least one of the one or more optical beams of the first FSO communication system; determining, for each object of the one or more first objects, a movement path near at least one of the one or more optical beams of the first FSO communication system; determining, for each object of the one or more first objects, a movement path intersecting with at least one of the one or more optical beams of the first FSO communication system; identifying one or more individuals associated with each of at least one of the one or more first objects and determining contact information for each of the one or more individuals; identifying one or more entities associated with each of at least one of the one or more first objects and determining contact information for each of the one or more entities; or determining the one or more first tasks in response to the reactive learning; and/or the like.

In such cases, autonomously initiating the one or more first tasks might comprise at least one of: causing the first FSO communication system to send or resend data that are sent over the at least one of the one or more optical beams over a secondary link; sending a message to one or more individuals regarding the proximity of the one or more first objects to the at least one of the one or more optical beams of the first FSO communication system; sending a message to one or more law enforcement agents regarding the proximity of the one or more first objects to the at least one of the one or more optical beams of the first FSO communication system; or notifying one or more entities associated with the one or more first objects regarding the proximity of the one or more first objects to the at least one of the one or more optical beams of the first FSO communication. In some instances, the secondary link might comprise one of a radio link, a millimeter wave link, a microwave link, or a secondary optical link directed in a different direction, and/or the like.

According to some embodiments, the proactive learning regarding potential interruption of the at least one of the one or more optical beams of the first FSO communication might comprise at least one of: analyzing prior analyses or one or more prior captured images or video to identify one or more first objects that are likely to move within proximity to at least one of the one or more optical beams of the first FSO communication system; analyzing prior analyses or one or more prior captured images or video to identify one or more first objects that are likely to intersect with at least one of the one or more optical beams of the first FSO communication system; analyzing prior analyses or one or more prior captured images or video to determine, for each object of the one or more first objects, a movement path toward at least one of the one or more optical beams of the first FSO communication system; analyzing prior analyses or one or more prior captured images or video to determine, for each object of the one or more first objects, a movement path likely to intersect with at least one of the one or more optical beams of the first FSO communication system; analyzing prior analyses or one or more prior captured images or video to identify one or more individuals associated with each of at least one of the one or more first objects and determining contact information for each of the one or more individuals; analyzing prior analyses or one or more prior captured images or video to identify one or more entities associated with each of at least one of the one or more first objects and determining contact information for each of the one or more entities; analyzing prior analyses or one or more prior captured images or video to identify sources of potential interruption of the at least one of the one or more optical beams of the first FSO communication system that are due to at least one of location-specific causes, time of day-related causes, seasonal causes, lunar-based causes, time of year-related causes; or analyzing prior analyses or one or more prior captured images or video to determine the one or more first tasks in response to the proactive learning; and/or the like.

In such cases, autonomously initiating the one or more first tasks might comprise at least one of: broadcasting an audio message indicating to avoid the one or more optical beams in response to detecting people or human-operated machines or devices near the one or more optical beams and within range of the first FSO communication system; sending a digital communication indicating to avoid the one or more optical beams in response to detecting known individuals or entities or human-operated machines or devices controlled by the individuals or entities that are detected near the one or more optical beams; displaying a message on a display screen indicating to nearby people to avoid the one or more optical beams; projecting a message on a nearby surface indicating to nearby people to avoid the one or more optical beams; sending a message to a service provider with access to the first FSO communication system indicating to install rodent deterrent measures near or along a path of the one or more optical beams in response to detecting presence of one or more rodents near the one or more optical beams or near the first FSO communication system; sending a message to the service provider indicating to install bird deterrent measures near or along a path of the one or more optical beams in response to detecting presence of one or more birds near the one or more optical beams or near the first FSO communication system; sending a message to the service provider indicating to install insect deterrent measures near or along a path of the one or more optical beams in response to detecting presence of one or more insects near the one or more optical beams or near the first FSO communication system; sending a message to the service provider indicating to install animal deterrent measures near or along a path of the one or more optical beams in response to detecting presence of one or more animals near the one or more optical beams or near the first FSO communication system; sending a message to a pilot indicating to avoid flying into the one or more optical beams in response to detecting presence of an aircraft flying near the one or more optical beams; sending a message to an operator at an air traffic control center indicating to contact a pilot who is flying near the one or more optical beams to avoid flying into the one or more optical beams in response to detecting presence of an aircraft flying near the one or more optical beams; or sending a message to a service provider with access to the first FSO communication system indicating to implement weather-related contingency actions in response to detecting weather-related effects that are capable of disrupting the one or more optical beams near the one or more optical beams or near the first FSO communication system; and/or the like.

In another aspect, an apparatus might comprise at least one processor and a non-transitory computer readable medium communicatively coupled to the at least one processor. The non-transitory computer readable medium might have stored thereon computer software comprising a set of instructions that, when executed by the at least one processor, causes the apparatus to: receive at least one of one or more first images of an optical field of view of a first image capture device or one or more first videos of the optical field of view of the first image capture device, the optical field of view comprising one or more optical beams of a first free-space optical ("FSO") communication system that are transmitted between the first FSO communication system and a second FSO communication system; autonomously analyze the at least one of the one or more first images of the optical field of view of the first image capture device or the one or more first videos of the optical field of view of the first image capture device to perform at least one of reactive learning regarding potential interruption of at least one of one or more optical beams of the first FSO communication or proactive learning regarding potential interruption of the at least one of the one or more optical beams of the first FSO communication system; and based on the analysis, autonomously initiate one or more first tasks.

In some embodiments, the apparatus might comprise at least one of a controller disposed within the first FSO communication system, an external controller system, a server computer over a network, a cloud-based computing system over a network, or a distributed computing system, and/or the like.

In yet another aspect, a system might comprise a first image capture device and a computing system. The first image capture device might be configured to capture at least one of one or more first images of an optical field of view of the first image capture device or one or more first videos of the optical field of view of the first image capture device, the optical field of view comprising one or more optical beams of a first free-space optical ("FSO") communication system that are transmitted between the first FSO communication system and a second FSO communication system. The computing system might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the computing system to: receive the at least one of the one or more first images of the optical field of view of the first image capture device or the one or more first videos of the optical field of view of the first image capture device; autonomously analyze the at least one of the one or more first images of the optical field of view of the first image capture device or the one or more first videos of the optical field of view of the first image capture device to perform at least one of reactive learning regarding potential interruption of at least one of one or more optical beams of the first FSO communication or proactive learning regarding potential interruption of the at least one of the one or more optical beams of the first FSO communication system; and based on the analysis, autonomously initiate one or more first tasks.

In some embodiments, the computing system might comprise at least one of a controller disposed within the first FSO communication system, an external controller system, a server computer over a network, a cloud-based computing system over a network, or a distributed computing system, and/or the like.

According to some embodiments, receiving the at least one of the one or more first images of the optical field of view of the first image capture device or the one or more first videos of the optical field of view of the first image capture device might comprise at least one of: receiving, from the first image capture device, the at least one of the one or more first images of the optical field of view of the first image capture device or the one or more first videos of the optical field of view of the first image capture device; or receiving, from a database, the at least one of the one or more first images of the optical field of view of the first image capture device or the one or more first videos of the optical field of view of the first image capture device; and/or the like.

In some embodiments, the reactive learning regarding potential interruption of the at least one of the one or more optical beams of the first FSO communication might comprise at least one of: identifying one or more first objects that have moved or are moving within proximity to at least one of the one or more optical beams of the first FSO communication system; identifying one or more first objects that have intersected or are intersecting with at least one of the one or more optical beams of the first FSO communication system; determining, for each object of the one or more first objects, a movement path near at least one of the one or more optical beams of the first FSO communication system; determining, for each object of the one or more first objects, a movement path intersecting with at least one of the one or more optical beams of the first FSO communication system; identifying one or more individuals associated with each of at least one of the one or more first objects and determining contact information for each of the one or more individuals; identifying one or more entities associated with each of at least one of the one or more first objects and determining contact information for each of the one or more entities; or determining the one or more first tasks in response to the reactive learning; and/or the like.

In such cases, autonomously initiating the one or more first tasks might comprise at least one of: causing the first FSO communication system to send or resend data that are sent over the at least one of the one or more optical beams over a secondary link; sending a message to one or more individuals regarding the proximity of the one or more first objects to the at least one of the one or more optical beams of the first FSO communication system; sending a message to one or more law enforcement agents regarding the proximity of the one or more first objects to the at least one of the one or more optical beams of the first FSO communication system; or notifying one or more entities associated with the one or more first objects regarding the proximity of the one or more first objects to the at least one of the one or more optical beams of the first FSO communication system; and/or the like. In some instances, the secondary link might comprise one of a radio link, a millimeter wave link, a microwave link, or a secondary optical link directed in a different direction, and/or the like.

According to some embodiments, the proactive learning regarding potential interruption of the at least one of the one or more optical beams of the first FSO communication might comprise at least one of: analyzing prior analyses or one or more prior captured images or video to identify one or more first objects that are likely to move within proximity to at least one of the one or more optical beams of the first FSO communication system; analyzing prior analyses or one or more prior captured images or video to identify one or more first objects that are likely to intersect with at least one of the one or more optical beams of the first FSO communication system; analyzing prior analyses or one or more prior captured images or video to determine, for each object of the one or more first objects, a movement path toward at least one of the one or more optical beams of the first FSO communication system; analyzing prior analyses or one or more prior captured images or video to determine, for each object of the one or more first objects, a movement path likely to intersect with at least one of the one or more optical beams of the first FSO communication system; analyzing prior analyses or one or more prior captured images or video to identify one or more individuals associated with each of at least one of the one or more first objects and determining contact information for each of the one or more individuals; analyzing prior analyses or one or more prior captured images or video to identify one or more entities associated with each of at least one of the one or more first objects and determining contact information for each of the one or more entities; analyzing prior analyses or one or more prior captured images or video to identify sources of potential interruption of the at least one of the one or more optical beams of the first FSO communication system that are due to at least one of location-specific causes, time of day-related causes, seasonal causes, lunar-based causes, time of year-related causes; or analyzing prior analyses or one or more prior captured images or video to determine the one or more first tasks in response to the proactive learning; and/or the like.

In such cases, autonomously initiating the one or more first tasks might comprise at least one of: broadcasting an audio message indicating to avoid the one or more optical beams in response to detecting people or human-operated machines or devices near the one or more optical beams and within range of the first FSO communication system; sending a digital communication indicating to avoid the one or more optical beams in response to detecting known individuals or entities or human-operated machines or devices controlled by the individuals or entities that are detected near the one or more optical beams; displaying a message on a display screen indicating to nearby people to avoid the one or more optical beams; projecting a message on a nearby surface indicating to nearby people to avoid the one or more optical beams; sending a message to a service provider with access to the first FSO communication system indicating to install rodent deterrent measures near or along a path of the one or more optical beams in response to detecting presence of one or more rodents near the one or more optical beams or near the first FSO communication system; sending a message to the service provider indicating to install bird deterrent measures near or along a path of the one or more optical beams in response to detecting presence of one or more birds near the one or more optical beams or near the first FSO communication system; sending a message to the service provider indicating to install insect deterrent measures near or along a path of the one or more optical beams in response to detecting presence of one or more insects near the one or more optical beams or near the first FSO communication system; sending a message to the service provider indicating to install animal deterrent measures near or along a path of the one or more optical beams in response to detecting presence of one or more animals near the one or more optical beams or near the first FSO communication system; sending a message to a pilot indicating to avoid flying into the one or more optical beams in response to detecting presence of an aircraft flying near the one or more optical beams; sending a message to an operator at an air traffic control center indicating to contact a pilot who is flying near the one or more optical beams to avoid flying into the one or more optical beams in response to detecting presence of an aircraft flying near the one or more optical beams; or sending a message to a service provider with access to the first FSO communication system indicating to implement weather-related contingency actions in response to detecting weather-related effects that are capable of disrupting the one or more optical beams near the one or more optical beams or near the first FSO communication system; and/or the like.

In an aspect, a method might comprise receiving, with a computing system, at least one of a plurality of images of an optical field of view of a first image capture device or a plurality of videos of the optical field of view of the first image capture device, the optical field of view comprising one or more optical beams of a first free-space optical ("FSO") communication system that are transmitted between the first FSO communication system and a second FSO communication system; autonomously analyzing, with the computing system, the at least one of the plurality of images of the optical field of view of the first image capture device or the plurality of videos of the optical field of view of the first image capture device to determine at least one of one or more preventative measures, one or more protective measures, or one or more avoidance measures to prevent interruption of the one or more optical beams of the first FSO communication system; and based on the analysis, autonomously initiating, with the computing system, the at least one of the one or more preventative measures, the one or more protective measures, or the one or more avoidance measures, and/or the like.

In some embodiments, the computing system might comprise at least one of a controller disposed within the first FSO communication system, an external controller system, a server computer over a network, a cloud-based computing system over a network, or a distributed computing system, and/or the like.

According to some embodiments, receiving the at least one of the plurality of images of the optical field of view of the first image capture device or the plurality of videos of the optical field of view of the first image capture device might comprise at least one of: receiving, with the computing system and from the first image capture device, the at least one of the plurality of images of the optical field of view of the first image capture device or the plurality of videos of the optical field of view of the first image capture device; or receiving, with the computing system and from a database, the at least one of the plurality of images of the optical field of view of the first image capture device or the plurality of videos of the optical field of view of the first image capture device; and/or the like.

In some embodiments, autonomously analyzing the at least one of the plurality of images of the optical field of view of the first image capture device or the plurality of videos of the optical field of view of the first image capture device might comprise autonomously analyzing, with the computing system, the at least one of the plurality of images of the optical field of view of the first image capture device or the plurality of videos of the optical field of view of the first image capture device in real-time or near-real-time to determine at least one of one or more preventative measures, one or more protective measures, or one or more avoidance measures, and/or the like.

Alternatively, or additionally, autonomously analyzing the at least one of the plurality of images of the optical field of view of the first image capture device or the plurality of videos of the optical field of view of the first image capture device might comprise autonomously analyzing, with the computing system and utilizing at least one of an artificial intelligence ("AI") system or a machine learning system, the at least one of the plurality of images of the optical field of view of the first image capture device or the plurality of videos of the optical field of view of the first image capture device to determine at least one of one or more preventative measures, one or more protective measures, or one or more avoidance measures, and/or the like.

According to some embodiments, autonomously initiating the at least one of the one or more preventative measures, the one or more protective measures, or the one or more avoidance measures might comprise at least one of: broadcasting an audio message indicating to avoid the one or more optical beams in response to detecting people or human-operated machines or devices near the one or more optical beams and within range of the first FSO communication system; sending a digital communication indicating to avoid the one or more optical beams in response to detecting known individuals or entities or human-operated machines or devices controlled by the individuals or entities that are detected near the one or more optical beams; displaying a message on a display screen indicating to nearby people to avoid the one or more optical beams; projecting a message on a nearby surface indicating to nearby people to avoid the one or more optical beams; sending a message to a service provider with access to the first FSO communication system indicating to install rodent deterrent measures near or along a path of the one or more optical beams in response to detecting presence of one or more rodents near the one or more optical beams or near the first FSO communication system; sending a message to the service provider indicating to install bird deterrent measures near or along a path of the one or more optical beams in response to detecting presence of one or more birds near the one or more optical beams or near the first FSO communication system; sending a message to the service provider indicating to install insect deterrent measures near or along a path of the one or more optical beams in response to detecting presence of one or more insects near the one or more optical beams or near the first FSO communication system; sending a message to the service provider indicating to install animal deterrent measures near or along a path of the one or more optical beams in response to detecting presence of one or more animals near the one or more optical beams or near the first FSO communication system; sending a message to a pilot indicating to avoid flying into the one or more optical beams in response to detecting presence of an aircraft flying near the one or more optical beams; sending a message to an operator at an air traffic control center indicating to contact a pilot who is flying near the one or more optical beams to avoid flying into the one or more optical beams in response to detecting presence of an aircraft flying near the one or more optical beams; or sending a message to a service provider with access to the first FSO communication system indicating to implement weather-related contingency actions in response to detecting weather-related effects that are capable of disrupting the one or more optical beams near the one or more optical beams or near the first FSO communication system; and/or the like.

In some embodiments, autonomously initiating the at least one of the one or more preventative measures, the one or more protective measures, or the one or more avoidance measures might comprise: causing the first FSO communication system to preemptively send data that are sent over the at least one of the one or more optical beams over a secondary link. In some instances, the secondary link might comprise one of a radio link, a millimeter wave link, a microwave link, or a secondary optical link directed in a different direction, and/or the like.

In another aspect, an apparatus might comprise at least one processor and a non-transitory computer readable medium communicatively coupled to the at least one processor. The non-transitory computer readable medium might have stored thereon computer software comprising a set of instructions that, when executed by the at least one processor, causes the apparatus to: receive at least one of a plurality of images of an optical field of view of a first image capture device or a plurality of videos of the optical field of view of the first image capture device, the optical field of view comprising one or more optical beams of a first free-space optical ("FSO") communication system that are transmitted between the first FSO communication system and a second FSO communication system; autonomously analyze the at least one of the plurality of images of the optical field of view of the first image capture device or the plurality of videos of the optical field of view of the first image capture device to determine at least one of one or more preventative measures, one or more protective measures, or one or more avoidance measures to prevent interruption of the one or more optical beams of the first FSO communication system; and based on the analysis, autonomously initiate the at least one of the one or more preventative measures, the one or more protective measures, or the one or more avoidance measures, and/or the like.

In some embodiments, the apparatus might comprise at least one of a controller disposed within the first FSO communication system, an external controller system, a server computer over a network, a cloud-based computing system over a network, or a distributed computing system, and/or the like.

In yet another aspect, a system might comprise a computing system, which might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the computing system to: receive at least one of a plurality of images of an optical field of view of a first image capture device or a plurality of videos of the optical field of view of the first image capture device, the optical field of view comprising one or more optical beams of a first free-space optical ("FSO") communication system that are transmitted between the first FSO communication system and a second FSO communication system; autonomously analyze the at least one of the plurality of images of the optical field of view of the first image capture device or the plurality of videos of the optical field of view of the first image capture device to determine at least one of one or more preventative measures, one or more protective measures, or one or more avoidance measures to prevent interruption of the one or more optical beams of the first FSO communication system; and based on the analysis, autonomously initiate the at least one of the one or more preventative measures, the one or more protective measures, or the one or more avoidance measures.

In some embodiments, the system might further comprise the first image capture device configured to capture the at least one of the plurality of images of the optical field of view of the first image capture device or the plurality of videos of the optical field of view of the first image capture device.

According to some embodiments, the computing system might comprise at least one of a controller disposed within the first FSO communication system, an external controller system, a server computer over a network, a cloud-based computing system over a network, or a distributed computing system, and/or the like.

In some embodiments, receiving the at least one of the plurality of images of the optical field of view of the first image capture device or the plurality of videos of the optical field of view of the first image capture device might comprise at least one of: receiving, from the first image capture device, the at least one of the plurality of images of the optical field of view of the first image capture device or the plurality of videos of the optical field of view of the first image capture device; or receiving, from a database, the at least one of the plurality of images of the optical field of view of the first image capture device or the plurality of videos of the optical field of view of the first image capture device; and/or the like.

According to some embodiments, autonomously analyzing the at least one of the plurality of images of the optical field of view of the first image capture device or the plurality of videos of the optical field of view of the first image capture device might comprise autonomously analyzing the at least one of the plurality of images of the optical field of view of the first image capture device or the plurality of videos of the optical field of view of the first image capture device in real-time or near-real-time to determine at least one of one or more preventative measures, one or more protective measures, or one or more avoidance measures, and/or the like.

Alternatively, or additionally, autonomously analyzing the at least one of the plurality of images of the optical field of view of the first image capture device or the plurality of videos of the optical field of view of the first image capture device might comprise autonomously analyzing, utilizing at least one of an artificial intelligence ("AI") system or a machine learning system, the at least one of the plurality of images of the optical field of view of the first image capture device or the plurality of videos of the optical field of view of the first image capture device to determine at least one of one or more preventative measures, one or more protective measures, or one or more avoidance measures, and/or the like.

In some embodiments, autonomously initiating the at least one of the one or more preventative measures, the one or more protective measures, or the one or more avoidance measures, and/or the like, might comprise at least one of: broadcasting an audio message indicating to avoid the one or more optical beams in response to detecting people or human-operated machines or devices near the one or more optical beams and within range of the first FSO communication system; sending a digital communication indicating to avoid the one or more optical beams in response to detecting known individuals or entities or human-operated machines or devices controlled by the individuals or entities that are detected near the one or more optical beams; displaying a message on a display screen indicating to nearby people to avoid the one or more optical beams; projecting a message on a nearby surface indicating to nearby people to avoid the one or more optical beams; sending a message to a service provider with access to the first FSO communication system indicating to install rodent deterrent measures near or along a path of the one or more optical beams in response to detecting presence of one or more rodents near the one or more optical beams or near the first FSO communication system; sending a message to the service provider indicating to install bird deterrent measures near or along a path of the one or more optical beams in response to detecting presence of one or more birds near the one or more optical beams or near the first FSO communication system; sending a message to the service provider indicating to install insect deterrent measures near or along a path of the one or more optical beams in response to detecting presence of one or more insects near the one or more optical beams or near the first FSO communication system; sending a message to the service provider indicating to install animal deterrent measures near or along a path of the one or more optical beams in response to detecting presence of one or more animals near the one or more optical beams or near the first FSO communication system; sending a message to a pilot indicating to avoid flying into the one or more optical beams in response to detecting presence of an aircraft flying near the one or more optical beams; sending a message to an operator at an air traffic control center indicating to contact a pilot who is flying near the one or more optical beams to avoid flying into the one or more optical beams in response to detecting presence of an aircraft flying near the one or more optical beams; sending a message to a service provider with access to the first FSO communication system indicating to implement weather-related contingency actions in response to detecting weather-related effects that are capable of disrupting the one or more optical beams near the one or more optical beams or near the first FSO communication system; and/or the like.

According to some embodiments, autonomously initiating the at least one of the one or more preventative measures, the one or more protective measures, or the one or more avoidance measures might comprise: causing the first FSO communication system to preemptively send data that are sent over the at least one of the one or more optical beams over a secondary link. In some instances, the secondary link might comprise one of a radio link, a millimeter wave link, a microwave link, or a secondary optical link directed in a different direction, and/or the like.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-6 illustrate some of the features of the method, system, and apparatus for implementing free-space optical ("FSO") communication systems, and, more particularly, to methods, systems, and apparatuses for implementing visual impairment detection for FSO communication systems, as referred to above. The methods, systems, and apparatuses illustrated by FIGS. 1-6 refer to examples of different embodiments that include various components and steps, which can be considered alternatives or which can be used in conjunction with one another in the various embodiments. The description of the illustrated methods, systems, and apparatuses shown in FIGS. 1-6 is provided for purposes of illustration and should not be considered to limit the scope of the different embodiments.

With reference to the figures, FIG. 1 is a schematic diagram illustrating a system 100 for implementing visual impairment detection for free-space optical ("FSO") communication systems, in accordance with various embodiments.

In the non-limiting embodiment of FIG. 1, system 100 might comprise a plurality of FSO communication systems 105 (including, but not limited to, a first FSO communication system 105*a* and a second FSO communication system 105*b*) that transmit or receive one or more optical beams 110 between two or more of the plurality of FSO communication systems 105. In some instances, the first and second FSO communication systems 105*a* and 105*b* might be disposed a distance d apart from each other. In some cases, at least one of the one or more optical beams 110 may be potentially interrupted or intersected by one or more objects 115*a*-115*n* (collectively, "objects 115" or the like) that are moving along one or more movement paths (depicted by arrows 120). According to some embodiments, the one or more objects 115 might each include, without limitation, one of a person, a bird, an animal (e.g., rodent, cat, other mammal, reptile, etc.), an insect, a human-operated machine or device (e.g., crane, drone, kite, aircraft, etc.), or an autonomous machine or device (e.g., autonomous drone, etc.), and/or the like. System 100 might further comprise a plurality of cameras 125 (including, without limitation, cameras 125*a* and 125*b*, or the like), each having a field of view ("FOV") 130 (e.g., FOVs 130*a* and 130*b* for cameras 125*a* and 125*b*, respectively), which might define an angle 135 (e.g., angles 135a and 135b, respectively) that is rotated about a 360 degree direction about an axis that is normal to the lens of each camera 125.

In some embodiments, system 100 might further comprise a plurality of computing systems 140 (including, but not limited to, computing systems 140a and 140b, or the like) and corresponding database(s) 145 (including, without limitation, databases 145a and 145b, or the like). In some instances, the computing systems 140 might each include, but is not limited to, at least one of a controller disposed within the first FSO communication system, an external controller system, a server computer over a network, a cloud-based computing system over a network, or a distributed computing system, and/or the like. System 100 might further comprise one or more networks 150 that might communicatively couple with each of at least one of the plurality of FSO communication systems 105, the plurality of computing systems 140, and (in some cases) the plurality of cameras 125.

In some cases, the one or more networks 150 might each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network(s) 150 might include an access network of the service provider (e.g., an Internet service provider ("ISP")). In another embodiment, the network(s) 150 might include a core network of the service provider, and/or the Internet.

According to some embodiments, system 100 might further comprise computing system(s) 155 and corresponding database(s) 160. In some instances, computing system(s) 155 might include, but is not limited to, at least one of a controller, a management system, an image analysis system, and/or the like. System 100 might further comprise at least one of an artificial intelligence ("AI") system or a machine learning system 165. In some embodiments, system 100 might further comprise a plurality of secondary communication systems 170 (including, without limitation, first secondary communication system(s) 170a, second secondary communication system(s) 170b, or the like) that are configured to transmit and receive data to and from each other via secondary communications links (depicted by double-headed solid arrow 175). In some cases, system 100 might further comprise one or more user devices 180 (e.g., user devices 180a and/or 180b, or the like) and/or one or more display screens 185 (e.g., display screens 185a and/or 185b, or the like), each used by, or associated with, one or more entities 190 (e.g., entities 190a and/or 190b, or the like). According to some embodiments, system 100 might further comprise one or more prevention systems 195. In some cases, the one or more networks 150 might communicatively couple with each of at least one of the computing system(s) 155, the database(s) 160, the at least one of the AI system or machine learning system 165, the one or more user devices 180, the one or more display screens 185, the one or more prevention systems 195, and/or (in some cases) the plurality of secondary communication systems 170.

Merely by way of example, in some instances, the plurality of secondary communication systems 170 might each include, but is not limited to, one of a radio communication system(s), a millimeter wave communication system(s), a microwave communication system(s), or a secondary optical communication system(s), and/or the like. In some cases, the secondary communications links 175 might correspondingly include, without limitation, one of a radio link, a millimeter wave link, a microwave link, or a secondary optical link directed in a different direction from any of the FSO communication systems 105, and/or the like. In some instances, the one or more user devices 180 might each include, but is not limited to, one of a laptop computer, a tablet computer, a smart phone, a mobile phone, or a portable terminal, and/or the like. In some cases, the one or more display screens 185 might each include without limitation, one of a television set, a smart television, a computer monitor, a laptop monitor, or a screen of a user device 180, and/or the like. In some instances, the one or more entities 190 might each include, but is not limited to, at least one of an agent(s) of a service provider (e.g., service provider of the FSO communication system 105, service provider of visual impairment detectors for the FSO communication system 105, etc.), a known individual(s) associated with at least one of the objects 115, an identified individual(s) associated with at least one of the objects 115, an agent of a company(ies) associated with at least one of the objects 115, an operator of a crane moving near optical beams 110 of the FSO communication system 105, a company associated with a crane moving near optical beams 110 of the FSO communication system 105, an operator of a drone moving near optical beams 110 of the FSO communication system 105, an owner associated with a drone moving near optical beams 110 of the FSO communication system 105, a person associated with a drone moving near optical beams 110 of the FSO communication system 105, a pilot flying an aircraft moving near optical beams 110 of the FSO communication system 105, or an air traffic controller in contact with a pilot flying an aircraft moving near optical beams 110 of the FSO communication system 105, and/or the like.

Communication links based on FSO technologies require a clear line of sight for operation. Interference with the optical communication beam may lead to a sudden drop of signal quality, potentially causing transmission errors due to a lower signal to noise ratio. If the beam is entirely interrupted, the result is a complete loss of signal. Such events generally require fallback to a different communication method (e.g., secondary optical link directed in a different direction, radio link, millimeter wave link, or microwave link, or the like) or routing (or rerouting) the network connection.

Service subscribers and network operators typically negotiate so-called service level agreements ("SLAs") that specify the availability of a communication link. Communication link availability is typically specified as the percentage time that a link is up and running over the course of a year. Higher link availability rates command higher prices for communication services. In addition, service subscribers and network operators typically work out a fee schedule related to service interruptions. Fines associated with service interruptions of expensive high-availability links can potentially be severe.

Errors in the communication signal or a complete loss of signal, even temporarily, are a likely cause for violation of the SLA. Thus, it is of utmost importance for both network providers as well as service subscribers to understand the nature of service interruption events. Insight into specific causes of communication link interference or interruption may enable either or both parties to take evasive action in the future.

Beam interruption events can have natural as well as man-made causes. Some examples in relation to FSO communication systems might include, without limitation, maintenance personnel present on building rooftops who are walking in front of the FSO device; construction equipment such as moving cranes or cranes lifting loads that obstruct the beams of the FSO device; animals (e.g., rodents, small mammals, birds, insects, etc.) that are present on building rooftops and moving in front of the FSO device; birds or insects flying through beam paths; aircraft flying through beam paths; a wide variety of recreational devices (e.g., drones, model aircraft, kites, etc.) that are flying through beam paths; cloud or fog patches (or other weather-related particles, or the like) moving across beams of the FSO device; and/or the like.

Although some of these types of events might be outside the network provider's as well as the service subscriber's control, the use of the various embodiments might allow a party to make decisions and to take action to minimize the future impact of such events. Other events might be within control of either the network operator or the subscriber, and such events can be addressed via different installations, via site improvements, by controlling access to the vicinity of operating FSO units, by adding redundancy, or by potentially enable development of relevant technology in the future, and/or the like.

In case of a service interruption with associated SLA violation, it may be beneficial to all involved parties to have detailed knowledge about the exact type and cause of the event. Knowing what kind of object has interrupted the beam of an FSO communication system can be of tremendous help in resolving issues related to potential SLA violations in a timely and efficient manner.

In operation, an image capture device or camera 125a might capture, monitor, or record one or more first images (which might include, but is not limited to, images, groups of images, or videos, and/or the like) of an optical field of view (e.g., FOV 130a) of the first image capture device or camera 125a, the optical field of view comprising or containing one or more optical beams (e.g., optical beams 110) of a first FSO communication system 105a that are transmitted between the first FSO communication system 105a and a second FSO communication system 105b. The computing system 140a, computing system 140b, computing system(s) 155, and/or AI system 165 (collectively, "computing system" or the like) might receive the captured one or more first images from the first image capture device or camera 125a, and might autonomously analyze the captured one or more first images to determine whether one or more first objects (e.g., at least one of objects 115a-115n, or the like) are moving within proximity to at least one of the one or more optical beams (e.g., optical beams 110) of the first FSO communication system 105a (and/or the second FSO communication system 105b). Based on a determination that one or more first objects are moving within proximity to at least one of the one or more optical beams of the first FSO communication 105a (and/or the second FSO communication system 105b), the computing system might autonomously initiate one or more first tasks.

Figure 2A:
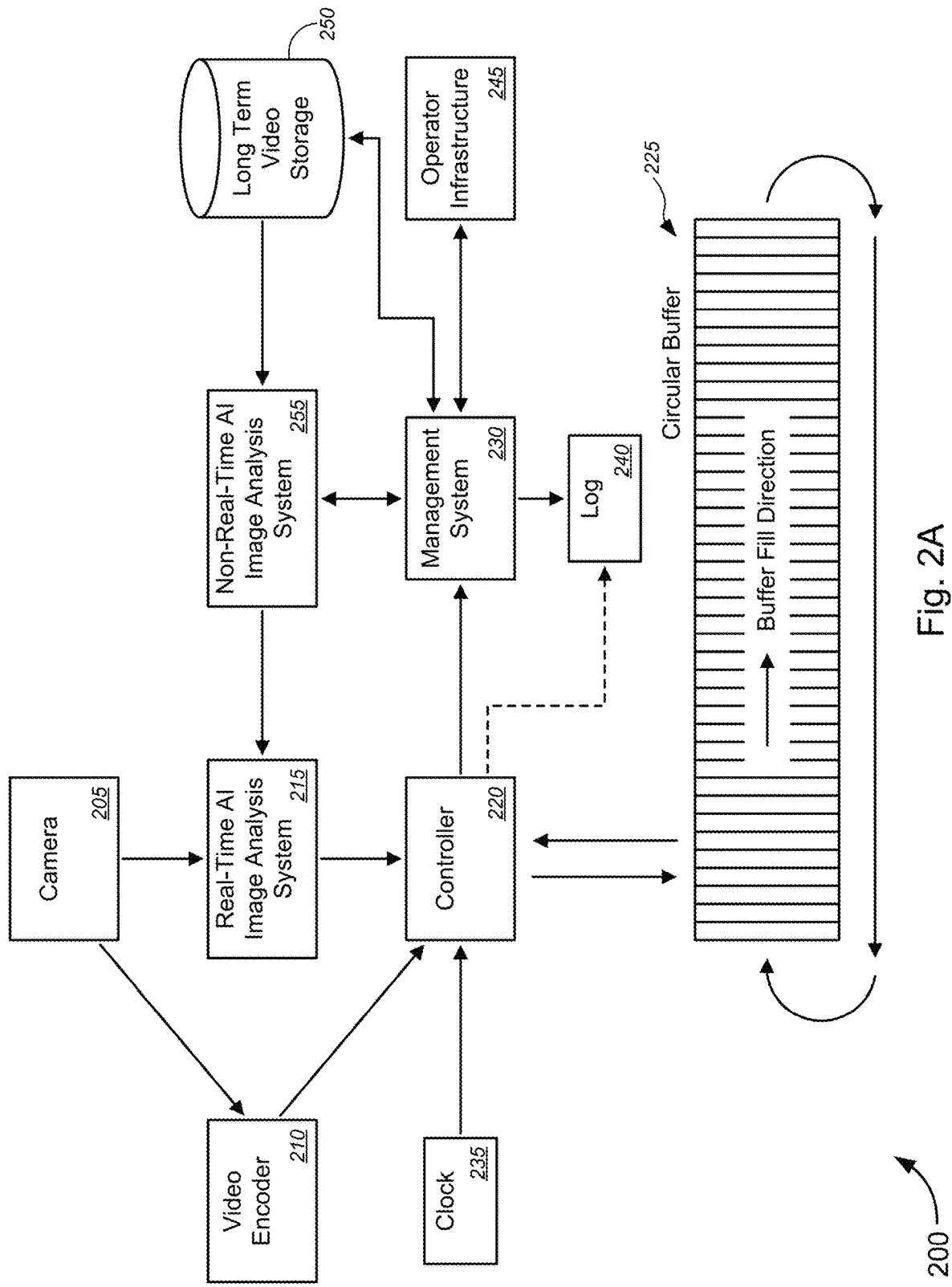
FIGS. 2A and 2B are system flow diagrams illustrating a non-limiting example of a method for implementing visual impairment detection for FSO communication systems, in accordance with various embodiments.
Figure 2B:
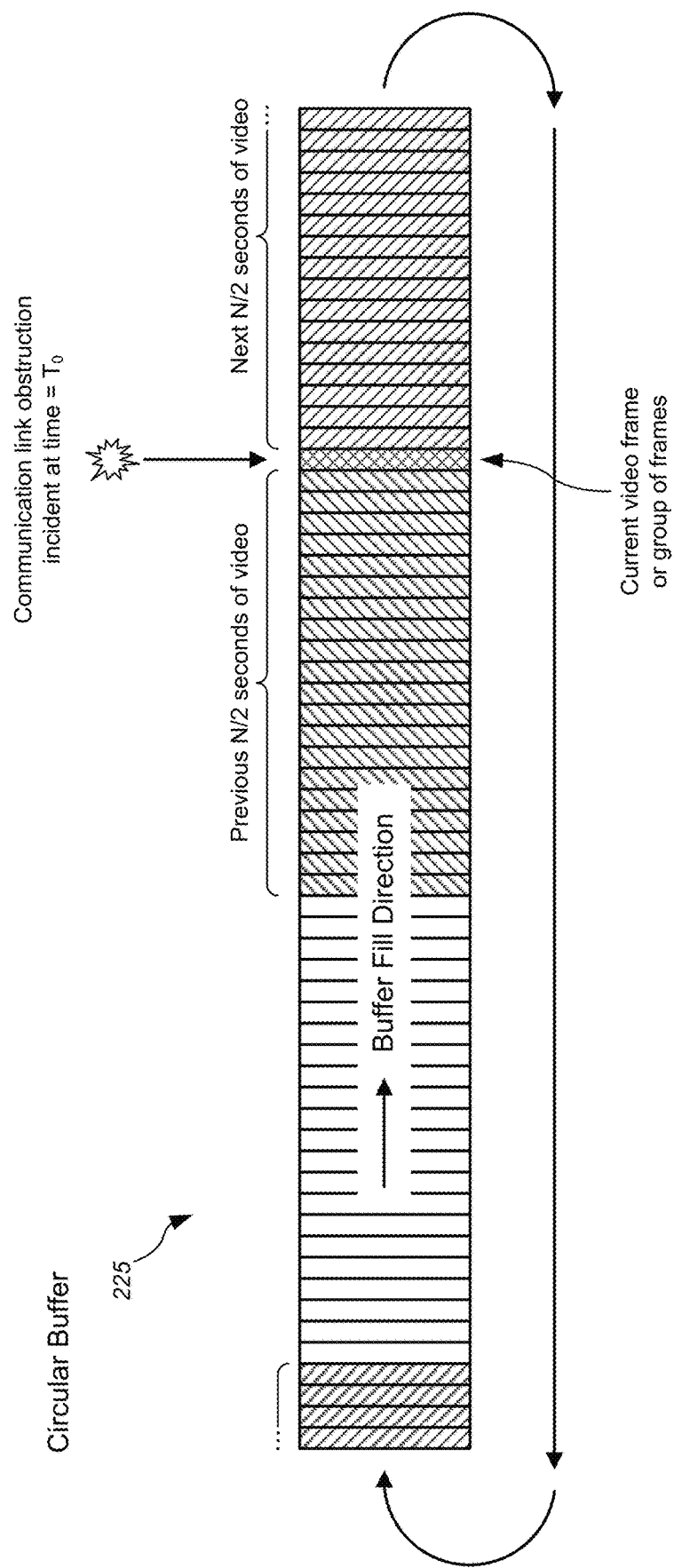
Figure 3B:
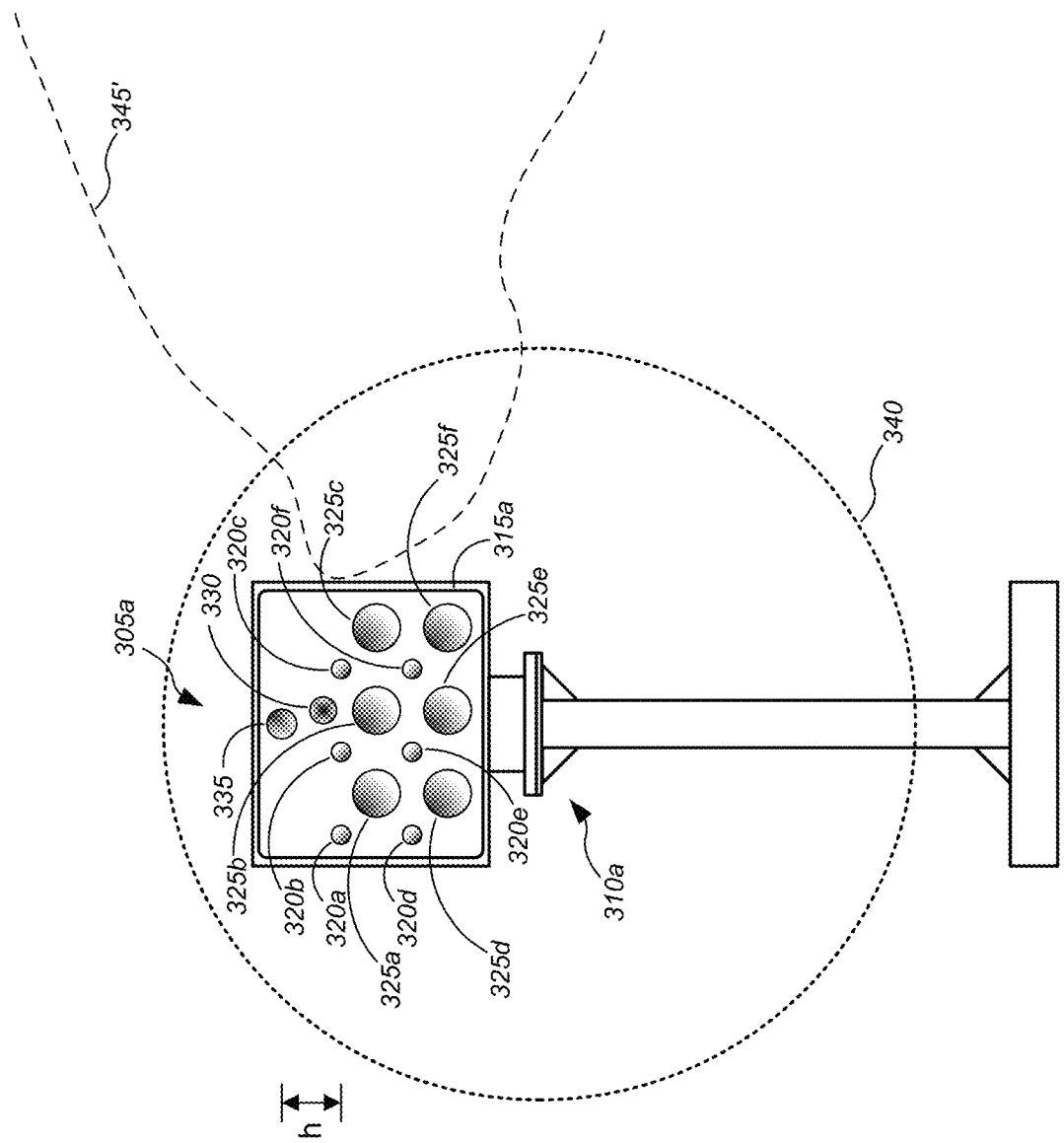

In some embodiments, capturing the one or more first images of the optical field of view of the first image capture device or camera 125a might comprise at least one of capturing a first set of still images of the optical field of view of the first image capture device or camera 125a beginning at a first period (e.g., N/2 seconds in the case of a video sequence having a total length of N seconds, as shown in FIG. 2B, or the like) prior to the one or more first objects moving to a position that is closest to the at least one of the one or more optical beams of the first FSO communication system, capturing a second set of still images of the optical field of view of the first image capture device or camera 125a ending at a second period (e.g., N/2 seconds in the case of a video sequence having a total length of N seconds, as shown in FIG. 2B, or the like) after the one or more first objects have moved to the position that is closest to the at least one of the one or more optical beams of the first FSO communication system, capturing a first video of the optical field of view of the first image capture device or camera 125a a third period (e.g., N/2 seconds in the case of a video sequence having a total length of N seconds, as shown in FIG. 2B, or the like) prior to the one or more first objects moving to the position that is closest to the at least one of the one or more optical beams of the first FSO communication system, capturing a second video of the optical field of view of the first image capture device or camera 125a a fourth period (e.g., N/2 seconds in the case of a video sequence having a total length of N seconds, as shown in FIG. 2B, or the like) after the one or more first objects have moved to the position that is closest to the at least one of the one or more optical beams of the first FSO communication system, or continuously capturing a third video of the optical field of view of the first image capture device or camera 125a, and/or the like. Herein, "a position that is closest to the at least one of the one or more optical beams" might refer to one of a position that overlaps with the at least one of the one or more optical beams in the case that the object intersects, obstructs, or interrupts the at least one of the one or more optical beams (such as shown in FIG. 3A, or the like) or a position along the object's movement path that is the shortest distance from the at least one of the one or more optical beams in the case that the object moves towards, then away from (while missing), the at least one of the one or more optical beams (such as shown in FIG. 3B, or the like). Herein also, the first through fourth periods may be either predetermined (e.g., preset or pre-configured by the computing system or by a human operator, etc.) or dynamically determined by the computing system (e.g., based on analysis by the computing system regarding the amount of time that the one or more objects remain within the optical field of view, or other factors, etc.).

Alternatively, or additionally, capturing the one or more first images of the optical field of view of the first image capture device or camera 125a might comprise at least one of capturing one or more infrared ("IR") images of the optical field of view of the first image capture device or camera 125a, capturing one or more ultraviolet ("UV") images of the optical field of view of the first image capture device or camera 125a, capturing one or more visible spectrum images of the optical field of view of the first image capture device or camera 125a, or capturing one or more filtered images of the optical field of view of the first image capture device, and/or the like. The one or more filtered images might be filtered to dampen, attenuate, or filter out light emitted by the one or more optical beams. For example, if the one or more optical beams have a particular wavelength range within the IR spectrum, the camera 125 might utilize a filter that filters out, attenuates, or dampens that particular wavelength range or a portion of that particular wavelength range. In some embodiments, the camera image could be split up and sent towards different imaging sensors sensitive to different wavelength regions, or the like.

According to some embodiments, autonomously analyzing the captured one or more first images might comprise autonomously analyzing the captured one or more first images in real-time or near-real-time to determine whether the one or more first objects are moving within proximity to the at least one of the one or more optical beams of the first FSO communication system 105a (and/or the second FSO communication system 105b). Alternatively, or additionally, autonomously analyzing the captured one or more first images might comprise autonomously analyzing, utilizing the AI system 165, the captured one or more first images to determine whether the one or more first objects are moving within proximity to the at least one of the one or more optical beams of the first FSO communication system 105a (and/or the second FSO communication system 105b).

In some embodiments, autonomously analyzing the captured one or more first images might comprise autonomously analyzing the captured one or more first images to determine, for each object of the one or more first objects (e.g., objects 115a-115n, or the like), a movement path (e.g., movement paths 120, or the like). The computing system might then determine whether the movement path, for each object of the one or more first objects, has intersected or is likely to intersect with at least one of the one or more optical beams of the first FSO communication 105a (and/or the second FSO communication system 105b). Based on such a determination, the computing system might autonomously initiate the one or more first tasks.

Merely by way of example, in some cases, initiating the one or more first tasks might include, without limitation, at least one of causing the first FSO communication system to send or resend data that are sent over the at least one of the one or more optical beams over a secondary link (e.g., using the secondary communication systems 170, or the like), sending a message to one or more individuals regarding the proximity of the one or more first objects to the at least one of the one or more optical beams of the first FSO communication 105a (and/or the second FSO communication system 105b), sending a message to one or more law enforcement agents regarding the proximity of the one or more first objects to the at least one of the one or more optical beams of the first FSO communication 105a (and/or the second FSO communication system 105b), or notifying one or more entities (e.g., entities 190, or the like) associated with the one or more first objects (e.g., objects 115a-115n, or the like), and/or the like.

According to some embodiments, the computing system might store the captured one or more first images of the optical field of view of the first image capture device or camera 125a in a datastore (e.g., database(s) 145a, database(s) 145b, and/or database(s) 160, or the like). In some cases, a video encoder (such as video encoder 210 of FIG. 2A, or the like) might compress the captured one or more first images of the optical field of view of the first image capture device prior to storing the captured one or more first images in the datastore. With the captured one or more first images (as well as other similar images that are captured over time) being stored in the datastore, rather than directly receiving the captured one or more first images from the image capture device or camera 125a, the computing system might access or retrieve at least one of the captured one or more first images of the optical field of view of the first image capture device or camera 125a or one or more second images of the optical field of view of the first image capture device or 125b. The computing system might then decode the captured one or more first images or the one or more second images, and might perform detailed analysis of the accessed and decoded at least one of the captured one or more first images of the optical field of view of the first image capture device or the one or more second images of the optical field of view of the first image capture device to determine at least one of one or more preventative measures, one or more protective measures, or one or more avoidance measures, and/or the like.

Merely by way of example, in some instances, the at least one of the one or more preventative measures, the one or more protective measures, or the one or more avoidance measures, and/or the like, might include, but is not limited to, at least one of broadcasting an audio message indicating to avoid the one or more optical beams in response to detecting people or human-operated machines or devices near the one or more optical beams and within range of the first FSO communication system 105a (and/or the second FSO communication system 105b), sending a digital communication indicating to avoid the one or more optical beams in response to detecting known individuals or entities or human-operated machines or devices controlled by the individuals or entities that are detected near the one or more optical beams, displaying a message on a display screen indicating to nearby people to avoid the one or more optical beams, projecting a message on a nearby surface indicating to nearby people to avoid the one or more optical beams, sending a message to a service provider with access to the first FSO communication system 105a (and/or the second FSO communication system 105b) indicating to install rodent deterrent measures near or along a path of the one or more optical beams in response to detecting presence of one or more rodents near the one or more optical beams or near the first FSO communication system 105a (and/or the second FSO communication system 105b), sending a message to the service provider indicating to install bird deterrent measures near or along a path of the one or more optical beams in response to detecting presence of one or more birds near the one or more optical beams or near the first FSO communication system 105a (and/or the second FSO communication system 105b), sending a message to the service provider indicating to install insect deterrent measures near or along a path of the one or more optical beams in response to detecting presence of one or more insects near the one or more optical beams or near the first FSO communication system 105a (and/or the second FSO communication system 105b), sending a message to the service provider indicating to install animal deterrent measures near or along a path of the one or more optical beams in response to detecting presence of one or more animals near the one or more optical beams or near the first FSO communication system 105a (and/or the second FSO communication system 105b), sending a message to a pilot indicating to avoid flying into the one or more optical beams in response to detecting presence of an aircraft flying near the one or more optical beams, sending a message to an operator at an air traffic control center indicating to contact a pilot who is flying near the one or more optical beams to avoid flying into the one or more optical beams in response to detecting presence of an aircraft flying near the one or more optical beams, or sending a message to a service provider with access to the first FSO communication system 105a (and/or the second FSO communication system 105b) indicating to implement weather-related contingency actions (e.g., rerouting FSO beams through clear air paths, using secondary non-optical links (e.g., using second communication systems 170, or the like), delaying signal transmission until the weather-related event passes, etc.) in response to detecting weather-related effects (e.g., effects due to dust clouds, smog, fog, clouds, rain, sleet, hail, snow, blizzard, tornado, hurricane, etc.) that are capable of disrupting the one or more optical beams (e.g., optical beams 110, or the like) near the one or more optical beams or near the first FSO communication system 105 (and/or the second FSO communication system 105*b*), and/or the like. In some cases, the system might also detect disruption due to an earthquake, which might cause misalignment with the second FSO communication system 105*b*, where the camera might capture images or video that shows the background changing around the optical beam paths, or the like.

In some aspects, the computing system might receive, either from the first image capture device (or camera 125*a*) or from the database, at least one of one or more first images of the optical field of view of the first image capture device or camera 125*a* or one or more first videos of the optical field of view of the first image capture device or camera 125*a*. The computing system might receive the captured one or more first images from the first image capture device or camera 125*a*, and might autonomously analyze the captured at least one of the one or more first images or the one or more first videos to perform at least one of reactive learning regarding potential interruption of at least one of one or more optical beams (e.g., optical beams 110) of the first FSO communication 105*a* (and/or the second FSO communication system 105*b*) or proactive learning regarding potential interruption of the at least one of the one or more optical beams (e.g., optical beams 110) of the first FSO communication 105*a* (and/or the second FSO communication system 105*b*). Based on the analysis, the computing system might autonomously initiate the one or more second tasks.

According to some embodiments, autonomously analyzing the at least one of the one or more first images of the optical field of view of the first image capture device or camera 125*a* or the one or more first videos of the optical field of view of the first image capture device or camera 125*a* might comprise autonomously analyzing the at least one of the one or more first images of the optical field of view of the first image capture device or the one or more first videos of the optical field of view of the first image capture device or camera 125*a* in real-time or near-real-time to perform at least one of reactive learning regarding potential interruption of at least one of one or more optical beams (e.g., optical beams 110) of the first FSO communication 105*a* (and/or the second FSO communication system 105*b*) or proactive learning regarding potential interruption of the at least one of the one or more optical beams (e.g., optical beams 110) of the first FSO communication 105*a* (and/or the second FSO communication system 105*b*). Alternatively, or additionally, autonomously analyzing the at least one of the one or more first images of the optical field of view of the first image capture device or camera 125*a* or the one or more first videos of the optical field of view of the first image capture device or camera 125*a* might comprise autonomously analyzing, utilizing the AI system 165, the at least one of the one or more first images of the optical field of view of the first image capture device or camera 125*a* or the one or more first videos of the optical field of view of the first image capture device or camera 125*a* to perform at least one of reactive learning regarding potential interruption of at least one of one or more optical beams (e.g., optical beams 110) of the first FSO communication 105*a* (and/or the second FSO communication system 105*b*) or proactive learning regarding potential interruption of the at least one of the one or more optical beams (e.g., optical beams 110) of the first FSO communication 105*a* (and/or the second FSO communication system 105*b*).

Merely by way of example, in some cases, the reactive learning regarding potential interruption of the at least one of the one or more optical beams of the first FSO communication 105*a* (and/or the second FSO communication system 105*b*) might include, without limitation, at least one of: identifying one or more first objects that have moved or are moving within proximity to at least one of the one or more optical beams of the first FSO communication system 105*a* (and/or the second FSO communication system 105*b*); identifying one or more first objects that have intersected or are intersecting with at least one of the one or more optical beams of the first FSO communication system 105*a* (and/or the second FSO communication system 105*b*); determining, for each object of the one or more first objects, a movement path near at least one of the one or more optical beams of the first FSO communication system 105*a* (and/or the second FSO communication system 105*b*); determining, for each object of the one or more first objects, a movement path intersecting with at least one of the one or more optical beams of the first FSO communication system 105*a* (and/or the second FSO communication system 105*b*); identifying one or more individuals associated with each of at least one of the one or more first objects and determining contact information for each of the one or more individuals; identifying one or more entities associated with each of at least one of the one or more first objects and determining contact information for each of the one or more entities; or determining the one or more second tasks in response to the reactive learning; and/or the like.

In such cases, autonomously initiating the one or more second tasks might include, but are not limited to, at least one of: causing the first FSO communication system 105*a* (and/or the second FSO communication system 105*b*) to send or resend data that are sent over the at least one of the one or more optical beams over a secondary link (e.g., using the secondary communication systems 170, or the like); sending a message to one or more individuals regarding the proximity of the one or more first objects to the at least one of the one or more optical beams of the first FSO communication 105*a* (and/or the second FSO communication system 105*b*); sending a message to one or more law enforcement agents regarding the proximity of the one or more first objects to the at least one of the one or more optical beams of the first FSO communication 105*a* (and/or the second FSO communication system 105*b*); or notifying one or more entities associated with the one or more first objects regarding the proximity of the one or more first objects (e.g., objects 115*a*-115*n*, or the like) to the at least one of the one or more optical beams of the first FSO communication 105*a* (and/or the second FSO communication system 105*b*); and/or the like.

In some embodiments, the proactive learning regarding potential interruption of the at least one of the one or more optical beams of the first FSO communication 105*a* (and/or the second FSO communication system 105*b*) might include, without limitation, at least one of: analyzing prior analyses or one or more prior captured images or video to identify one or more first objects (e.g., objects 115*a*-115*n*, or the like) that are likely to move within proximity to at least one of the one or more optical beams of the first FSO communication system 105*a* (and/or the second FSO communication system 105*b*); analyzing prior analyses or one or more prior captured images or video to identify one or more first objects (e.g., objects 115*a*-115*n*, or the like) that are likely to intersect with at least one of the one or more optical beams (e.g., optical beams 110) of the first FSO communication system 105*a* (and/or the second FSO communication system 105*b*); analyzing prior analyses or one or more prior captured images or video to determine, for each object of the one or more first objects (e.g., objects 115*a*-115*n*, or the like), a movement path toward at least one of the one or more optical beams (e.g., optical beams 110) of the first FSO communication system 105*a* (and/or the second FSO communication system 105*b*); analyzing prior analyses or one or more prior captured images or video to determine, for each object of the one or more first objects (e.g., objects 115*a*-115*n*, or the like), a movement path likely to intersect with at least one of the one or more optical beams of the first FSO communication system 105*a* (and/or the second FSO communication system 105*b*); analyzing prior analyses or one or more prior captured images or video to identify one or more individuals associated with each of at least one of the one or more first objects (e.g., objects 115*a*-115*n*, or the like) and determining contact information for each of the one or more individuals; analyzing prior analyses or one or more prior captured images or video to identify one or more entities associated with each of at least one of the one or more first objects (e.g., objects 115*a*-115*n*, or the like) and determining contact information for each of the one or more entities; analyzing prior analyses or one or more prior captured images or video to identify one or more potential interruption of the at least one of the one or more optical beams (e.g., optical beams 110) of the first FSO communication system 105*a* (and/or the second FSO communication system 105*b*) that are due to at least one of location-specific causes, time of day-related causes, seasonal causes, lunar-based causes, time of year-related causes; or analyzing prior analyses or one or more prior captured images or video to determine the one or more second tasks in response to the proactive learning; and/or the like.

In such embodiments, autonomously initiating the one or more second tasks might include, but are not limited to, at least one of: broadcasting an audio message indicating to avoid the one or more optical beams (e.g., optical beams 110) in response to detecting people or human-operated machines or devices near the one or more optical beams (e.g., optical beams 110) and within range of the first FSO communication system 105*a* (and/or the second FSO communication system 105*b*); sending a digital communication indicating to avoid the one or more optical beams (e.g., optical beams 110) in response to detecting known individuals or entities or human-operated machines or devices controlled by the individuals or entities that are detected near the one or more optical beams (e.g., optical beams 110); displaying a message on a display screen (e.g., display screen(s) 185*a*, or the like) indicating to nearby people to avoid the one or more optical beams (e.g., optical beams 110); projecting a message on a nearby surface indicating to nearby people to avoid the one or more optical beams (e.g., optical beams 110); sending a message to a service provider with access to the first FSO communication system 105*a* (and/or the second FSO communication system 105*b*) indicating to install rodent deterrent measures near or along a path of the one or more optical beams (e.g., optical beams 110) in response to detecting presence of one or more rodents near the one or more optical beams (e.g., optical beams 110) or near the first FSO communication system 105*a* (and/or the second FSO communication system 105*b*); sending a message to the service provider indicating to install bird deterrent measures near or along a path of the one or more optical beams (e.g., optical beams 110) in response to detecting presence of one or more birds near the one or more optical beams (e.g., optical beams 110) or near the first FSO communication system 105*a* (and/or the second FSO communication system 105*b*); sending a message to the service provider indicating to install insect deterrent measures near or along a path of the one or more optical beams (e.g., optical beams 110) in response to detecting presence of one or more insects near the one or more optical beams (e.g., optical beams 110) or near the first FSO communication system 105*a* (and/or the second FSO communication system 105*b*); sending a message to the service provider indicating to install animal deterrent measures near or along a path of the one or more optical beams (e.g., optical beams 110) in response to detecting presence of one or more animals near the one or more optical beams (e.g., optical beams 110) or near the first FSO communication system 105*a* (and/or the second FSO communication system 105*b*); sending a message to a pilot indicating to avoid flying into the one or more optical beams (e.g., optical beams 110) in response to detecting presence of an aircraft flying near the one or more optical beams (e.g., optical beams 110); sending a message to an operator at an air traffic control center indicating to contact a pilot who is flying near the one or more optical beams (e.g., optical beams 110) to avoid flying into the one or more optical beams (e.g., optical beams 110) in response to detecting presence of an aircraft flying near the one or more optical beams (e.g., optical beams 110); or sending a message to a service provider with access to the first FSO communication system 105*a* (and/or the second FSO communication system 105*b*) indicating to implement weather-related contingency actions in response to detecting weather-related effects that are capable of disrupting the one or more optical beams near the one or more optical beams (e.g., optical beams 110, or the like) or near the first FSO communication system 105*a* (and/or the second FSO communication system 105*b*); and/or the like.

In some aspects, the computing system might receive, either from the first image capture device (or camera 125*a*) or from the database, at least one of a plurality of images of an optical field of view of a first image capture device or camera 125*a* or a plurality of videos of the optical field of view of the first image capture device or camera 125*a*. The computing system might autonomously analyze the at least one of the plurality of images of the optical field of view of the first image capture device or camera 125*a* or the plurality of videos of the optical field of view of the first image capture device or camera 125*a* to determine at least one of one or more preventative measures, one or more protective measures, or one or more avoidance measures, and/or the like, to prevent interruption of the one or more optical beams (e.g., optical beams 110) of the first FSO communication 105*a* (and/or the second FSO communication system 105*b*). Based on the analysis, the computing system might autonomously initiate the at least one of the one or more preventative measures, the one or more protective measures, or the one or more avoidance measures, and/or the like (as described in detail above). In some embodiments, autonomously initiating the at least one of the one or more preventative measures, the one or more protective measures, or the one or more avoidance measures might—alternative or additional to the at least one of the one or more preventative measures, the one or more protective measures, or the one or more avoidance measures, and/or the like (as described in detail above)—include causing the first FSO communication system 105*a* (and/or the second FSO communication system 105*b*) to preemptively send data that are sent over the at least one of the one or more optical beams over a secondary link (e.g., using the secondary communication systems 170, or the like).

According to some embodiments, autonomously analyzing the at least one of the plurality of images of the optical field of view of the first image capture device or camera 125a or the plurality of videos of the optical field of view of the first image capture device or camera 125a might comprise autonomously analyzing the at least one of the plurality of images of the optical field of view of the first image capture device or camera 125a or the plurality of videos of the optical field of view of the first image capture device or camera 125a in real-time or near-real-time to determine at least one of one or more preventative measures, one or more protective measures, or one or more avoidance measures, and/or the like. Alternatively, or additionally, autonomously analyzing the at least one of the plurality of images of the optical field of view of the first image capture device or camera 125a or the plurality of videos of the optical field of view of the first image capture device or camera 125a might comprise autonomously analyzing, utilizing the AI system 165, the at least one of the plurality of images of the optical field of view of the first image capture device or camera 125a or the plurality of videos of the optical field of view of the first image capture device or camera 125a to determine at least one of one or more preventative measures, one or more protective measures, or one or more avoidance measures, and/or the like.

These and other functions of the system 100 (and its components) are described in greater detail below with respect to FIGS. 2-4.

FIGS. 2A and 2B (collectively, "FIG. 2") are system flow diagrams illustrating a non-limiting example 200 of a method for implementing visual impairment detection for FSO communication systems, in accordance with various embodiments.

In the non-limiting embodiment 200 of FIG. 2, a camera 205 might capture one or more images and/or one or more videos of an optical field of view of the camera 205, the optical field of view comprising one or more optical beams of a first free-space optical ("FSO") communication system that are transmitted between the first FSO communication system and a second FSO communication system. In some cases, the camera 205 might continuously record the images and/or videos of the optical field of view of the camera 205. The camera 205 might output the captured or recorded images and/or videos to video encoder 210 and/or real-time artificial intelligence ("AI") image analysis system 215. The video encoder 210 might compress the video data received from camera 205, making it more practical for storage. In various embodiments, the video encoder 210 could encode video according to an existing, standardized format (e.g., MPEG-2, H.264/AVC, H.265/HEVC, VC-1, VP8, VP9, or the like), a format emerging for future use (e.g., H.266/VVC, AV1, or the like), or other suitable video codecs developed in the future, and/or the like. The real-time AI image analysis system 215 might analyze the received images and/or videos of the optical field of view of the camera 205, in real-time or near-real-time using techniques enabled by AI. The AI-driven software of the real-time AI image analysis system 215 is able to recognize objects entering the field of view, to categorize the objects accordingly, and/or to generate metadata that gets stored along with the image or video footage. The real-time AI image analysis system 215 is also able to determine whether objects entering the field of view of the observing camera 205 have the potential to interfere with the FSO link between the first and second FSO communication systems. The real-time AI image analysis system 215 is self-learning over time in the sense that it is able to receive updates from more in-depth non-real-time post-incident video analysis.

The output of the video encoder 210 might be passed to controller 220, which has multiple functions, including, but not limited to, accepting the camera's encoded video feed, managing a circular buffer 225 for image and/or video storage, and/or interfacing with the network operator's management system 230, and/or the like. As images or videos are received, the controller 220 might store the received images and/or videos in the circular buffer 225. Video data can be stored in a variety of ways—in some embodiments, video data can be stored on an individual frame basis. In other embodiments, it may be preferable to store multiple video frames together. In some embodiments, a group of pictures ("GOP"), a well-established concept in video coding, may be a suitable level of granularity for storage in the circular buffer 225. Alternatively, video sequences could be encoded as a series of compressed individual still frames, without the interdependence among the frames typically occurring within a GOP, in some cases, at the cost of higher storage requirements. In such a scenario, the granularity of image and video storage and retrieval can be arbitrary, in some instances, down to the level of an individual frame. The controller 220 might continuously fill the circular buffer, wrapping around when reaching the end, overwriting the oldest image or video content with the newest content. The circular buffer 225 might have a storage capacity for M seconds of video, and might be configured to store the most recent M seconds worth of video data.

In addition to the video content, the controller 220 might also record metadata, such as time data. In some cases, time data can be obtained from clock 235 associated with the controller 220. Some embodiments may store additional metadata. Such metadata may not necessarily be stored at the individual frame level, but at the granularity of a video sequence associated with an FSO link obstruction event. In some embodiments, such metadata may include, but is not limited to, FSO unit model, serial number, model and serial number of the associated unit (i.e., the other part of the link) and location information. Further metadata might include camera information such as camera type or model, sensor, optics, camera configuration settings (e.g., configuration settings such as focus, aperture, frame exposure time, etc.), and/or the like. Other metadata might include weather data available from any co-located weather stations, or the like. In some embodiments, such information can be associated with a specific FSO link and location via the network operator's management system 230, and need not be stored with the actual video content.

Controller 220 might also act as an interface to the network operator's management system 230, might log communication link obstruction events, and might send out notification messages to key network management and operations personnel. The network operator's management system 230 might store information about events in a dedicated log 240. In some embodiments, the FSO unit's controller 220 may also have direct access to the log 240, as indicated by the dashed arrow in FIG. 2A. The network operator's management system 230 might ultimately connect to the operator's infrastructure 245. Depending on the kind of service level agreement ("SLA") between a subscriber and the network operator, an FSO link disruption event of sufficient length may trigger a re-route of the entire connection. The management system 230 might also maintain a long-term storage archive 250 of video footage associated with link disruption incidents and near-incidents.

A non-real-time AI image analysis system 255 might perform additional analysis on archived video segments, and might learn about additional objects and categorization from user inputs. The non-real-time AI image analysis system 255 might have access to the video located in long term storage 250 as well as the log 240 (via the management system 230). The non-real-time AI image analysis system 255 might continuously learn by analyzing new content, aided by input from human operators in cases where it cannot recognize objects visible in the image or video data. At certain intervals, the non-real-time AI image analysis system 255 might update the real-time AI image analysis system 215 with new data and recognition capabilities. In some embodiments, such updates may be carried out via firmware updates. In other embodiments, dedicated messages may provide updates specifically for the image recognition and categorization capabilities of the real-time image analysis system 215.

According to some embodiments, the video footage metadata might be fed to image-to-outage type AI learning system that maps the identified objects to types of outages that could occur. The type of outage is fed to outage type-to-resolution prescriptive AI learning system that maps the outage type to possible fixes and scores the probability of success for each. The AI systems 215 and 255 might be self-learning in the sense that it takes the recommended problem resolution and automatically recommends the same fix in equivalent future cases. In some embodiments, the AI systems 215 and 255 may automatically apply problem resolution fixes without human intervention.

In some embodiments, the circular buffer 225 must be sized to hold a sufficient amount of video footage to enable identification of objects obstructing the FSO communication link. The circular buffer 225 might have a capacity of M seconds of video content. If one assumes that the maximum duration of interest of an FSO link interruption is N seconds, then at a minimum the buffer size should be M=N to be able to completely capture a maximum duration of interest of an incident. In most embodiments, it may be desirable to size the buffer much larger data (with M>N), potentially to hold enough video content documenting multiple obstruction events. To identify an object obstructing the FSO communication link within a time window of N seconds of video footage, it may be most practical to consider the N/2 seconds prior to the incident as well as N/2 seconds following the incident in the case of a video sequence having a total length of N seconds, as shown in FIG. 2B, with the former being denoted by back-slash hashing or "///" hashing, with the latter being denoted by forward-slash hashing or "\\\" hashing, and with a current video frame or group of frames (corresponding to the communication link obstruction incident at time $T_0$) being denoted by cross-hashing or "X" hashing. However, other reference points are possible and may be chosen depending on the desired application. Furthermore, in some embodiments, the AI-based analysis systems 215 and 255 may select a suitable value for N depending on the kind of object detected. According to some embodiments, the total time N may not need to be symmetrical with respect to the time $T_0$ of the link disruption, i.e., the AI-driven logic may decide to extract more or less footage prior to and following the link disruption event, depending on the kind of disruption it detects.

In the case that an object enters the camera's field of view, the AI-enabled image analysis systems 215 and 255 might classify the object and might track the object as it moves across the frame or field of view. The image analysis systems 215 and 255 might also compute metadata relevant to the object's motion, such as x- and y-coordinates as well as z-coordinates (i.e., distance) in embodiments that include a camera capable of continuous autofocus. Video content associated with such an object might get passed on to the controller, which might store the video content in the circular buffer.

In the event of a link disruption, the controller 220 might note the time at which the disruption occurred. The camera 205 might continue to record video. At the time N/2 seconds following the link disruption, the controller 220 might send N seconds worth of video content and metadata to the operator's management system 230 for longer term storage and possible further analysis by AI software to determine new outage mechanisms and corrective actions. The management system 230 might take appropriate action, as specified in the SLA between the operator and the subscriber.

In some embodiments, the controller 220 may choose time intervals other than ±N/2 seconds surrounding the link disruption in the case of a video sequence having a total length of N seconds. In yet other embodiments, the time intervals do not need to be symmetrical with respect to the time $T_0$ of the link disruption.

Some embodiments may be able to handle multiple beam disruptions in rapid sequence. In such embodiments, the video buffer or circular buffer 225 might need to be sized appropriately, with a capacity M that is sufficiently large.

In order to send video content and metadata from the FSO unit to the operator's network management system 230 within a practical amount of time, a certain amount of bandwidth is required. In some embodiments, this can be provided via a dedicated separate communication link. In other embodiments, the transfer can be handled via available, previously reserved bandwidth on the existing communication link. In yet other embodiments, the FSO unit can take advantage of unused communication capacity and might insert messages, as permitted by the existing traffic flow, until all of the video content has been transferred to the management system 230.

Some embodiments might include a single camera in one of the FSO units, observing the area in a single direction only. Installation of a single-camera system might preferably be performed to minimize or avoid image impairments from external sources (e.g., the sun, or the like). Other embodiments might include cameras in both FSO units, providing redundancy in case of image interference (e.g., the sun shining into the front element of one of the cameras, or the like). Even if the sun is outside the direct field of view of such a camera, it could cause some image impairments due to reflections inside the optical unit.

Some embodiments might include a camera attached to an FSO unit as add-on functionality to an existing system (such as shown in FIG. 1, or the like). In such an embodiment, associated systems—including, but not limited to, power supply, video encoder, storage media, controller, and/or similar types of supporting device, or the like—may be contained in the add-on component or located in a different component, in a convenient location fitting the particular application, connected with a suitable cable, or the like.

Other embodiments might integrate the camera and associated systems—including, but not limited to, power supply, video encoder, storage media, controller, and/or similar types of supporting device, or the like—into the FSO unit itself, which is likely to be preferable for many applications. Yet other embodiments may include a provision to populate the camera in the FSO unit at a later point, depending on the operator's and/or subscriber's requirements. Some embodiments may offer a dedicated slot or area within the FSO device where a camera can be populated in the form of a dedicated module.

These and other features and functionalities are described in detail with respect to FIGS. 1, 3, and 4.

Figure 3C:
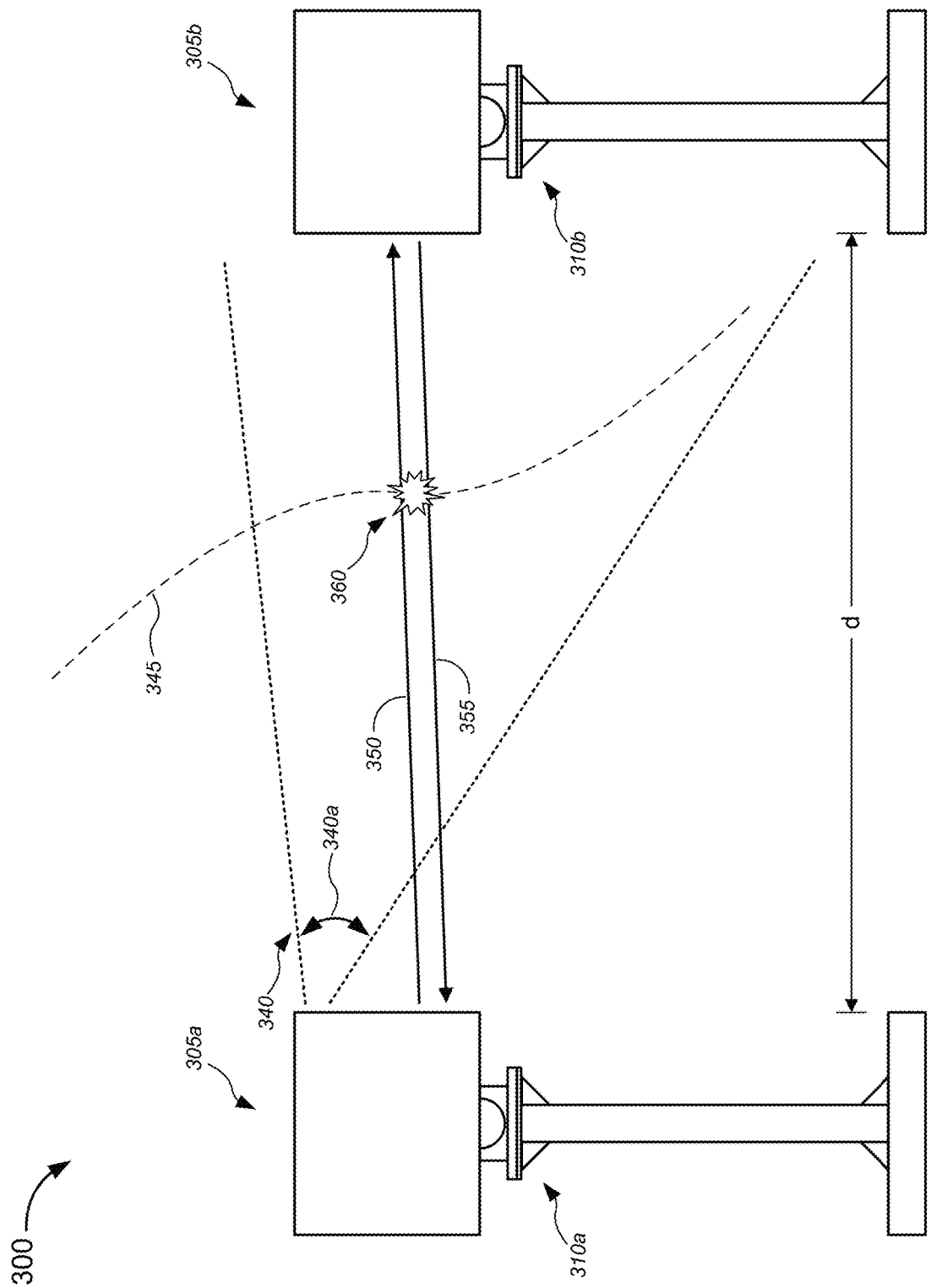

FIGS. 3A-3C (collectively, "FIG. 3") are schematic diagrams illustrating non-limiting examples 300 of detection of movement paths of objects as part of implementation of visual impairment detection for FSO communication systems, in accordance with various embodiments.

In the non-limiting embodiment 300 of FIGS. 3A-3C, a first FSO communication system 305a might be mounted on a mounting system 310a that might be disposed on, or mounted to, one of a roof of a building, a side of a building, on top of an elevated structure (e.g., tower, column, pillar, dome, etc.), on a side of an elevated structure, or on a high-elevation natural formation (e.g., hilltop, mountain top, plateau, mountain ridge, clifftop, hillside, mountain side, cliffside, etc.), or the like. The first FSO communication system 305a might include, without limitation, a transparent face 315a (e.g., glass or plastic, or the like), one or more optical beam transmitters 320 (e.g., optical beam transmitters 320a-320f, as shown in FIGS. 3A and 3B, or the like), one or more optical beam receivers 325 (e.g., optical beam receivers 325a-325f, as shown in FIGS. 3A and 3B, or the like), an alignment device 330 (including, but not limited to, a monocular, a telescope, and/or the like), a camera 335, a hood (not shown) and/or the like. Although three optical beam transmitters 320, three optical beam receivers 325, one alignment device 330, and one camera 335 are shown in the embodiment 300 of FIG. 3, the various embodiments are not so limited, and any suitable numbers of optical beam transmitters, optical beam receivers, alignment devices, and cameras may be used as required or as desired.

The transparent face 315a might protect the optical devices housed within the first FSO communication system 305a, while allowing transmission and reception of optical signals or data therethrough. The one or more optical beam transmitters 320 might transmit optical beams that contain data for the FSO communication system. Similarly, the one or more optical beam receivers 325 might receive optical beams that contain data for the FSO communication system. The alignment device 330 may be used to assist in the alignment of two FSO communication systems (e.g., the first and second FSO communications 305a and 305b, as shown in FIG. 3C, or the like). The camera 335 might be configured to observe, to capture, or to record images and/or video of an optical field of view ("FOV") 340 of the camera, the optical FOV 340 encompassing one or more optical beams transmitted by the one or more optical beam transmitters 320 and/or one or more optical beams received by the one or more optical beam receivers 325. In other words, the camera 335 observes the optical beam path(s) of the FSO communication system 305. The camera 335 might be installed such that it operates along the line of sight of the FSO communication system 305. Its optics, including view angle and depth of field, are designed such that the camera 335 is able to observe the area between two FSO units or FSO communication systems 305a and 305b that might belong to, or might establish, an individual FSO communication link. In some cases, it may be desirable to minimize the distance h between the optical axis of the FSO communication beam (in this case, the closest optical beam transmitter(s) 320a-320c, or the like) and the camera 335 to reduce so-called parallax error. The hood might be used to serve as a sunshade or the like to prevent some sun glare, or the like.

With reference to FIG. 3A, an object (e.g., one of objects 115 of FIG. 1, or the like) might move along a movement path (depicted by hashed, curved line 345) that intersects or interrupts one or more optical beam paths (in this case, optical beam paths of optical beam transmitters 320d-320f, or the like). Referring to FIG. 3B, an object (e.g., objects 115 of FIG. 1, or the like) might move along a movement path (depicted by hashed, curved line 345') that approaches (but does not cross any of) one or more optical beam paths. Such near-misses are undesirable from an operator's or subscriber's perspective and—to the extent that they are controllable by any of the involved parties—need to be addressed. An image analysis module (e.g., real-time AI image analysis system 215 and/or non-real-time AI image analysis system 255 of FIG. 2A, or the like), which is enabled by artificial intelligence, might monitor the camera's video feed and categorizes objects that enter the field of view 340. Although FIGS. 3A and 3B show tracking of a single object along a single movement path (345 or 345'), the various embodiments are not so limited, and the system may be capable of simultaneously tracking multiple objects along corresponding multiple movement paths.

Turning to FIG. 3C, a first FSO communication system 305a mounted on a first mounting system 310a might communicate with a second FSO communication system 305b that is mounted on a second mounting system 310b, the first FSO communication system 305a being disposed a distance d from the second FSO communication system 305b. The first FSO communication system 305a might transmit an optical beam 350 from an optical beam transmitter 320 of the first FSO communication system 305a to an optical beam receiver 325 of the second FSO communication system 305b, while receiving, with an optical beam receiver 325 of the first FSO communication system 305a, an optical beam 355 transmitted from an optical beam transmitter 320 of the second FSO communication system 305b. The camera 335 (shown in FIGS. 3A and 3B, but not shown in FIG. 3C) might have an optical FOV 340 that defines an angle 340a that is rotated about a 360 degree direction about an axis that is normal to the lens of camera 335, the axis being tilted downwards or otherwise toward the beam paths in the cases that the camera 335 is disposed or positioned above the optical beam transmitters and receivers 320 and 325. In this manner, the camera 335 might capture any occurrences of FSO link obstruction events (depicted in FIG. 3C by obstruction icon 360, or the like) that might occur due to an object (e.g., one of objects 115 of FIG. 1, or the like) moving along a movement path 345 that intersects or interrupts one or more optical beam paths (in this case, the optical beam paths of optical beams 350 and 355, or the like).

In some embodiments, the camera 335 might constantly record video footage, which might be encoded using a video encoder (e.g., video encoder 210 of FIG. 2A, or the like) and stored in a buffer (e.g., circular buffer 225 of FIG. 2, or the like). Once the buffer is full, the oldest footage might be overwritten with new video content, in a structure known as a circular buffer. Thus, a buffer with a storage capacity of N seconds always holds the last N seconds of video that were previously recorded.

According to some embodiments, the camera 335 may operate at the same wavelength or at a different wavelength from the FSO link wavelength. If at the same wavelength, saturation of the camera imaging system can be avoided by setting the camera's sensitivity such that the maximum optical power received from the far end of the FSO link does not saturate its sensor. Some embodiments may include a camera operating in the infrared range, to give the system a degree of night vision capability. As some FSO links may also be operated in the infrared range to avoid interference from visible light sources, filters can be added to the camera in some embodiments to filter out the FSO link wavelength to avoid sensor saturation.

Furthermore, in some embodiments, the camera 335 may have auto-exposure functionality to handle lighting level changes throughout the day. According to some embodiments, the auto-exposure functionality may be implemented by adjusting the camera's imaging sensor sensitivity, a variable aperture coupled to the lens, the shutter speed of individual frame exposure, or a combination of these implementations. Yet other embodiments may offer an operator of the FSO communication system deliberate control over the image exposure time of the camera (i.e., shutter speed, or the like), so as to capture potentially fast-moving objects that may disrupt the FSO link's communication beam. In some embodiments, the camera 335 may include an autofocus system, triggered by the presence of a moving object in its field of view 340. According to some embodiments, the autofocus system may include a tracking mechanism, locking onto the moving object and keeping it in constant focus.

These and other features and functionalities are described in detail with respect to FIGS. 1, 2, and 4.

FIGS. 4A-4K (collectively, "FIG. 4") are flow diagrams illustrating a method 400 for implementing visual impairment detection for FSO communication systems, in accordance with various embodiments. Method 400 of FIG. 4A continues onto FIG. 4B following the circular marker denoted, "A."

While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the systems, examples, or embodiments 100, 200, and 300 of FIGS. 1, 2, and 3, respectively (or components thereof), such methods may also be implemented using any suitable hardware (or software) implementation. Similarly, while each of the systems, examples, or embodiments 100, 200, and 300 of FIGS. 1, 2, and 3, respectively (or components thereof), can operate according to the method 400 illustrated by FIG. 4 (e.g., by executing instructions embodied on a computer readable medium), the systems, examples, or embodiments 100, 200, and 300 of FIGS. 1, 2, and 3 can each also operate according to other modes of operation and/or perform other suitable procedures.

Figure 4A:
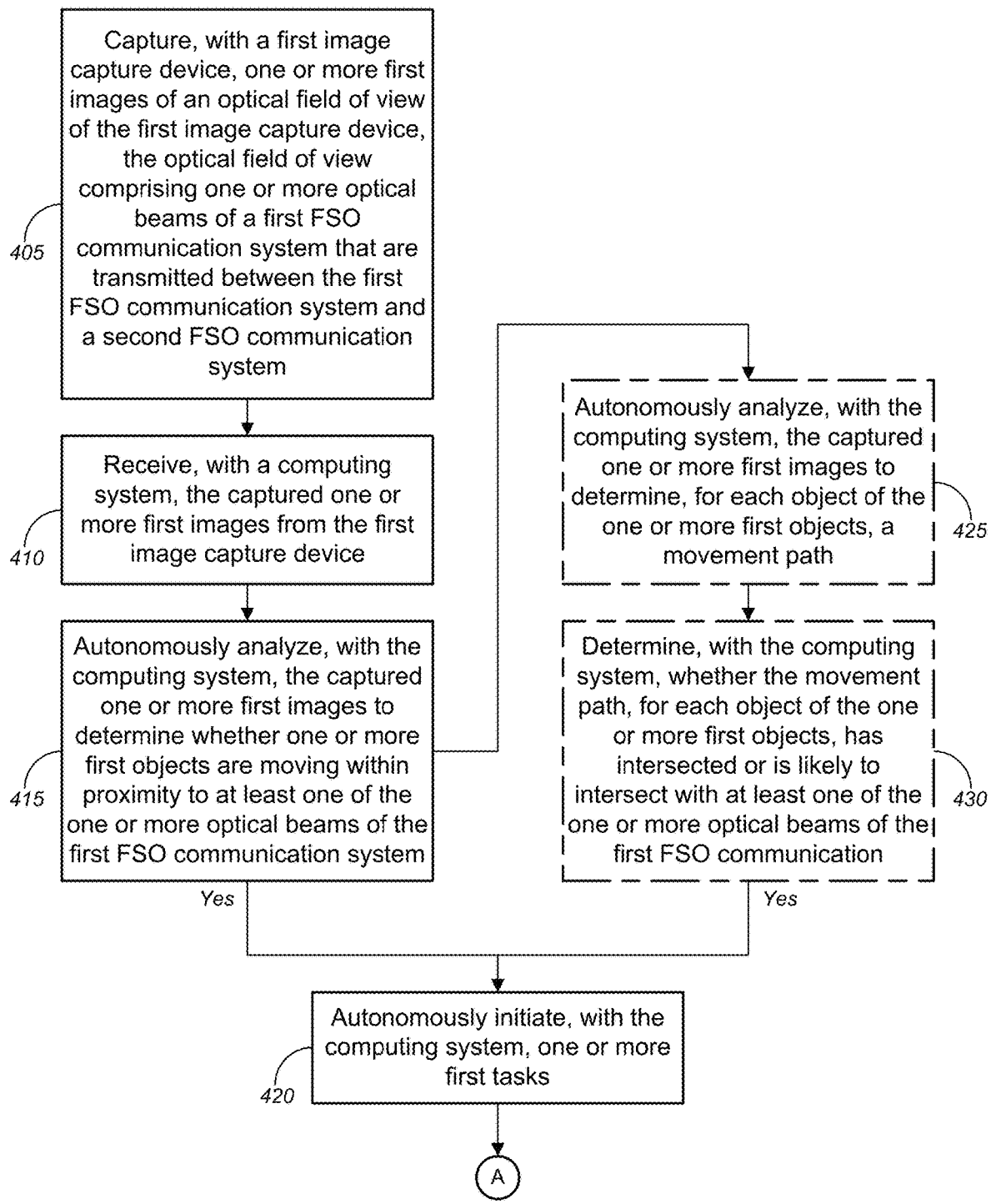
FIGS. 4A-4K are flow diagrams illustrating a method for implementing visual impairment detection for FSO communication systems, in accordance with various embodiments.

In the non-limiting embodiment of FIG. 4A, method 400, at block 405, might comprise capturing, with a first image capture device, one or more first images of an optical field of view of the first image capture device, the optical field of view comprising one or more optical beams of a first free-space optical ("FSO") communication system that are transmitted between the first FSO communication system and a second FSO communication system. At block 410, method 400 might comprise receiving, with a computing system, the captured one or more first images from the first image capture device. In some embodiments, the computing system might include, without limitation, at least one of a controller disposed within the first FSO communication system, an external controller system, a server computer over a network, a cloud-based computing system over a network, or a distributed computing system, and/or the like. Method 400 might further comprise autonomously analyzing, with the computing system, the captured one or more first images to determine whether one or more first objects are moving within proximity to at least one of the one or more optical beams of the first FSO communication system (block 415). If so, method 400 might proceed to block 420. At block 420, method 400 might comprise, based on a determination that one or more first objects are moving within proximity to at least one of the one or more optical beams of the first FSO communication system, autonomously initiating, with the computing system, one or more first tasks.

According to some embodiments, autonomously analyzing the captured one or more first images (at block 415) might comprise autonomously analyzing, with the computing system, the captured one or more first images to determine, for each object of the one or more first objects, a movement path (optional block 425). At optional block 430, method 400 might comprise determining, with the computing system, whether the movement path, for each object of the one or more first objects, has intersected or is likely to intersect with at least one of the one or more optical beams of the first FSO communication. If so, method 400 might proceed to block 420. In other words, method 400 might further comprise autonomously initiating, with the computing system, the one or more first tasks (at block 420), in this case, based on a determination that the movement path, for at least one object among the one or more first objects, has intersected or is likely to intersect with at least one of the one or more optical beams of the first FSO communication. Method 400 might continue onto the process at optional block 435 in FIG. 4B following the circular marker denoted, "A."

Figure 4B:
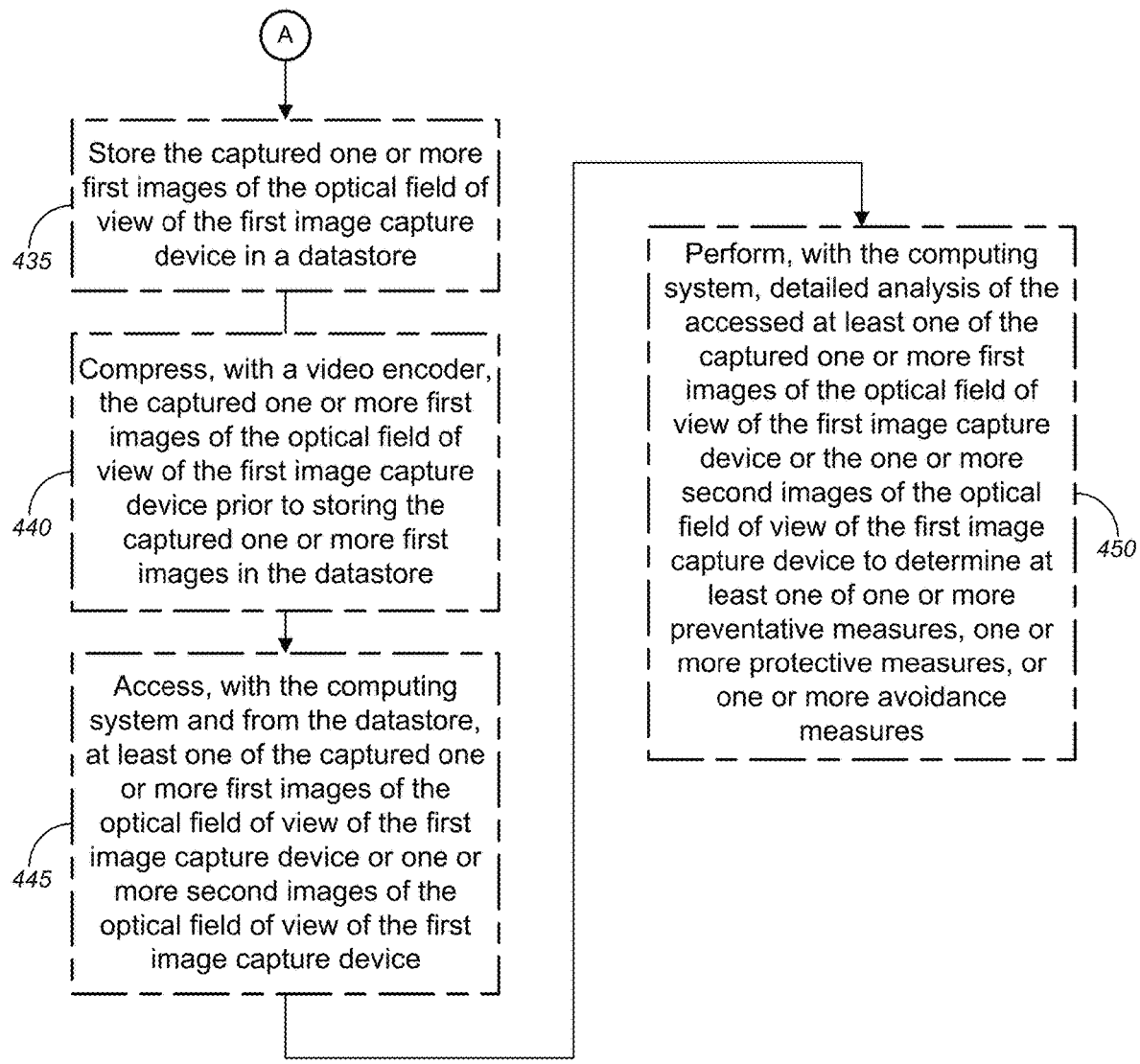

At optional block 435 in FIG. 4B (following the circular marker denoted, "A"), method 400 might comprise storing the captured one or more first images of the optical field of view of the first image capture device in a datastore. Method 400 might further comprise, at optional block 440, compressing, with a video encoder, the captured one or more first images of the optical field of view of the first image capture device prior to storing the captured one or more first images in the datastore. Alternatively, or additionally, method 400 might further comprise accessing, with the computing system and from the datastore, at least one of the captured one or more first images of the optical field of view of the first image capture device or one or more second images of the optical field of view of the first image capture device (optional block 445); and performing, with the computing system, detailed analysis of the accessed at least one of the captured one or more first images of the optical field of view of the first image capture device or the one or more second images of the optical field of view of the first image capture device to determine at least one of one or more preventative measures, one or more protective measures, or one or more avoidance measures, and/or the like (optional block 450).

In some embodiments, the at least one of the one or more preventative measures, the one or more protective measures, or the one or more avoidance measures comprises at least one of broadcasting an audio message indicating to avoid the one or more optical beams in response to detecting people or human-operated machines or devices near the one or more optical beams and within range of the first FSO communication system, sending a digital communication indicating to avoid the one or more optical beams in response to detecting known individuals or entities or human-operated machines or devices controlled by the individuals or entities that are detected near the one or more optical beams, displaying a message on a display screen indicating to nearby people to avoid the one or more optical beams, projecting a message on a nearby surface indicating to nearby people to avoid the one or more optical beams, sending a message to a service provider with access to the first FSO communication system indicating to install rodent deterrent measures near or along a path of the one or more optical beams in response to detecting presence of one or more rodents near the one or more optical beams or near the first FSO communication system, sending a message to the service provider indicating to install bird deterrent measures near or along a path of the one or more optical beams in response to detecting presence of one or more birds near the one or more optical beams or near the first FSO communication system, sending a message to the service provider indicating to install insect deterrent measures near or along a path of the one or more optical beams in response to detecting presence of one or more insects near the one or more optical beams or near the first FSO communication system, sending a message to the service provider indicating to install animal deterrent measures near or along a path of the one or more optical beams in response to detecting presence of one or more animals near the one or more optical beams or near the first FSO communication system, sending a message to a pilot indicating to avoid flying into the one or more optical beams in response to detecting presence of an aircraft flying near the one or more optical beams, sending a message to an operator at an air traffic control center indicating to contact a pilot who is flying near the one or more optical beams to avoid flying into the one or more optical beams in response to detecting presence of an aircraft flying near the one or more optical beams, or sending a message to a service provider with access to the first FSO communication system indicating to implement weather-related contingency actions in response to detecting weather-related effects that are capable of disrupting the one or more optical beams near the one or more optical beams or near the first FSO communication system, and/or the like.

Figure 4C:
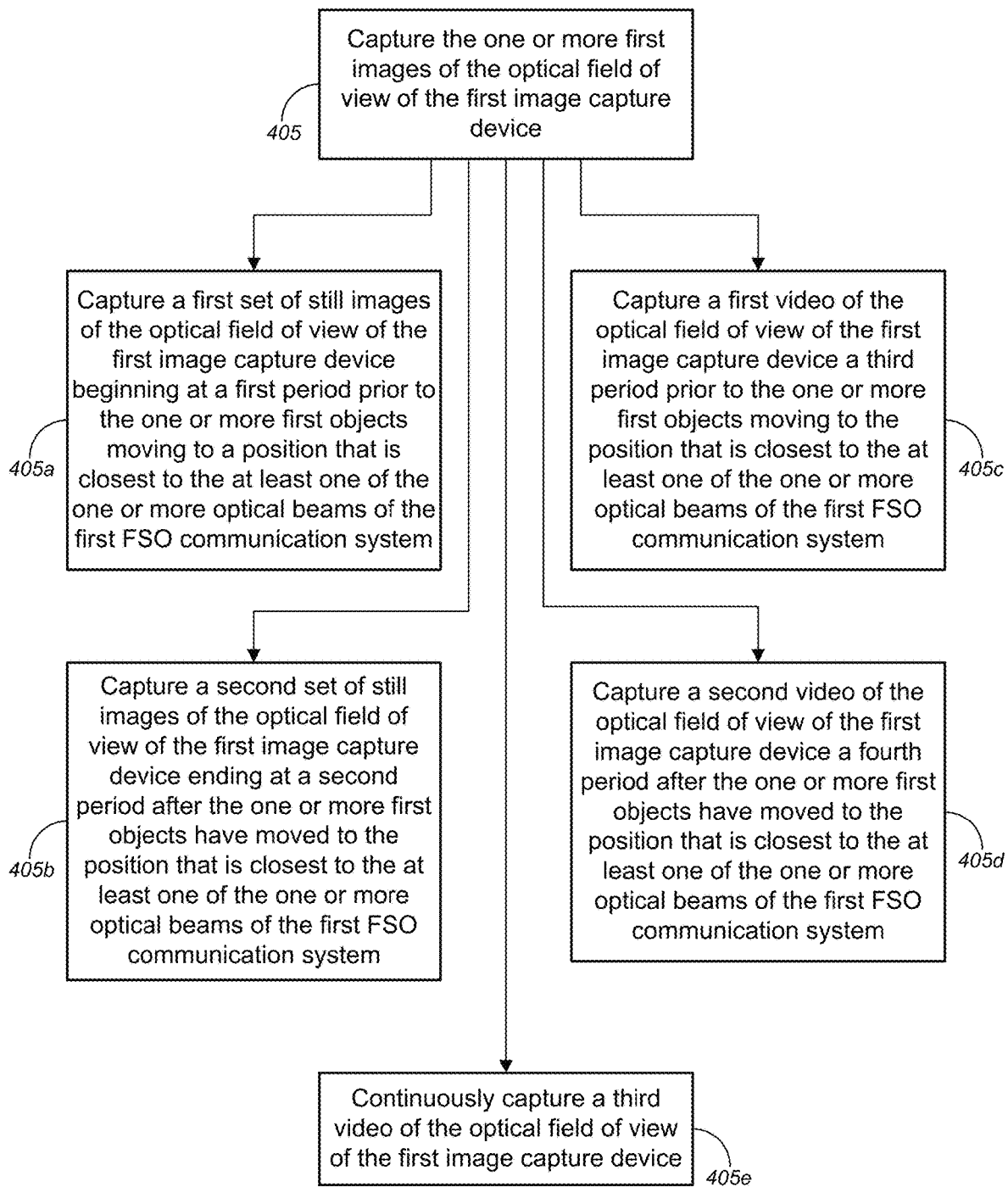

With reference to FIG. 4C, capturing the one or more first images of the optical field of view of the first image capture device (at block 405) might comprise at least one of: capturing a first set of still images of the optical field of view of the first image capture device beginning at a first period prior to the one or more first objects moving to a position that is closest to the at least one of the one or more optical beams of the first FSO communication system (block 405a); capturing a second set of still images of the optical field of view of the first image capture device ending at a second period after the one or more first objects have moved to the position that is closest to the at least one of the one or more optical beams of the first FSO communication system (block 405b); capturing a first video of the optical field of view of the first image capture device a third period prior to the one or more first objects moving to the position that is closest to the at least one of the one or more optical beams of the first FSO communication system (block 405c); capturing a second video of the optical field of view of the first image capture device a fourth period after the one or more first objects have moved to the position that is closest to the at least one of the one or more optical beams of the first FSO communication system (block 405d); or continuously capturing a third video of the optical field of view of the first image capture device (block 405e); and/or the like.

Figure 4D:
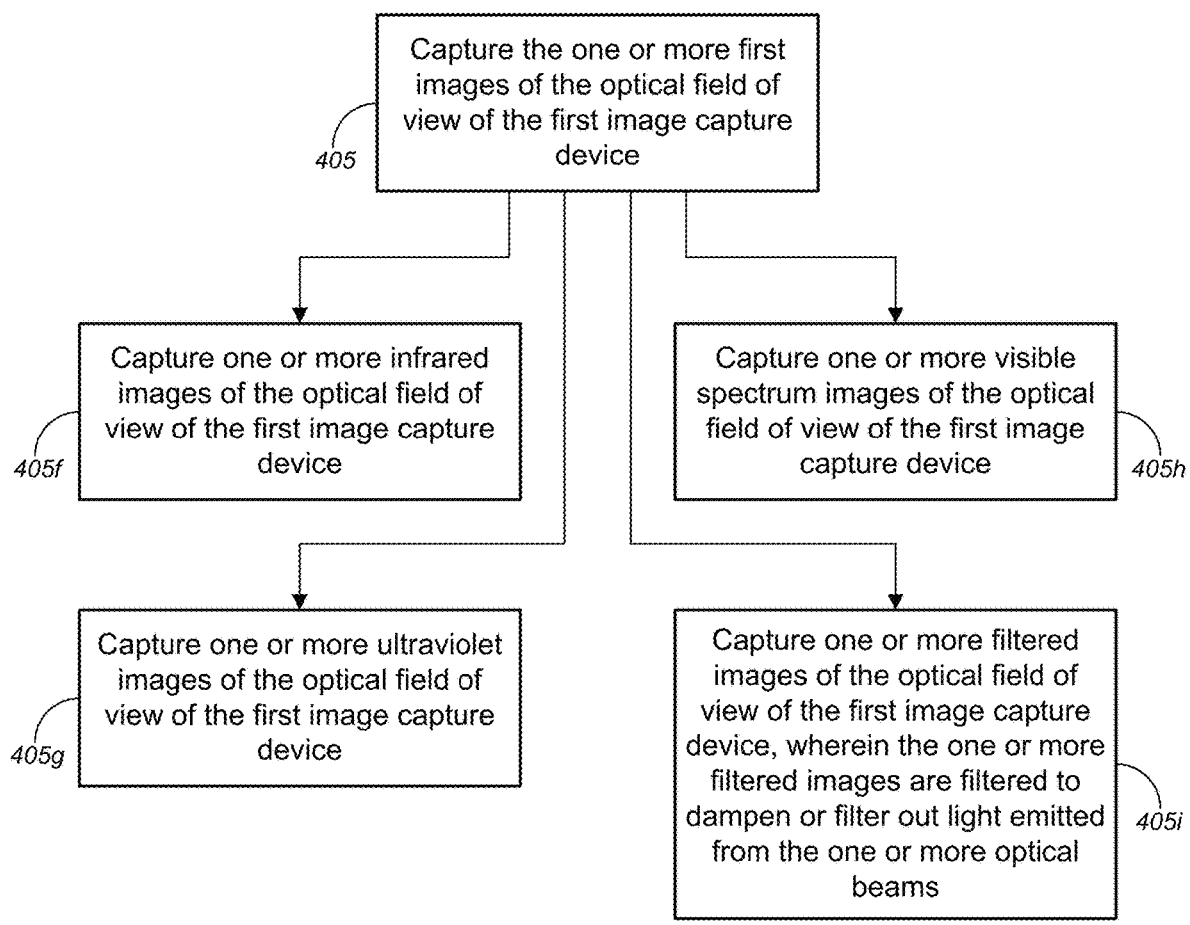

According to some embodiments, referring to FIG. 4D, capturing the one or more first images of the optical field of view of the first image capture device (block 405) might alternatively, or additionally, comprise at least one of: capturing one or more infrared images of the optical field of view of the first image capture device (block 405f); capturing one or more ultraviolet images of the optical field of view of the first image capture device (block 405g); capturing one or more visible spectrum images of the optical field of view of the first image capture device (block 405h); or capturing one or more filtered images of the optical field of view of the first image capture device, wherein the one or more filtered images are filtered to attenuate or filter out light emitted by the one or more optical beams (block 405i); and/or the like. In some embodiments, autonomously analyzing the captured one or more first images might comprise autonomously analyzing, with the computing system, the captured one or more first images in real-time or near-real-time to determine whether the one or more first objects are moving within proximity to the at least one of the one or more optical beams of the first FSO communication system. Alternatively, or additionally, autonomously analyzing the captured one or more first images might comprise autonomously analyzing, with the computing system and utilizing at least one of an artificial intelligence ("AI") system or a machine learning system, the captured one or more first images to determine whether the one or more first objects are moving within proximity to the at least one of the one or more optical beams of the first FSO communication system.

Figure 4E:
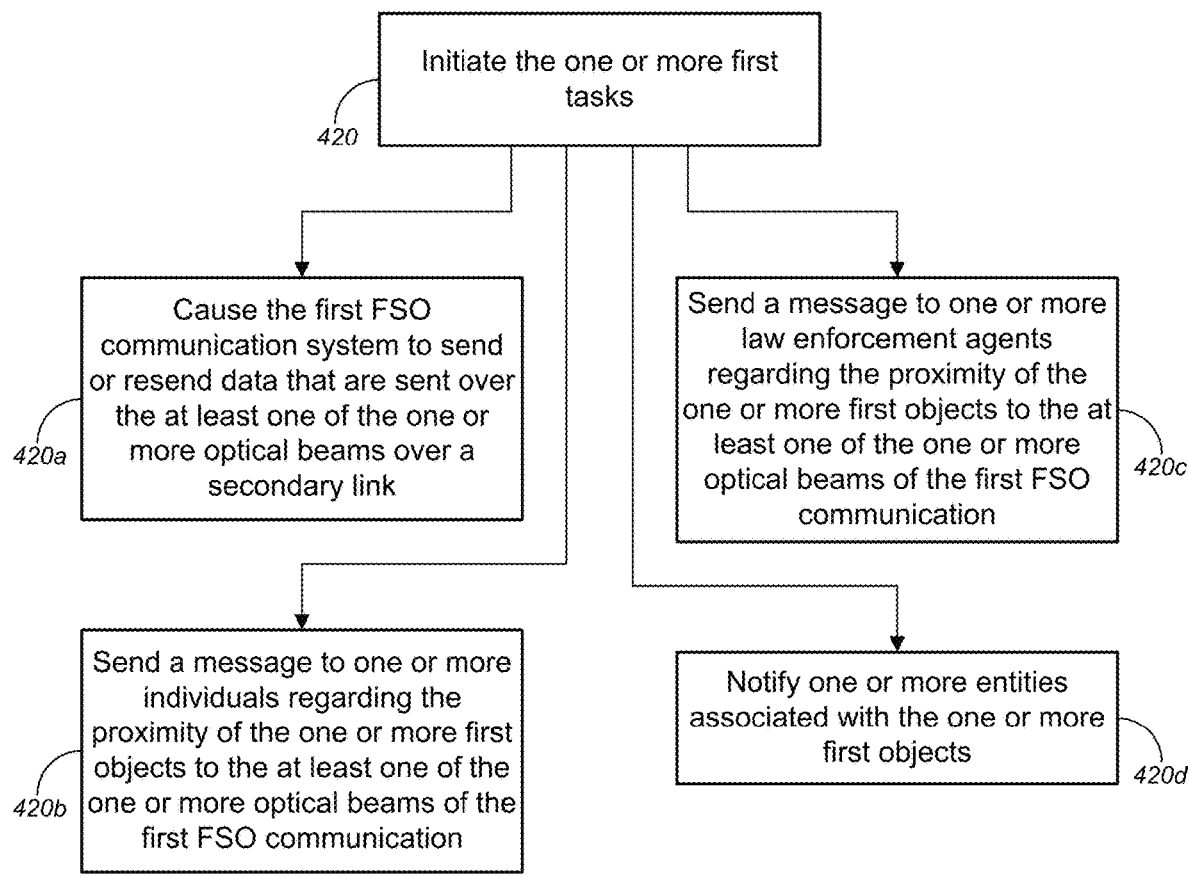

Turning to FIG. 4E, initiating the one or more first tasks (at block 420) might include, without limitation, at least one of: causing the first FSO communication system to send or resend data that are sent over the at least one of the one or more optical beams over a secondary link (block 420a); sending a message to one or more individuals regarding the proximity of the one or more first objects to the at least one of the one or more optical beams of the first FSO communication (block 420b); sending a message to one or more law enforcement agents regarding the proximity of the one or more first objects to the at least one of the one or more optical beams of the first FSO communication (block 420c); or notifying one or more entities associated with the one or more first objects (block 420d); and/or the like. In some cases, the secondary link might include, but is not limited to, one of a radio link, a millimeter wave link, a microwave link, or a secondary optical link directed in a different direction, and/or the like.

Figure 4F:
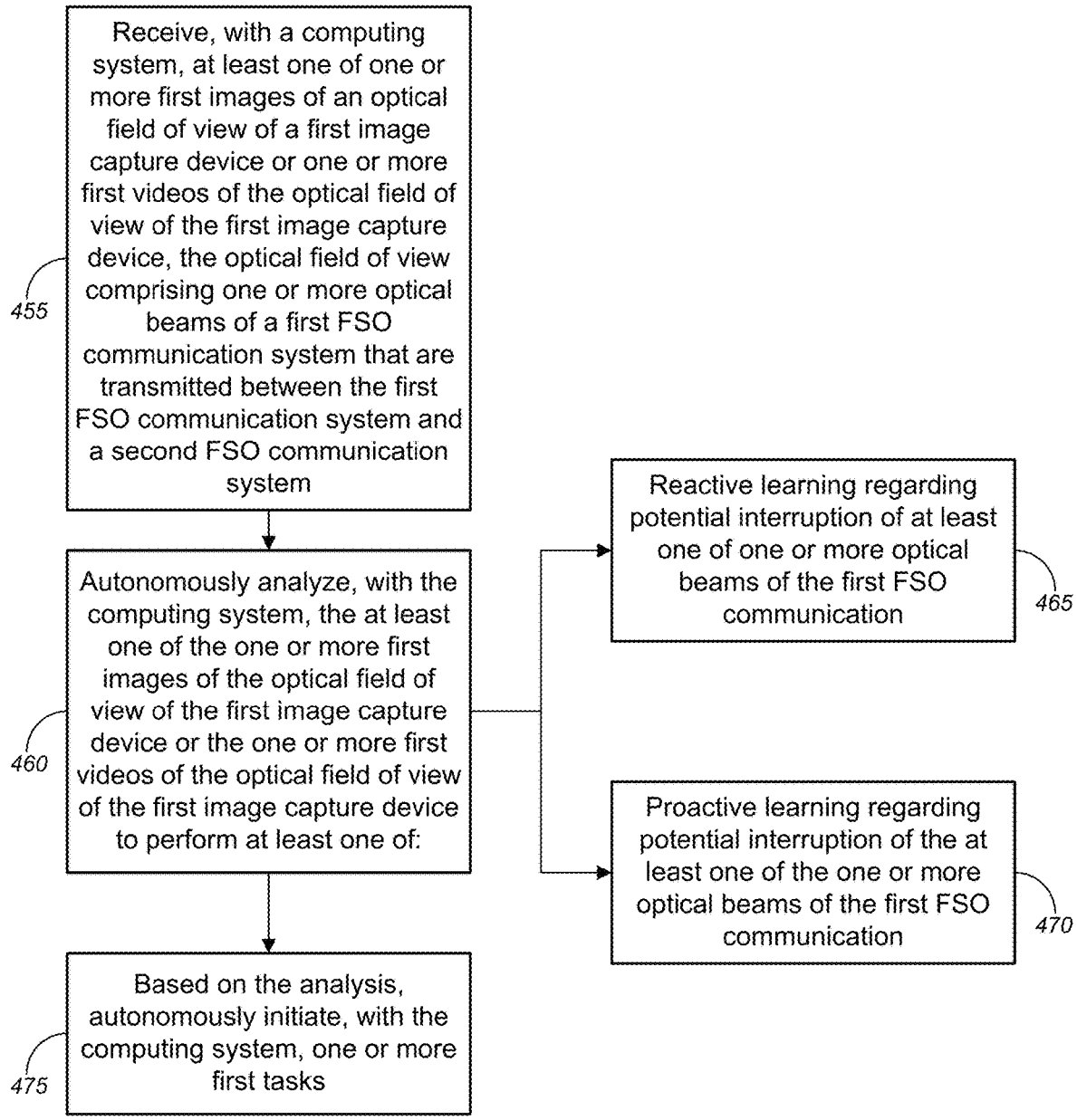

With reference to FIG. 4F, method 400 might comprise, at block 455, receiving, with a computing system, at least one of one or more first images of an optical field of view of a first image capture device or one or more first videos of the optical field of view of the first image capture device, the optical field of view comprising one or more optical beams of a first free-space optical ("FSO") communication system that are transmitted between the first FSO communication system and a second FSO communication system. At block 460, method 400 might comprise autonomously analyzing, with the computing system, the at least one of the one or more first images of the optical field of view of the first image capture device or the one or more first videos of the optical field of view of the first image capture device to perform at least one of: reactive learning regarding potential interruption of at least one of one or more optical beams of the first FSO communication (block 465); or proactive learning regarding potential interruption of the at least one of the one or more optical beams of the first FSO communication (block 470); and/or the like. Method 400 might further comprise, at block 475, based on the analysis, autonomously initiating, with the computing system, one or more first tasks. In some embodiments, the computing system might include, without limitation, at least one of a controller disposed within the first FSO communication system, an external controller system, a server computer over a network, a cloud-based computing system over a network, or a distributed computing system, and/or the like.

According to some embodiments, receiving the at least one of the one or more first images of the optical field of view of the first image capture device or the one or more first videos of the optical field of view of the first image capture device might comprise at least one of: receiving, with the computing system and from the first image capture device, the at least one of the one or more first images of the optical field of view of the first image capture device or the one or more first videos of the optical field of view of the first image capture device; or receiving, with the computing system and from a database, the at least one of the one or more first images of the optical field of view of the first image capture device or the one or more first videos of the optical field of view of the first image capture device; and/or the like.

In some embodiments, autonomously analyzing the at least one of the one or more first images of the optical field of view of the first image capture device or the one or more first videos of the optical field of view of the first image capture device might comprise autonomously analyzing, with the computing system, the at least one of the one or more first images of the optical field of view of the first image capture device or the one or more first videos of the optical field of view of the first image capture device in real-time or near-real-time to perform at least one of reactive learning regarding potential interruption of at least one of one or more optical beams of the first FSO communication or proactive learning regarding potential interruption of the at least one of the one or more optical beams of the first FSO communication.

Alternatively, or additionally, autonomously analyzing the at least one of the one or more first images of the optical field of view of the first image capture device or the one or more first videos of the optical field of view of the first image capture device might comprise autonomously analyzing, with the computing system and utilizing at least one of an artificial intelligence ("AI") system or a machine learning system, the at least one of the one or more first images of the optical field of view of the first image capture device or the one or more first videos of the optical field of view of the first image capture device to perform at least one of reactive learning regarding potential interruption of at least one of one or more optical beams of the first FSO communication or proactive learning regarding potential interruption of the at least one of the one or more optical beams of the first FSO communication.

Figure 4G:
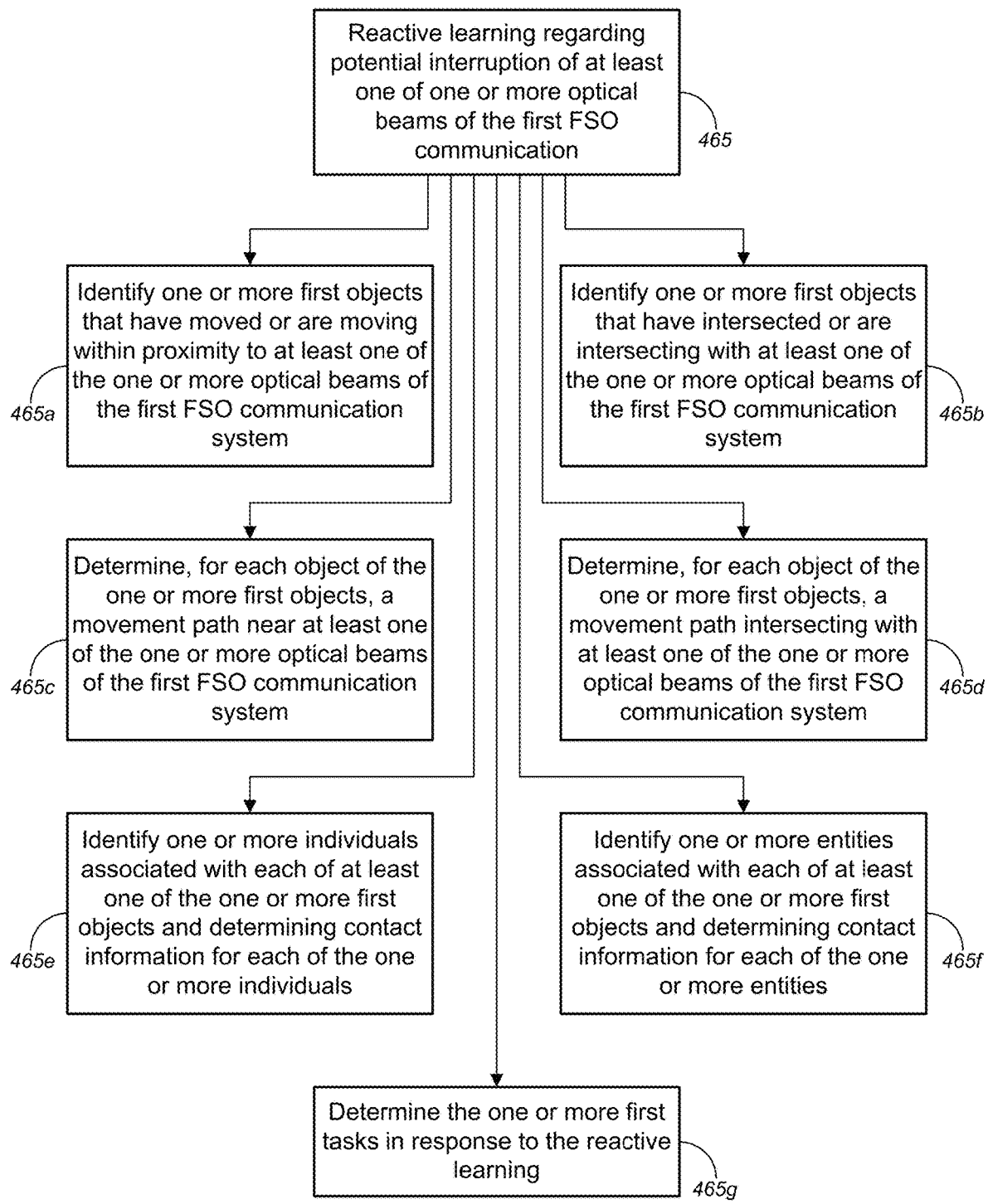

Referring to FIG. 4G, reactive learning regarding potential interruption of the at least one of the one or more optical beams of the first FSO communication (at block 465) might comprise at least one of: identifying one or more first objects that have moved or are moving within proximity to at least one of the one or more optical beams of the first FSO communication system (block 465a); identifying one or more first objects that have intersected or are intersecting with at least one of the one or more optical beams of the first FSO communication system (block 465b); determining, for each object of the one or more first objects, a movement path near at least one of the one or more optical beams of the first FSO communication system (block 465c); determining, for each object of the one or more first objects, a movement path intersecting with at least one of the one or more optical beams of the first FSO communication system (block 465d); identifying one or more individuals associated with each of at least one of the one or more first objects and determining contact information for each of the one or more individuals (block 465e); identifying one or more entities associated with each of at least one of the one or more first objects and determining contact information for each of the one or more entities (block 465f); or determining the one or more first tasks in response to the reactive learning (block 465g).

In such cases, autonomously initiating the one or more first tasks, which might be as shown in FIG. 4E, might include, without limitation, at least one of: causing the first FSO communication system to send or resend data that are sent over the at least one of the one or more optical beams over a secondary link (block 420a); sending a message to one or more individuals regarding the proximity of the one or more first objects to the at least one of the one or more optical beams of the first FSO communication (block 420b); sending a message to one or more law enforcement agents regarding the proximity of the one or more first objects to the at least one of the one or more optical beams of the first FSO communication (block 420c); or notifying one or more entities associated with the one or more first objects (block 420d); and/or the like. In some cases, the secondary link might include, but is not limited to, one of a radio link, a millimeter wave link, a microwave link, or a secondary optical link directed in a different direction, and/or the like.

Figure 4H:
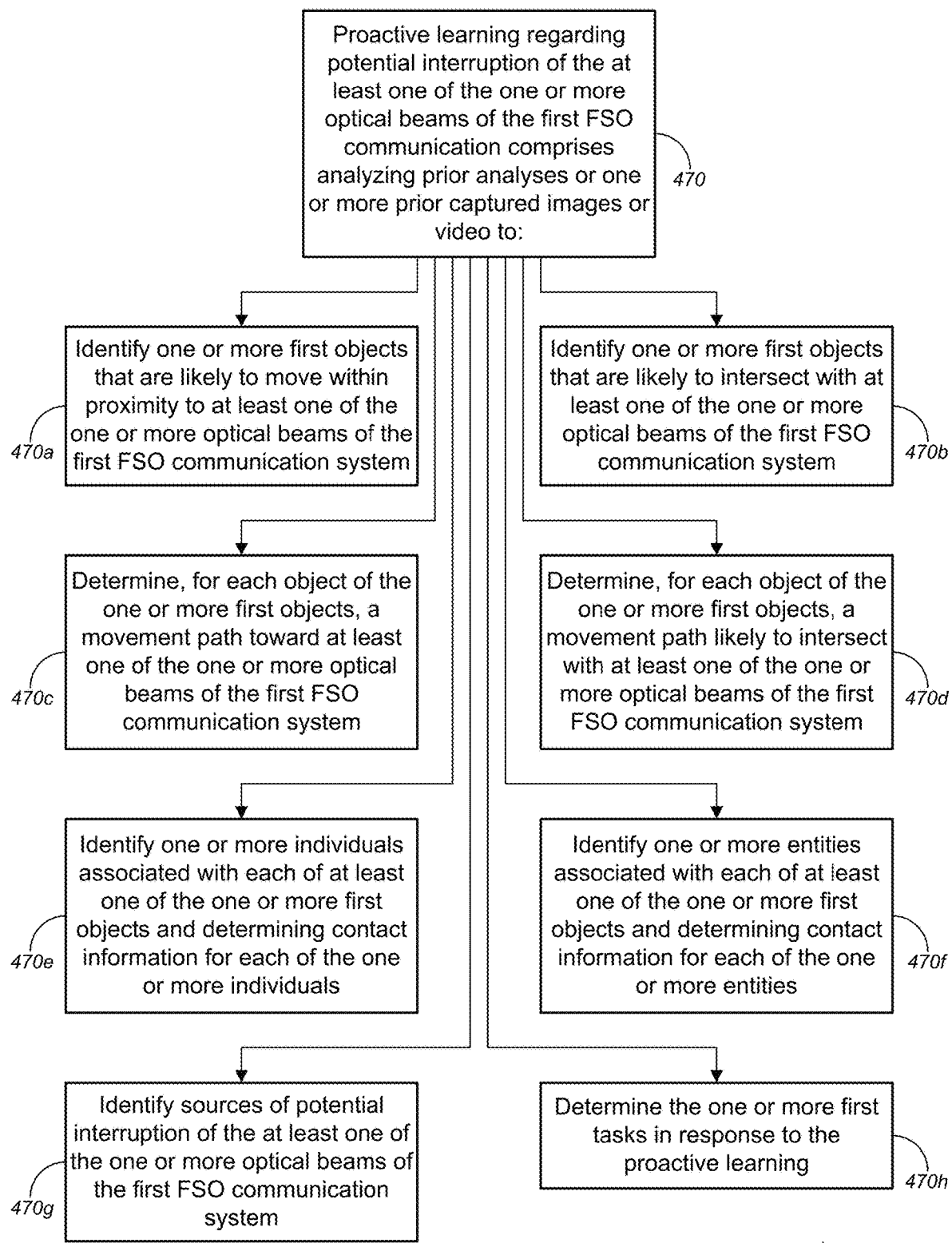

Turning to FIG. 4H, proactive learning regarding potential interruption of the at least one of the one or more optical beams of the first FSO communication (at block 470) might include, but is not limited to, at least one of: analyzing prior analyses or one or more prior captured images or video to identify one or more first objects that are likely to move within proximity to at least one of the one or more optical beams of the first FSO communication system (block 470a); analyzing prior analyses or one or more prior captured images or video to identify one or more first objects that are likely to intersect with at least one of the one or more optical beams of the first FSO communication system (block 470b); analyzing prior analyses or one or more prior captured images or video to determine, for each object of the one or more first objects, a movement path toward at least one of the one or more optical beams of the first FSO communication system (block 470c); analyzing prior analyses or one or more prior captured images or video to determine, for each object of the one or more first objects, a movement path likely to intersect with at least one of the one or more optical beams of the first FSO communication system (block 470d); analyzing prior analyses or one or more prior captured images or video to identify one or more individuals associated with each of at least one of the one or more first objects and determining contact information for each of the one or more individuals (block 470e); analyzing prior analyses or one or more prior captured images or video to identify one or more entities associated with each of at least one of the one or more first objects and determining contact information for each of the one or more entities (block 470f); analyzing prior analyses or one or more prior captured images or video to identify sources of potential interruption of the at least one of the one or more optical beams of the first FSO communication system that are due to at least one of location-specific causes, time of day-related causes, seasonal causes, lunar-based causes, time of year-related causes, and/or the like (block 470g); or analyzing prior analyses or one or more prior captured images or video to determine the one or more first tasks in response to the proactive learning (block 470h).

In such cases, autonomously initiating the one or more first tasks might include, but is not limited to, at least one of: broadcasting an audio message indicating to avoid the one or more optical beams in response to detecting people or human-operated machines or devices near the one or more optical beams and within range of the first FSO communication system; sending a digital communication indicating to avoid the one or more optical beams in response to detecting known individuals or entities or human-operated machines or devices controlled by the individuals or entities that are detected near the one or more optical beams; displaying a message on a display screen indicating to nearby people to avoid the one or more optical beams; projecting a message on a nearby surface indicating to nearby people to avoid the one or more optical beams; sending a message to a service provider with access to the first FSO communication system indicating to install rodent deterrent measures near or along a path of the one or more optical beams in response to detecting presence of one or more rodents near the one or more optical beams or near the first FSO communication system; sending a message to the service provider indicating to install bird deterrent measures near or along a path of the one or more optical beams in response to detecting presence of one or more birds near the one or more optical beams or near the first FSO communication system; sending a message to the service provider indicating to install insect deterrent measures near or along a path of the one or more optical beams in response to detecting presence of one or more insects near the one or more optical beams or near the first FSO communication system; sending a message to the service provider indicating to install animal deterrent measures near or along a path of the one or more optical beams in response to detecting presence of one or more animals near the one or more optical beams or near the first FSO communication system; sending a message to a pilot indicating to avoid flying into the one or more optical beams in response to detecting presence of an aircraft flying near the one or more optical beams; sending a message to an operator at an air traffic control center indicating to contact a pilot who is flying near the one or more optical beams to avoid flying into the one or more optical beams in response to detecting presence of an aircraft flying near the one or more optical beams; or sending a message to a service provider with access to the first FSO communication system indicating to implement weather-related contingency actions in response to detecting weather-related effects that are capable of disrupting the one or more optical beams near the one or more optical beams or near the first FSO communication system; and/or the like.

Figure 4I:
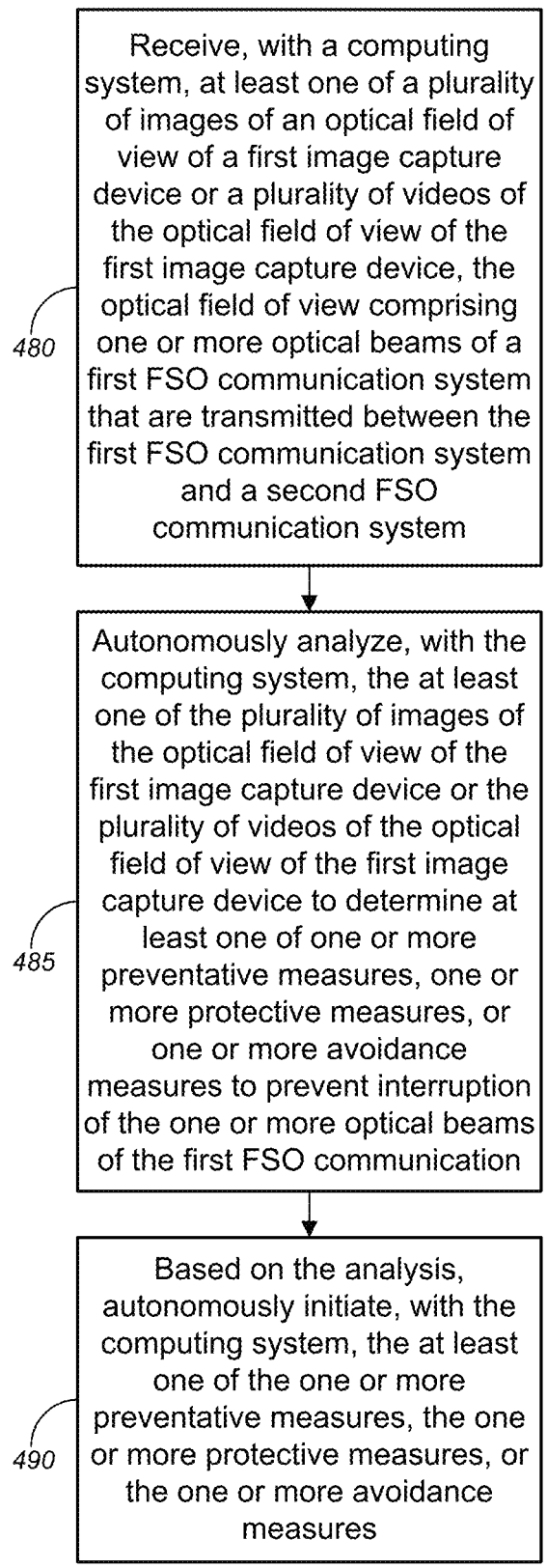

With reference to FIG. 4I, method 400 might comprise, at block 480, receiving, with a computing system, at least one of a plurality of images of an optical field of view of a first image capture device or a plurality of videos of the optical field of view of the first image capture device, the optical field of view comprising one or more optical beams of a first free-space optical ("FSO") communication system that are transmitted between the first FSO communication system and a second FSO communication system. At block 485, method 400 might comprise autonomously analyzing, with the computing system, the at least one of the plurality of images of the optical field of view of the first image capture device or the plurality of videos of the optical field of view of the first image capture device to determine at least one of one or more preventative measures, one or more protective measures, or one or more avoidance measures, and/or the like, to prevent interruption of the one or more optical beams of the first FSO communication. Method 400 might further comprise, based on the analysis, autonomously initiating, with the computing system, the at least one of the one or more preventative measures, the one or more protective measures, or the one or more avoidance measures, and/or the like (block 490). In some embodiments, the computing system might include, without limitation, at least one of a controller disposed within the first FSO communication system, an external controller system, a server computer over a network, a cloud-based computing system over a network, or a distributed computing system, and/or the like.

According to some embodiments, receiving the at least one of the one or more first images of the optical field of view of the first image capture device or the one or more first videos of the optical field of view of the first image capture device might comprise at least one of: receiving, with the computing system and from the first image capture device, the at least one of the one or more first images of the optical field of view of the first image capture device or the one or more first videos of the optical field of view of the first image capture device; or receiving, with the computing system and from a database, the at least one of the one or more first images of the optical field of view of the first image capture device or the one or more first videos of the optical field of view of the first image capture device; and/or the like.

In some embodiments, autonomously analyzing the at least one of the one or more first images of the optical field of view of the first image capture device or the one or more first videos of the optical field of view of the first image capture device might comprise autonomously analyzing, with the computing system, the at least one of the one or more first images of the optical field of view of the first image capture device or the one or more first videos of the optical field of view of the first image capture device in real-time or near-real-time to perform at least one of reactive learning regarding potential interruption of at least one of one or more optical beams of the first FSO communication or proactive learning regarding potential interruption of the at least one of the one or more optical beams of the first FSO communication.

Alternatively, or additionally, autonomously analyzing the at least one of the one or more first images of the optical field of view of the first image capture device or the one or more first videos of the optical field of view of the first image capture device might comprise autonomously analyzing, with the computing system and utilizing at least one of an artificial intelligence ("AI") system or a machine learning system, the at least one of the one or more first images of the optical field of view of the first image capture device or the one or more first videos of the optical field of view of the first image capture device to perform at least one of reactive learning regarding potential interruption of at least one of one or more optical beams of the first FSO communication or proactive learning regarding potential interruption of the at least one of the one or more optical beams of the first FSO communication.

Figure 4J:
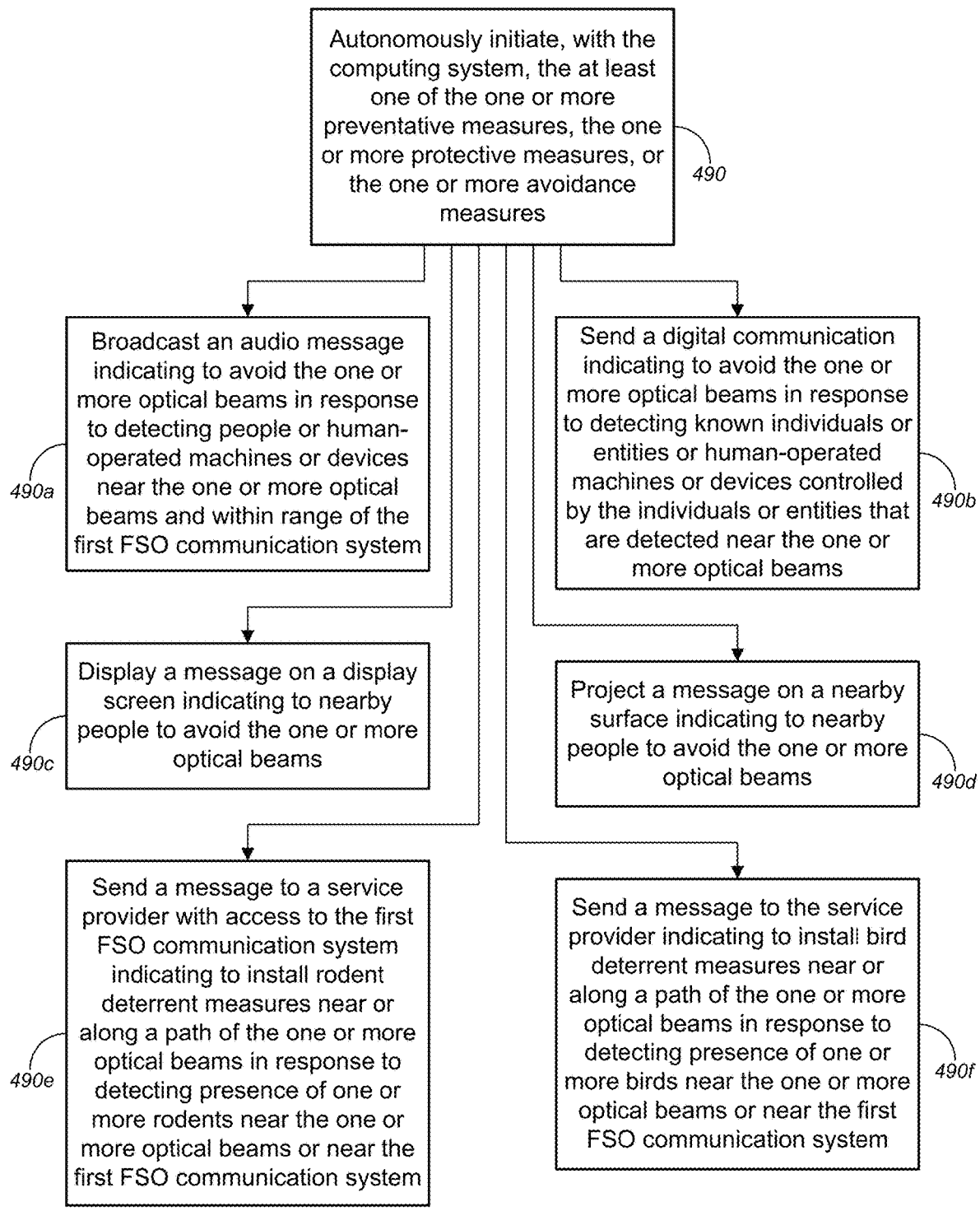
Figure 4K:
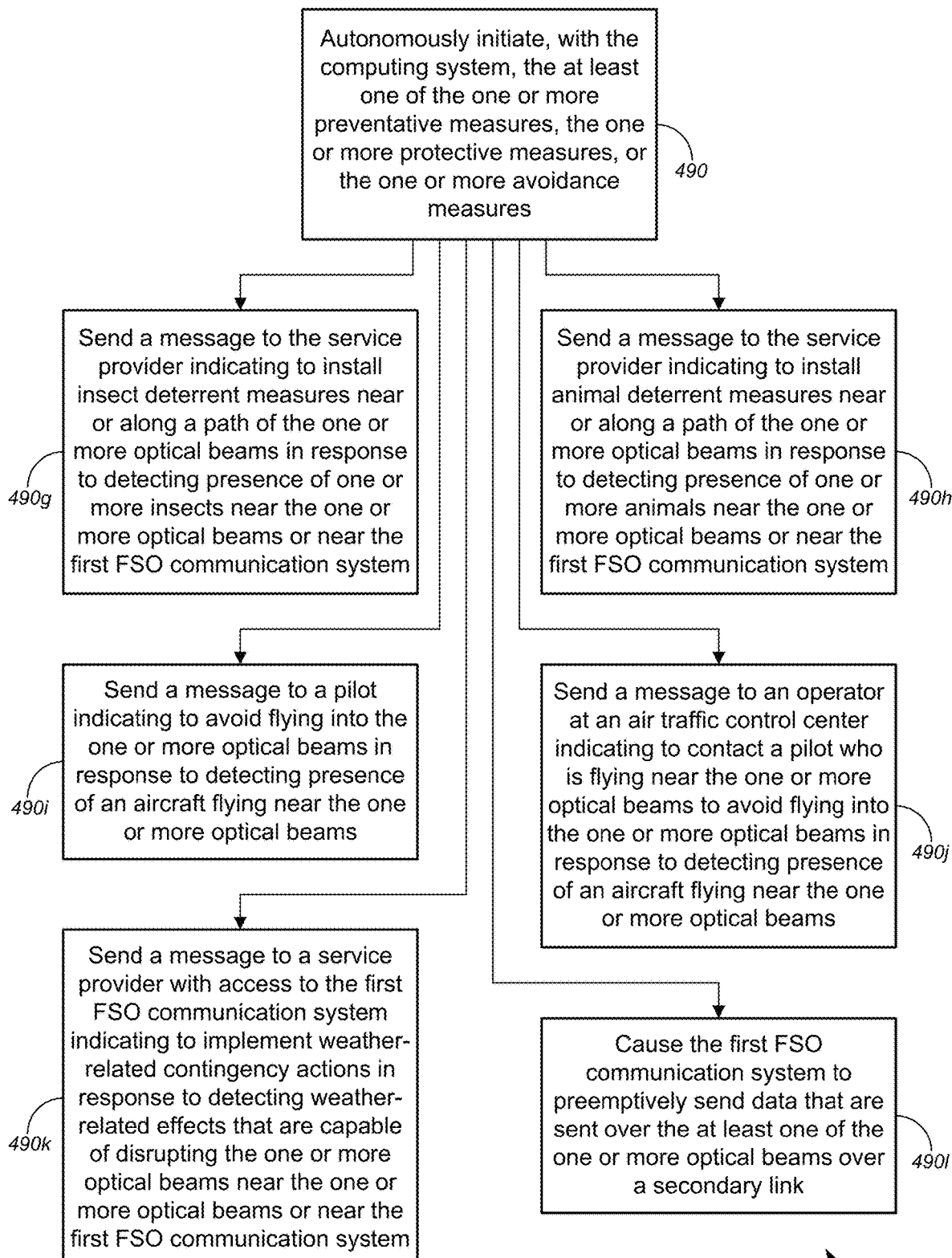

Referring to FIGS. 4J and 4K, autonomously initiating the at least one of the one or more preventative measures, the one or more protective measures, or the one or more avoidance measures (at block 490) might include, without limitation, at least one of: broadcasting an audio message indicating to avoid the one or more optical beams in response to detecting people or human-operated machines or devices near the one or more optical beams and within range of the first FSO communication system (block 490*a*); sending a digital communication indicating to avoid the one or more optical beams in response to detecting known individuals or entities or human-operated machines or devices controlled by the individuals or entities that are detected near the one or more optical beams (block 490*b*); displaying a message on a display screen indicating to nearby people to avoid the one or more optical beams (block 490*c*); projecting a message on a nearby surface indicating to nearby people to avoid the one or more optical beams (block 490*d*); sending a message to a service provider with access to the first FSO communication system indicating to install rodent deterrent measures near or along a path of the one or more optical beams in response to detecting presence of one or more rodents near the one or more optical beams or near the first FSO communication system (block 490*e*); sending a message to the service provider indicating to install bird deterrent measures near or along a path of the one or more optical beams in response to detecting presence of one or more birds near the one or more optical beams or near the first FSO communication system (block 490*f*); sending a message to the service provider indicating to install insect deterrent measures near or along a path of the one or more optical beams in response to detecting presence of one or more insects near the one or more optical beams or near the first FSO communication system (block 490*g*); sending a message to the service provider indicating to install animal deterrent measures near or along a path of the one or more optical beams in response to detecting presence of one or more animals near the one or more optical beams or near the first FSO communication system (block 490*h*); sending a message to a pilot indicating to avoid flying into the one or more optical beams in response to detecting presence of an aircraft flying near the one or more optical beams (block 490*i*); sending a message to an operator at an air traffic control center indicating to contact a pilot who is flying near the one or more optical beams to avoid flying into the one or more optical beams in response to detecting presence of an aircraft flying near the one or more optical beams (block 490*j*); sending a message to a service provider with access to the first FSO communication system indicating to implement weather-related contingency actions in response to detecting weather-related effects that are capable of disrupting the one or more optical beams near the one or more optical beams or near the first FSO communication system (block 490*k*); or causing the first FSO communication system to preemptively send data that are sent over the at least one of the one or more optical beams over a secondary link (block 490*l*); and/or the like. In some instances, the secondary link might include, but is not limited to, one of a radio link, a millimeter wave link, a microwave link, or a secondary optical link directed in a different direction, and/or the like.

Exemplary System and Hardware Implementation

Figure 5:
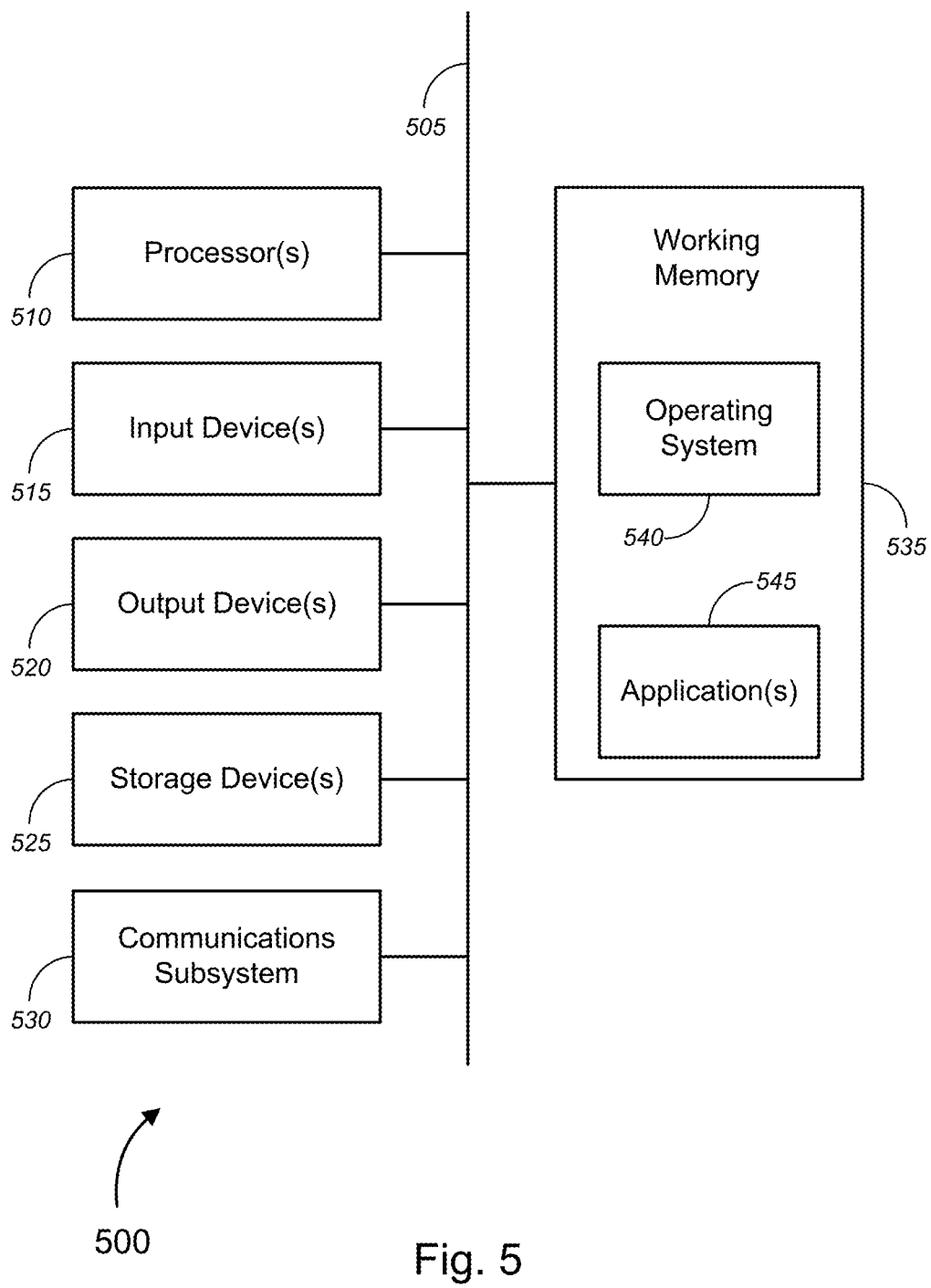
FIG. 5 is a block diagram illustrating an exemplary computer or system hardware architecture, in accordance with various embodiments.

FIG. 5 is a block diagram illustrating an exemplary computer or system hardware architecture, in accordance with various embodiments. FIG. 5 provides a schematic illustration of one embodiment of a computer system 500 of the service provider system hardware that can perform the methods provided by various other embodiments, as described herein, and/or can perform the functions of computer or hardware system (i.e., Free-space optical ("FSO") communication systems 105*a*, 105*b*, 305*a*, and 305*b*, computing systems 140*a*, 140*b*, and 155, artificial intelligence ("AI") system 165, secondary communication systems 170*a* and 170*b*, user devices 180*a* and 180*b*, display screens 185*a* and 185*b*, prevention system(s) 195, video encoder 210, real-time AI image analysis system 215, controller 220, management system 230, operator infrastructure 240, non-real-time AI image analysis system 250, etc.), as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer or hardware system 500—which might represent an embodiment of the computer or hardware system (i.e., FSO communication systems 105*a*, 105*b*, 305*a*, and 305*b*, computing systems 140*a*, 140*b*, and 155, AI system 165, secondary communication systems 170*a* and 170*b*, user devices 180*a* and 180*b*, display screens 185*a* and 185*b*, prevention system(s) 195, video encoder 210, real-time AI image analysis system 215, controller 220, management system 230, operator infrastructure 240, non-real-time AI image analysis system 250, etc.), described above with respect to FIGS. 1-4—is shown comprising hardware elements that can be electrically coupled via a bus 505 (or may otherwise be in communication, as appropriate). The hardware elements may include one or more processors 510, including, without limitation, one or more general-purpose processors and/or one or more special-purpose processors (such as microprocessors, digital signal processing chips, graphics acceleration processors, and/or the like); one or more input devices 515, which can include, without limitation, a mouse, a keyboard, and/or the like; and one or more output devices 520, which can include, without limitation, a display device, a printer, and/or the like.

The computer or hardware system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 500 might also include a communications subsystem 530, which can include, without limitation, a modem, a network card (wireless or wired), a fiber-optic connection, an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 530 may permit data to be exchanged with a network (such as the network described below, to name one example), with other computer or hardware systems, and/or with any other devices described herein. In many embodiments, the computer or hardware system 500 will further comprise a working memory 535, which can include a RAM or ROM device, as described above.

The computer or hardware system 500 also may comprise software elements, shown as being currently located within the working memory 535, including an operating system 540, device drivers, executable libraries, and/or other code, such as one or more application programs 545, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 500 and/or might take the form of source and/or installable code, which, upon compilation and/or installation on the computer or hardware system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 500) to perform methods in accordance with various embodiments of the invention. According to a set of embodiments, some or all of the procedures of such methods are performed by the computer or hardware system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 500, various computer readable media might be involved in providing instructions/code to processor(s) 510 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire, and fiber optics, including the wires that comprise the bus 505, as well as the various components of the communication subsystem 530 (and/or the media by which the communications subsystem 530 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 500. These signals, which might be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

Figure 6:
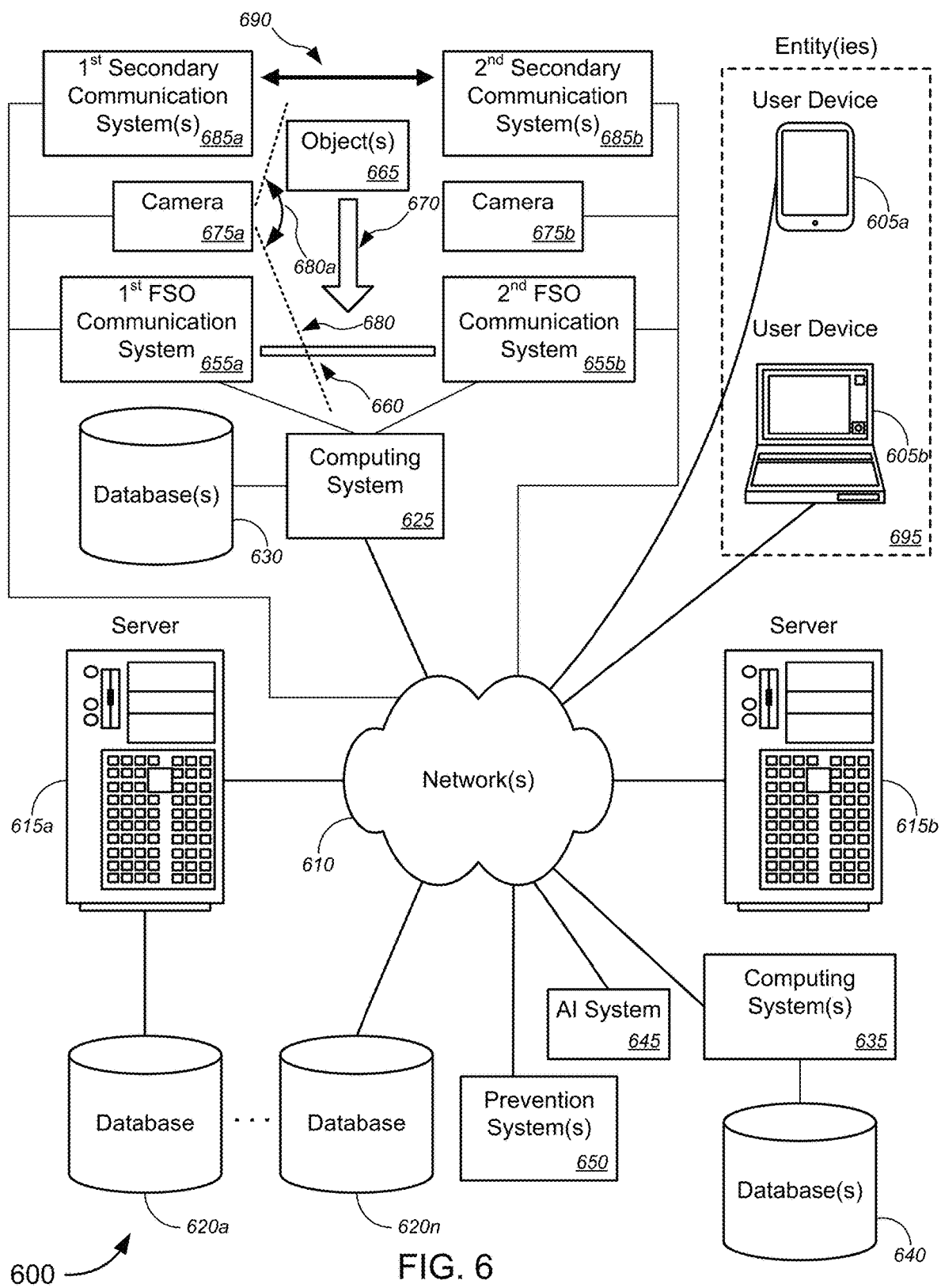
FIG. 6 is a block diagram illustrating a networked system of computers, computing systems, or system hardware architecture, which can be used in accordance with various embodiments.

As noted above, a set of embodiments comprises methods and systems for implementing free-space optical ("FSO") communication systems, and, more particularly, to methods, systems, and apparatuses for implementing visual impairment detection for FSO communication systems. FIG. 6 illustrates a schematic diagram of a system 600 that can be used in accordance with one set of embodiments. The system 600 can include one or more user computers, user devices, or customer devices 605. A user computer, user device, or customer device 605 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 605 can also have any of a variety of applications, including one or more applications configured to perform methods provided by various embodiments (as described above, for example), as well as one or more office applications, database client and/or server applications, and/or web browser applications. Alternatively, a user computer, user device, or customer device 605 can be any other electronic device, such as a thin-client computer, Internet-enabled mobile telephone, and/or personal digital assistant, capable of communicating via a network (e.g., the network(s) 610 described below) and/or of displaying and navigating web pages or other types of electronic documents. Although the exemplary system 600 is shown with two user computers, user devices, or customer devices 605, any number of user computers, user devices, or customer devices can be supported.

Certain embodiments operate in a networked environment, which can include a network(s) 610. The network(s) 610 can be any type of network familiar to those skilled in the art that can support data communications using any of a variety of commercially-available (and/or free or proprietary) protocols, including, without limitation, TCP/IP, SNA™ IPX™ AppleTalk™, and the like. Merely by way of example, the network(s) 610 (similar to network(s) 145 FIG. 1, or the like) can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 615. Each of the server computers 615 may be configured with an operating system, including, without limitation, any of those discussed above, as well as any commercially (or freely) available server operating systems. Each of the servers 615 may also be running one or more applications, which can be configured to provide services to one or more clients 605 and/or other servers 615.

Merely by way of example, one of the servers 615 might be a data server, a web server, a cloud computing device(s), or the like, as described above. The data server might include (or be in communication with) a web server, which can be used, merely by way of example, to process requests for web pages or other electronic documents from user computers 605. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 605 to perform methods of the invention.

The server computers 615, in some embodiments, might include one or more application servers, which can be configured with one or more applications accessible by a client running on one or more of the client computers 605 and/or other servers 615. Merely by way of example, the server(s) 615 can be one or more general purpose computers capable of executing programs or scripts in response to the user computers 605 and/or other servers 615, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™ IBM™, and the like, which can process requests from clients (including, depending on the configuration, dedicated database clients, API clients, web browsers, etc.) running on a user computer, user device, or customer device 605 and/or another server 615. In some embodiments, an application server can perform one or more of the processes for implementing FSO communication systems, and, more particularly, to methods, systems, and apparatuses for implementing visual impairment detection for FSO communication systems, as described in detail above. Data provided by an application server may be formatted as one or more web pages (comprising HTML, JavaScript, etc., for example) and/or may be forwarded to a user computer 605 via a web server (as described above, for example). Similarly, a web server might receive web page requests and/or input data from a user computer 605 and/or forward the web page requests and/or input data to an application server. In some cases, a web server may be integrated with an application server.

In accordance with further embodiments, one or more servers 615 can function as a file server and/or can include one or more of the files (e.g., application code, data files, etc.) necessary to implement various disclosed methods, incorporated by an application running on a user computer 605 and/or another server 615. Alternatively, as those skilled in the art will appreciate, a file server can include all necessary files, allowing such an application to be invoked remotely by a user computer, user device, or customer device 605 and/or server 615.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620a-620n (collectively, "databases 620"). The location of each of the databases 620 is discretionary: merely by way of example, a database 620a might reside on a storage medium local to (and/or resident in) a server 615a (and/or a user computer, user device, or customer device 605). Alternatively, a database 620n can be remote from any or all of the computers 605, 615, so long as it can be in communication (e.g., via the network 610) with one or more of these. In a particular set of embodiments, a database 620 can reside in a storage-area network ("SAN") familiar to those skilled in the art. (Likewise, any necessary files for performing the functions attributed to the computers 605, 615 can be stored locally on the respective computer and/or remotely, as appropriate.) In one set of embodiments, the database 620 can be a relational database, such as an Oracle database, that is adapted to store, update, and retrieve data in response to SQL-formatted commands. The database might be controlled and/or maintained by a database server, as described above, for example.

According to some embodiments, system 600 might further comprise computing system 625 (similar to computing systems 140a and 140b of FIG. 1 and/or controller 220 or management system 230 of FIG. 2, or the like) and corresponding database(s) 630 (similar to database(s) 145a and 145b of FIG. 1, or the like), computing system(s) 635 (similar to computing system(s) 155 of FIG. 1 and/or controller 220 or management system 230 of FIG. 2, or the like) and corresponding database(s) 640 (similar to database(s) 160 of FIG. 1, or the like), AI system 645

(similar to AI system 165 of FIG. 1 and/or real-time AI image analysis system 215 and non-real-time AI image analysis system 250 of FIG. 2, or the like), prevention system(s) 650 (similar to prevention system(s) 195 of FIG. 1, or the like). System 600 might further comprise first and second FSO communication system 655a and 655b (collectively, "FSO communication systems 655" or the like; similar to FSO communication systems 105a, 105b, 305a, and 305b of FIGS. 1 and 3, or the like) transmitting and receiving one or more optical beams 660 (similar to optical beams 110, 350, and 355 of FIGS. 1 and 3, or the like) that may be potentially interrupted or intersected by one or more objects 665 that are moving along one or more movement paths (depicted by arrow 670) (similar to objects 115a-115n moving along one or more movement paths 120, as depicted in FIG. 1, or the like). System 600 might further comprise cameras 675a and 675b (collectively, "cameras 675" or the like; similar to cameras 125a, 125b, 205, and 335 of FIGS. 1-3, or the like), each having a field of view ("FOV") 680, which might define an angle 680a that is rotated about a 360 degree direction about an axis that is normal to the lens of each camera 675. System 600 might further comprise first and second secondary communication systems 685a and 685b (collectively, "secondary communication systems 685" or the like; similar to secondary communication systems 170a and 170b of FIG. 1, or the like) transmitting and receiving data to and from each other via secondary communications links (depicted by double-headed solid arrow 690; similar to double-headed solid arrow 175 of FIG. 1, or the like).

In operation, an image capture device or camera 675a might capture, monitor, or record one or more first images (which might include, but is not limited to, images, groups of images, or videos, and/or the like) of an optical field of view (e.g., FOV 680a) of the first image capture device or camera 675a, the optical field of view comprising or containing one or more optical beams (e.g., optical beams 660) of a first FSO communication system 655a that are transmitted between the first FSO communication system 655a and a second FSO communication system 655b. The computing system 625 and computing system(s) 635, and/or AI system 645 (collectively, "computing system" or the like) might receive the captured one or more first images from the first image capture device or camera 675a, and might autonomously analyze the captured one or more first images to determine whether one or more first objects (e.g., at least one of objects 665, or the like) are moving within proximity to at least one of the one or more optical beams (e.g., optical beams 660) of the first FSO communication system 655a (and/or the second FSO communication system 655b). Based on a determination that one or more first objects are moving within proximity to at least one of the one or more optical beams of the first FSO communication system 655a (and/or the second FSO communication system 655b), the computing system might autonomously initiate one or more first tasks.

In some embodiments, capturing the one or more first images of the optical field of view of the first image capture device or camera 675a might comprise at least one of capturing a first set of still images of the optical field of view of the first image capture device or camera 675a beginning at a first period (e.g., N/2 seconds in the case of a video sequence having a total length of N seconds, as shown in FIG. 2B, or the like) prior to the one or more first objects moving to a position that is closest to the at least one of the one or more optical beams of the first FSO communication system, capturing a second set of still images of the optical field of view of the first image capture device or camera 675a ending at a second period (e.g., N/2 seconds in the case of a video sequence having a total length of N seconds, as shown in FIG. 2B, or the like) after the one or more first objects have moved to the position that is closest to the at least one of the one or more optical beams of the first FSO communication system, capturing a first video of the optical field of view of the first image capture device or camera 675a a third period (e.g., N/2 seconds in the case of a video sequence having a total length of N seconds, as shown in FIG. 2B, or the like) prior to the one or more first objects moving to the position that is closest to the at least one of the one or more optical beams of the first FSO communication system, capturing a second video of the optical field of view of the first image capture device or camera 675a a fourth period (e.g., N/2 seconds in the case of a video sequence having a total length of N seconds, as shown in FIG. 2B, or the like) after the one or more first objects have moved to the position that is closest to the at least one of the one or more optical beams of the first FSO communication system, or continuously capturing a third video of the optical field of view of the first image capture device or camera 675a, and/or the like. Herein, "a position that is closest to the at least one of the one or more optical beams" might refer to one of a position that overlaps with the at least one of the one or more optical beams in the case that the object intersects, obstructs, or interrupts the at least one of the one or more optical beams (such as shown in FIG. 3A, or the like) or a position along the object's movement path that is the shortest distance from the at least one of the one or more optical beams in the case that the object moves towards, then away from (while missing), the at least one of the one or more optical beams (such as shown in FIG. 3B, or the like).

Alternatively, or additionally, capturing the one or more first images of the optical field of view of the first image capture device or camera 675a might comprise at least one of capturing one or more infrared ("IR") images of the optical field of view of the first image capture device or camera 675a, capturing one or more ultraviolet ("UV") images of the optical field of view of the first image capture device or camera 675a, capturing one or more visible spectrum images of the optical field of view of the first image capture device or camera 675a, or capturing one or more filtered images of the optical field of view of the first image capture device, and/or the like. The one or more filtered images might be filtered to attenuate or filter out light emitted by the one or more optical beams. For example, if the one or more optical beams have a particular wavelength range within the IR spectrum, the camera 675 might utilize a filter that filters out or attenuates that particular wavelength range or a portion of that particular wavelength range.

According to some embodiments, autonomously analyzing the captured one or more first images might comprise autonomously analyzing the captured one or more first images in real-time or near-real-time to determine whether the one or more first objects are moving within proximity to the at least one of the one or more optical beams of the first FSO communication system 655a (and/or the second FSO communication system 655b). Alternatively, or additionally, autonomously analyzing the captured one or more first images might comprise autonomously analyzing, utilizing the AI system 645, the captured one or more first images to determine whether the one or more first objects are moving within proximity to the at least one of the one or more optical beams of the first FSO communication system 655a (and/or the second FSO communication system 655b).

In some embodiments, autonomously analyzing the captured one or more first images might comprise autonomously analyzing the captured one or more first images to determine, for each object of the one or more first objects (e.g., objects 665, or the like), a movement path (e.g., movement paths 670, or the like). The computing system might then determine whether the movement path, for each object of the one or more first objects, has intersected or is likely to intersect with at least one of the one or more optical beams of the first FSO communication system 655*a* (and/or the second FSO communication system 655*b*). Based on such a determination, the computing system might autonomously initiate the one or more first tasks.

Merely by way of example, in some cases, initiating the one or more first tasks might include, without limitation, at least one of causing the first FSO communication system to send or resend data that are sent over the at least one of the one or more optical beams over a secondary link (e.g., using the secondary communication systems 685, or the like), sending a message to one or more individuals regarding the proximity of the one or more first objects to the at least one of the one or more optical beams of the first FSO communication system 655*a* (and/or the second FSO communication system 655*b*), sending a message to one or more law enforcement agents regarding the proximity of the one or more first objects to the at least one of the one or more optical beams of the first FSO communication system 655*a* (and/or the second FSO communication system 655*b*), or notifying one or more entities (e.g., entities 695, or the like) associated with the one or more first objects (e.g., objects 665, or the like), and/or the like.

According to some embodiments, the computing system might store the captured one or more first images of the optical field of view of the first image capture device or camera 675*a* in a datastore (e.g., database(s) 630 and/or database(s) 640, or the like). In some cases, a video encoder (such as video encoder 210 of FIG. 2A, or the like) might compress the captured one or more first images of the optical field of view of the first image capture device prior to storing the captured one or more first images in the datastore. With the captured one or more first images (as well as other similar images that are captured over time) being stored in the datastore, rather than directly receiving the captured one or more first images from the image capture device or camera 675*a*, the computing system might access or retrieve at least one of the captured one or more first images of the optical field of view of the first image capture device or camera 675*a* or one or more second images of the optical field of view of the first image capture device or 675*b*. The computing system might then perform detailed analysis of the accessed at least one of the captured one or more first images of the optical field of view of the first image capture device or the one or more second images of the optical field of view of the first image capture device to determine at least one of one or more preventative measures, one or more protective measures, or one or more avoidance measures, and/or the like.

Merely by way of example, in some instances, the at least one of the one or more preventative measures, the one or more protective measures, or the one or more avoidance measures, and/or the like, might include, but is not limited to, at least one of broadcasting an audio message indicating to avoid the one or more optical beams in response to detecting people or human-operated machines or devices near the one or more optical beams and within range of the first FSO communication system 655*a* (and/or the second FSO communication system 655*b*), sending a digital communication indicating to avoid the one or more optical beams in response to detecting known individuals or entities or human-operated machines or devices controlled by the individuals or entities that are detected near the one or more optical beams, displaying a message on a display screen indicating to nearby people to avoid the one or more optical beams, projecting a message on a nearby surface indicating to nearby people to avoid the one or more optical beams, sending a message to a service provider with access to the first FSO communication system 655*a* (and/or the second FSO communication system 655*b*) indicating to install rodent deterrent measures near or along a path of the one or more optical beams in response to detecting presence of one or more rodents near the one or more optical beams or near the first FSO communication system 655*a* (and/or the second FSO communication system 655*b*), sending a message to the service provider indicating to install bird deterrent measures near or along a path of the one or more optical beams in response to detecting presence of one or more birds near the one or more optical beams or near the first FSO communication system 655*a* (and/or the second FSO communication system 655*b*), sending a message to the service provider indicating to install insect deterrent measures near or along a path of the one or more optical beams in response to detecting presence of one or more insects near the one or more optical beams or near the first FSO communication system 655*a* (and/or the second FSO communication system 655*b*), sending a message to the service provider indicating to install animal deterrent measures near or along a path of the one or more optical beams in response to detecting presence of one or more animals near the one or more optical beams or near the first FSO communication system 655*a* (and/or the second FSO communication system 655*b*), sending a message to a pilot indicating to avoid flying into the one or more optical beams in response to detecting presence of an aircraft flying near the one or more optical beams, sending a message to an operator at an air traffic control center indicating to contact a pilot who is flying near the one or more optical beams to avoid flying into the one or more optical beams in response to detecting presence of an aircraft flying near the one or more optical beams, sending a message to a service provider with access to the first FSO communication system indicating to implement weather-related contingency actions in response to detecting weather-related effects that are capable of disrupting the one or more optical beams near the one or more optical beams or near the first FSO communication system, and/or the like.

In some aspects, the computing system might receive, either from the first image capture device (or camera 675*a*) or from the database, at least one of one or more first images of the optical field of view of the first image capture device or camera 675*a* or one or more first videos of the optical field of view of the first image capture device or camera 675*a*. The computing system might receive the captured one or more first images from the first image capture device or camera 675*a*, and might autonomously analyze the captured at least one of the one or more first images or the one or more first videos to perform at least one of reactive learning regarding potential interruption of at least one of one or more optical beams (e.g., optical beams 660) of the first FSO communication system 655*a* (and/or the second FSO communication system 655*b*) or proactive learning regarding potential interruption of the at least one of the one or more optical beams (e.g., optical beams 660) of the first FSO communication system 655*a* (and/or the second FSO communication system 655b). Based on the analysis, the computing system might autonomously initiate the one or more second tasks.

According to some embodiments, autonomously analyzing the at least one of the one or more first images of the optical field of view of the first image capture device or camera 675a or the one or more first videos of the optical field of view of the first image capture device or camera 675a might comprise autonomously analyzing the at least one of the one or more first images of the optical field of view of the first image capture device or the one or more first videos of the optical field of view of the first image capture device or camera 675a in real-time or near-real-time to perform at least one of reactive learning regarding potential interruption of at least one of one or more optical beams (e.g., optical beams 660) of the first FSO communication system 655a (and/or the second FSO communication system 655b) or proactive learning regarding potential interruption of the at least one of the one or more optical beams (e.g., optical beams 660) of the first FSO communication system 655a (and/or the second FSO communication system 655b). Alternatively, or additionally, autonomously analyzing the at least one of the one or more first images of the optical field of view of the first image capture device or camera 675a or the one or more first videos of the optical field of view of the first image capture device or camera 675a might comprise autonomously analyzing, utilizing the AI system 645, the at least one of the one or more first images of the optical field of view of the first image capture device or camera 675a or the one or more first videos of the optical field of view of the first image capture device or camera 675a to perform at least one of reactive learning regarding potential interruption of at least one of one or more optical beams (e.g., optical beams 660) of the first FSO communication system 655a (and/or the second FSO communication system 655b) or proactive learning regarding potential interruption of the at least one of the one or more optical beams (e.g., optical beams 660) of the first FSO communication system 655a (and/or the second FSO communication system 655b).

Merely by way of example, in some cases, the reactive learning regarding potential interruption of the at least one of the one or more optical beams of the first FSO communication system 655a (and/or the second FSO communication system 655b) might include, without limitation, at least one of: identifying one or more first objects that have moved or are moving within proximity to at least one of the one or more optical beams of the first FSO communication system 655a (and/or the second FSO communication system 655b); identifying one or more first objects that have intersected or are intersecting with at least one of the one or more optical beams of the first FSO communication system 655a (and/or the second FSO communication system 655b); determining, for each object of the one or more first objects, a movement path near at least one of the one or more optical beams of the first FSO communication system 655a (and/or the second FSO communication system 655b); determining, for each object of the one or more first objects, a movement path intersecting with at least one of the one or more optical beams of the first FSO communication system 655a (and/or the second FSO communication system 655b); identifying one or more individuals associated with each of at least one of the one or more first objects and determining contact information for each of the one or more individuals; identifying one or more entities associated with each of at least one of the one or more first objects and determining contact information for each of the one or more entities; or determining the one or more second tasks in response to the reactive learning; and/or the like.

In such cases, autonomously initiating the one or more second tasks might include, but are not limited to, at least one of: causing the first FSO communication system 655a (and/or the second FSO communication system 655b) to send or resend data that are sent over the at least one of the one or more optical beams over a secondary link (e.g., using the secondary communication systems 685, or the like); sending a message to one or more individuals regarding the proximity of the one or more first objects to the at least one of the one or more optical beams of the first FSO communication system 655a (and/or the second FSO communication system 655b); sending a message to one or more law enforcement agents regarding the proximity of the one or more first objects to the at least one of the one or more optical beams of the first FSO communication system 655a (and/or the second FSO communication system 655b); or notifying one or more entities associated with the one or more first objects regarding the proximity of the one or more first objects (e.g., objects 665, or the like) to the at least one of the one or more optical beams of the first FSO communication system 655a (and/or the second FSO communication system 655b); and/or the like.

In some embodiments, the proactive learning regarding potential interruption of the at least one of the one or more optical beams of the first FSO communication system 655a (and/or the second FSO communication system 655b) might include, without limitation, at least one of: analyzing prior analyses or one or more prior captured images or video to identify one or more first objects (e.g., objects 665, or the like) that are likely to move within proximity to at least one of the one or more optical beams of the first FSO communication system 655a (and/or the second FSO communication system 655b); analyzing prior analyses or one or more prior captured images or video to identify one or more first objects (e.g., objects 665, or the like) that are likely to intersect with at least one of the one or more optical beams (e.g., optical beams 660) of the first FSO communication system 655a (and/or the second FSO communication system 655b); analyzing prior analyses or one or more prior captured images or video to determine, for each object of the one or more first objects (e.g., objects 665, or the like), a movement path toward at least one of the one or more optical beams (e.g., optical beams 660) of the first FSO communication system 655a (and/or the second FSO communication system 655b); analyzing prior analyses or one or more prior captured images or video to determine, for each object of the one or more first objects (e.g., objects 665, or the like), a movement path likely to intersect with at least one of the one or more optical beams of the first FSO communication system 655a (and/or the second FSO communication system 655b); analyzing prior analyses or one or more prior captured images or video to identify one or more individuals associated with each of at least one of the one or more first objects (e.g., objects 665, or the like) and determining contact information for each of the one or more individuals; analyzing prior analyses or one or more prior captured images or video to identify one or more entities associated with each of at least one of the one or more first objects (e.g., objects 665, or the like) and determining contact information for each of the one or more entities; analyzing prior analyses or one or more prior captured images or video to identify sources of potential interruption of the at least one of the one or more optical beams (e.g., optical beams 660) of the first FSO communication system 655a (and/or the second FSO communication system 655b)

that are due to at least one of location-specific causes, time of day-related causes, seasonal causes, lunar-based causes, time of year-related causes; or analyzing prior analyses or one or more prior captured images or video to determine the one or more second tasks in response to the proactive learning; and/or the like.

In such embodiments, autonomously initiating the one or more second tasks might include, but are not limited to, at least one of: broadcasting an audio message indicating to avoid the one or more optical beams (e.g., optical beams 660) in response to detecting people or human-operated machines or devices near the one or more optical beams (e.g., optical beams 660) and within range of the first FSO communication system 655*a* (and/or the second FSO communication system 655*b*); sending a digital communication indicating to avoid the one or more optical beams (e.g., optical beams 660) in response to detecting known individuals or entities or human-operated machines or devices controlled by the individuals or entities that are detected near the one or more optical beams (e.g., optical beams 660); displaying a message on a display screen (e.g., display screen(s) of user device 605*a* or 605*b*, or the like) indicating to nearby people to avoid the one or more optical beams (e.g., optical beams 660); projecting a message on a nearby surface indicating to nearby people to avoid the one or more optical beams (e.g., optical beams 660); sending a message to a service provider with access to the first FSO communication system 655*a* (and/or the second FSO communication system 655*b*) indicating to install rodent deterrent measures near or along a path of the one or more optical beams (e.g., optical beams 660) in response to detecting presence of one or more rodents near the one or more optical beams (e.g., optical beams 660) or near the first FSO communication system 655*a* (and/or the second FSO communication system 655*b*); sending a message to the service provider indicating to install bird deterrent measures near or along a path of the one or more optical beams (e.g., optical beams 660) in response to detecting presence of one or more birds near the one or more optical beams (e.g., optical beams 660) or near the first FSO communication system 655*a* (and/or the second FSO communication system 655*b*); sending a message to the service provider indicating to install insect deterrent measures near or along a path of the one or more optical beams (e.g., optical beams 660) in response to detecting presence of one or more insects near the one or more optical beams (e.g., optical beams 660) or near the first FSO communication system 655*a* (and/or the second FSO communication system 655*b*); sending a message to the service provider indicating to install animal deterrent measures near or along a path of the one or more optical beams (e.g., optical beams 660) in response to detecting presence of one or more animals near the one or more optical beams (e.g., optical beams 660) or near the first FSO communication system 655*a* (and/or the second FSO communication system 655*b*); sending a message to a pilot indicating to avoid flying into the one or more optical beams (e.g., optical beams 660) in response to detecting presence of an aircraft flying near the one or more optical beams (e.g., optical beams 660); sending a message to an operator at an air traffic control center indicating to contact a pilot who is flying near the one or more optical beams (e.g., optical beams 660) to avoid flying into the one or more optical beams (e.g., optical beams 660) in response to detecting presence of an aircraft flying near the one or more optical beams (e.g., optical beams 660); or sending a message to a service provider with access to the first FSO communication system 655*a* (and/or the second FSO communication system 655*b*) indicating to implement weather-related contingency actions in response to detecting weather-related effects that are capable of disrupting the one or more optical beams near the one or more optical beams or near the first FSO communication system 655*a* (and/or the second FSO communication system 655*b*); and/or the like.

In some aspects, the computing system might receive, either from the first image capture device (or camera 675*a*) or from the database, at least one of a plurality of images of an optical field of view of a first image capture device or camera 675*a* or a plurality of videos of the optical field of view of the first image capture device or camera 675*a*. The computing system might autonomously analyze the at least one of the plurality of images of the optical field of view of the first image capture device or camera 675*a* or the plurality of videos of the optical field of view of the first image capture device or camera 675*a* to determine at least one of one or more preventative measures, one or more protective measures, or one or more avoidance measures, and/or the like, to prevent interruption of the one or more optical beams (e.g., optical beams 660) of the first FSO communication system 655*a* (and/or the second FSO communication system 655*b*). Based on the analysis, the computing system might autonomously initiate the at least one of the one or more preventative measures, the one or more protective measures, or the one or more avoidance measures, and/or the like (as described in detail above). In some embodiments, autonomously initiating the at least one of the one or more preventative measures, the one or more protective measures, or the one or more avoidance measures might—alternative or additional to the at least one of the one or more preventative measures, the one or more protective measures, or the one or more avoidance measures, and/or the like (as described in detail above)—include causing the first FSO communication system 655*a* (and/or the second FSO communication system 655*b*) to preemptively send data that are sent over the at least one of the one or more optical beams over a secondary link (e.g., using the secondary communication systems 685, or the like).

According to some embodiments, autonomously analyzing the at least one of the plurality of images of the optical field of view of the first image capture device or camera 675*a* or the plurality of videos of the optical field of view of the first image capture device or camera 675*a* might comprise autonomously analyzing the at least one of the plurality of images of the optical field of view of the first image capture device or camera 675*a* or the plurality of videos of the optical field of view of the first image capture device or camera 675*a* in real-time or near-real-time to determine at least one of one or more preventative measures, one or more protective measures, or one or more avoidance measures, and/or the like. Alternatively, or additionally, autonomously analyzing the at least one of the plurality of images of the optical field of view of the first image capture device or camera 675*a* or the plurality of videos of the optical field of view of the first image capture device or camera 675*a* might comprise autonomously analyzing, utilizing the AI system 645, the at least one of the plurality of images of the optical field of view of the first image capture device or camera 675*a* or the plurality of videos of the optical field of view of the first image capture device or camera 675*a* to determine at least one of one or more preventative measures, one or more protective measures, or one or more avoidance measures, and/or the like.

These and other functions of the system 600 (and its components) are described in greater detail above with respect to FIGS. 1-4.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
    autonomously analyzing, using a computing system and utilizing at least one of an artificial intelligence ("AI") system or a machine learning system, one or more first images of an optical field of view of a first image capture device, the optical field of view comprising one or more optical beams of a first free-space optical ("FSO") communication system that are transmitted between the first FSO communication system and a second FSO communication system;
    based on a determination that one or more first objects are moving within proximity to at least one of the one or more optical beams of the first FSO communication system, based on the analysis, autonomously identifying, using the computing system and utilizing the at least one of the AI system or the machine learning system, the one or more first objects;
    autonomously correlating, using the computing system and utilizing the at least one of the AI system or the machine learning system, the identified one or more first objects with one or more first potential outage conditions; and
    autonomously initiating, using the computing system, one or more first tasks based on the correlation.

2. The method of claim 1, wherein the computing system comprises at least one of a controller disposed within the first FSO communication system, an external controller system, a server computer over a network, a cloud-based computing system over a network, or a distributed computing system.

3. The method of claim 1, wherein the one or more first images comprise at least one of:
    a first set of still images of the optical field of view of the first image capture device beginning at a first period prior to the one or more first objects moving to a position that is closest to the at least one of the one or more optical beams of the first FSO communication system;
    a second set of still images of the optical field of view of the first image capture device ending at a second period after the one or more first objects have moved to the position that is closest to the at least one of the one or more optical beams of the first FSO communication system;
    a first video of the optical field of view of the first image capture device a third period prior to the one or more first objects moving to the position that is closest to the at least one of the one or more optical beams of the first FSO communication system;
    a second video of the optical field of view of the first image capture device a fourth period after the one or more first objects have moved to the position that is closest to the at least one of the one or more optical beams of the first FSO communication system;
    a third video of the optical field of view of the first image capture device that is continuously being captured;
    one or more infrared images of the optical field of view of the first image capture device;
    one or more ultraviolet images of the optical field of view of the first image capture device;
    one or more visible spectrum images of the optical field of view of the first image capture device; or
    one or more filtered images of the optical field of view of the first image capture device, wherein the one or more filtered images are filtered to attenuate or filter out light emitted by the one or more optical beams.

4. The method of claim 1, further comprising:
    autonomously analyzing, using the computing system, the captured one or more first images to determine, for each object of the one or more first objects, a movement path;
    determining, using the computing system, whether the movement path, for each object of the one or more first objects, has intersected or is likely to intersect with at least one of the one or more optical beams of the first FSO communication system; and
    based on a determination that the movement path, for at least one object among the one or more first objects, has intersected or is likely to intersect with at least one of the one or more optical beams of the first FSO communication system, autonomously initiating, using the computing system, the one or more first tasks.

5. The method of claim 1, further comprising:
    accessing and decoding, using the computing system, the one or more first images from a datastore, prior to analysis.

6. The method of claim 5, further comprising:
    accessing and decoding, using the computing system and from the datastore, one or more second images, the one or more second images including at least one of one or more images of the optical field of the first image capture device or one or more images of an optical field of view of a second image capture device, the one or more second images being different from the one or more first images; and performing, using the computing system and utilizing the at least one of the AI system or the machine learning system, detailed analysis of at least one of the one or more first images or the one or more second images to determine at least one of one or more second potential outage conditions, one or more corrective actions, one or more preventative measures, one or more protective measures, or one or more avoidance measures.

7. The method of claim 6, wherein the at least one of the one or more corrective actions, the one or more preventative measures, the one or more protective measures, or the one or more avoidance measures comprises at least one of:

broadcasting an audio message indicating to avoid the one or more optical beams in response to detecting people or human-operated machines or devices near the one or more optical beams and within range of the first FSO communication system;

sending a digital communication indicating to avoid the one or more optical beams in response to detecting known individuals or entities or human-operated machines or devices controlled by the individuals or entities that are detected near the one or more optical beams;

displaying a message on a display screen indicating to nearby people to avoid the one or more optical beams;

projecting a message on a nearby surface indicating to nearby people to avoid the one or more optical beams;

sending a message to a service provider with access to the first FSO communication system indicating to install rodent deterrent measures near or along a path of the one or more optical beams in response to detecting presence of one or more rodents near the one or more optical beams or near the first FSO communication system;

sending a message to the service provider indicating to install bird deterrent measures near or along a path of the one or more optical beams in response to detecting presence of one or more birds near the one or more optical beams or near the first FSO communication system;

sending a message to the service provider indicating to install insect deterrent measures near or along a path of the one or more optical beams in response to detecting presence of one or more insects near the one or more optical beams or near the first FSO communication system;

sending a message to the service provider indicating to install animal deterrent measures near or along a path of the one or more optical beams in response to detecting presence of one or more animals near the one or more optical beams or near the first FSO communication system;

sending a message to a pilot indicating to avoid flying into the one or more optical beams in response to detecting presence of an aircraft flying near the one or more optical beams;

sending a message to an operator at an air traffic control center indicating to contact a pilot who is flying near the one or more optical beams to avoid flying into the one or more optical beams in response to detecting presence of an aircraft flying near the one or more optical beams; or sending a message to a service provider with access to the first FSO communication system indicating to implement weather-related contingency actions in response to detecting weather-related effects that are capable of disrupting the one or more optical beams near the one or more optical beams or near the first FSO communication system.

8. The method of claim 1, wherein initiating the one or more first tasks comprises at least one of:

causing the first FSO communication system to send or resend data that are sent over the at least one of the one or more optical beams over a secondary link;

sending a message to one or more individuals regarding the proximity of the one or more first objects to the at least one of the one or more optical beams of the first FSO communication system;

sending a message to one or more law enforcement agents regarding the proximity of the one or more first objects to the at least one of the one or more optical beams of the first FSO communication system;

notifying one or more entities associated with the one or more first objects; or reporting to one or more individuals regarding the one or more first potential outage conditions.

9. The method of claim 8, wherein the secondary link comprises one of a radio link, a millimeter wave link, a microwave link, or a secondary optical link directed in a different direction.

10. The method of claim 1, wherein initiating the one or more first tasks comprises at least one of:

autonomously mapping, using the computing system and utilizing the at least one of the AI system or the machine learning system, the one or more first potential outage conditions to one or more potential corrective actions;

determining, using the computing system and utilizing the at least one of the AI system or the machine learning system, a score representing a probability of success of the one or more potential corrective actions addressing the one or more first potential outage conditions;

storing, using the computing system and utilizing the at least one of the AI system or the machine learning system, the mapping of the one or more first potential outage conditions to one or more potential corrective actions in a datastore for addressing equivalent future potential outage conditions; or autonomously applying, using the computing system and utilizing the at least one of the AI system or the machine learning system, the one or more potential corrective actions without human intervention.

11. An apparatus, comprising:

at least one processor; and a non-transitory computer readable medium communicatively coupled to the at least one processor, the non-transitory computer readable medium having stored thereon computer software comprising a set of instructions that, when executed by the at least one processor, causes the apparatus to:

autonomously analyze, utilizing at least one of an artificial intelligence ("AI") system or a machine learning system, one or more first images of an optical field of view of a first image capture device, the optical field of view comprising one or more optical beams of a first free-space optical ("FSO") communication system that are transmitted between the first FSO communication system and a second FSO communication system;

based on a determination that one or more first objects are moving within proximity to at least one of the one or more optical beams of the first FSO communication system, based on the analysis, autonomously identify, utilizing the at least one of the AI system or the machine learning system, the one or more first objects;

autonomously correlate, utilizing the at least one of the AI system or the machine learning system, the identified one or more first objects with one or more first potential outage conditions; and autonomously initiate one or more first tasks based on the correlation.

12. The apparatus of claim 11, wherein the apparatus comprises at least one of a controller disposed within the first FSO communication system, an external controller system, a server computer over a network, a cloud-based computing system over a network, or a distributed computing system.

13. A system, comprising:

a first image capture device configured to capture one or more first images of an optical field of view of the first image capture device, the optical field of view comprising one or more optical beams of a first free-space optical ("FSO") communication system that are transmitted between the first FSO communication system and a second FSO communication system; and a computing system, comprising:
 at least one first processor; and
 a first non-transitory computer readable medium communicatively coupled to the at least one first processor, the first non-transitory computer readable medium having stored thereon computer software comprising a first set of instructions that, when executed by the at least one first processor, causes the computing system to:
  autonomously analyze, utilizing at least one of an artificial intelligence ("AI") system or a machine learning system, the one or more first images of the optical field of view of the first image capture device;
  based on a determination that one or more first objects are moving within proximity to at least one of the one or more optical beams of the first FSO communication system, based on the analysis, autonomously identify, utilizing the at least one of the AI system or the machine learning system, the one or more first objects;
  autonomously correlate, utilizing the at least one of the AI system or the machine learning system, the identified one or more first objects with one or more first potential outage conditions; and
  autonomously initiate one or more first tasks based on the correlation.

14. The system of claim 13, wherein the computing system comprises at least one of a controller disposed within the first FSO communication system, an external controller system, a server computer over a network, a cloud-based computing system over a network, or a distributed computing system.

15. The system of claim 13, wherein the first set of instructions, when executed by the at least one first processor, further causes the computing system to:

autonomously analyze the captured one or more first images to determine, for each object of the one or more first objects, a movement path;

determine whether the movement path, for each object of the one or more first objects, has intersected or is likely to intersect with at least one of the one or more optical beams of the first FSO communication system; and based on a determination that the movement path, for at least one object among the one or more first objects, has intersected or is likely to intersect with at least one of the one or more optical beams of the first FSO communication system, autonomously initiate the one or more first tasks.

16. The system of claim 13, wherein the first set of instructions, when executed by the at least one first processor, further causes the computing system to:

access and decode the one or more first images from a datastore, prior to analysis.

17. The system of claim 16, wherein the first set of instructions, when executed by the at least one first processor, further causes the computing system to:

access and decode, from the datastore, one or more second images, the one or more second images including at least one of one or more images of the optical field of the first image capture device or one or more images of an optical field of view of a second image capture device, the one or more second images being different from the one or more first images; and perform, utilizing the at least one of the AI system or the machine learning system, detailed analysis of at least one of the one or more first images or the one or more second images to determine at least one of one or more second potential outage conditions, one or more corrective actions, one or more preventative measures, one or more protective measures, or one or more avoidance measures.

18. The system of claim 17, wherein the at least one of the one or more corrective actions, the one or more preventative measures, the one or more protective measures, or the one or more avoidance measures comprises at least one of:

broadcasting an audio message indicating to avoid the one or more optical beams in response to detecting people or human-operated machines or devices near the one or more optical beams and within range of the first FSO communication system;

sending a digital communication indicating to avoid the one or more optical beams in response to detecting known individuals or entities or human-operated machines or devices controlled by the individuals or entities that are detected near the one or more optical beams;

displaying a message on a display screen indicating to nearby people to avoid the one or more optical beams;

projecting a message on a nearby surface indicating to nearby people to avoid the one or more optical beams;

sending a message to a service provider with access to the first FSO communication system indicating to install rodent deterrent measures near or along a path of the one or more optical beams in response to detecting presence of one or more rodents near the one or more optical beams or near the first FSO communication system;

sending a message to the service provider indicating to install bird deterrent measures near or along a path of the one or more optical beams in response to detecting presence of one or more birds near the one or more optical beams or near the first FSO communication system;

sending a message to the service provider indicating to install insect deterrent measures near or along a path of the one or more optical beams in response to detecting presence of one or more insects near the one or more optical beams or near the first FSO communication system;

sending a message to the service provider indicating to install animal deterrent measures near or along a path of the one or more optical beams in response to detecting presence of one or more animals near the one or more optical beams or near the first FSO communication system;

sending a message to a pilot indicating to avoid flying into the one or more optical beams in response to detecting presence of an aircraft flying near the one or more optical beams;

sending a message to an operator at an air traffic control center indicating to contact a pilot who is flying near the one or more optical beams to avoid flying into the one or more optical beams in response to detecting presence of an aircraft flying near the one or more optical beams; or sending a message to a service provider with access to the first FSO communication system indicating to implement weather-related contingency actions in response to detecting weather-related effects that are capable of disrupting the one or more optical beams near the one or more optical beams or near the first FSO communication system.

19. The system of claim 13, wherein initiating the one or more first tasks comprises at least one of:

causing the first FSO communication system to send or resend data that are sent over the at least one of the one or more optical beams over a secondary link, wherein the secondary link comprises one of a radio link, a millimeter wave link, a microwave link, or a secondary optical link directed in a different direction;

sending a message to one or more individuals regarding the proximity of the one or more first objects to the at least one of the one or more optical beams of the first FSO communication system;

sending a message to one or more law enforcement agents regarding the proximity of the one or more first objects to the at least one of the one or more optical beams of the first FSO communication system;

notifying one or more entities associated with the one or more first objects; or reporting to one or more individuals regarding the one or more first potential outage conditions.

20. The system of claim 13, wherein initiating the one or more first tasks comprises at least one of:

autonomously mapping, utilizing the at least one of the AI system or the machine learning system, the one or more first potential outage conditions to one or more potential corrective actions;

determining, utilizing the at least one of the AI system or the machine learning system, a score representing a probability of success of the one or more potential corrective actions addressing the one or more first potential outage conditions;

storing, utilizing the at least one of the AI system or the machine learning system, the mapping of the one or more first potential outage conditions to one or more potential corrective actions in a datastore for addressing equivalent future potential outage conditions; or autonomously applying, utilizing the at least one of the AI system or the machine learning system, the one or more potential corrective actions without human intervention.

* * * * *